(12) United States Patent
Lau et al.

(10) Patent No.: US 7,356,722 B2
(45) Date of Patent: Apr. 8, 2008

(54) VARIABLY DELAYABLE TRANSMISSION OF PACKETS BETWEEN INDEPENDENTLY CLOCKED SOURCE, INTERMEDIATE, AND DESTINATION CIRCUITS WHILE MAINTAINING ORDERLY AND TIMELY PROCESSING IN ONE OR BOTH OF THE INTERMEDIATE AND DESTINATION CIRCUITS

(75) Inventors: Onchuen (Daryn) Lau, Saratoga, CA (US); Matthew D. Ornes, Madison, WI (US); Chris D. Bergen, Cupertino, CA (US); Robert J. Divivier, San Jose, CA (US); Gene K. Chui, Campbell, CA (US); Christopher I. W. Norrie, San Jose, CA (US); King-Shing (Frank) Chui, Sunnyvale, CA (US)

(73) Assignee: Intergrated Device Technology, Inc., San Jose, CA (US)

( * ) Notice: Subject to any disclaimer, the term of this patent is extended or adjusted under 35 U.S.C. 154(b) by 0 days.

(21) Appl. No.: 11/699,737

(22) Filed: Jan. 29, 2007

(65) Prior Publication Data

US 2007/0130246 A1 Jun. 7, 2007

(51) Int. Cl.
*G06F 1/12* (2006.01)
(52) U.S. Cl. .................. 713/400; 718/100
(58) Field of Classification Search ............. 709/100, 709/105; 718/100
See application file for complete search history.

(56) References Cited

U.S. PATENT DOCUMENTS 4,486,739 A    12/1984   Franaszek et al.
4,495,562 A *  1/1985   Yamaji et al. .............. 718/105

(Continued)

OTHER PUBLICATIONS

CSIX-L1: Common Switch Interface Specification-L1, Published Aug. 5, 2000 as Specification Version: 1.0 at Internet URL: http://www-.csix.org/-csix11.pdf, (68 pages).

(Continued)

*Primary Examiner*—Thomas Lee
*Assistant Examiner*—Jaweed A Abbaszadeh
(74) *Attorney, Agent, or Firm*—Macpherson Kwok, et al.

(57) ABSTRACT

In a system having independently-clocked job-performing circuits (e.g., payload processors) and independently-clocked job-ordering circuits (e.g., request and payload suppliers), coordinating mechanisms are provided for coordinating exchanges between the independently-clocked circuits. The coordinating mechanisms include those that use transmitted time-stamps for scheduling contention-free performances within the job-performing circuits of requested jobs. The coordinating mechanisms additionally or alternatively include static and dynamic rate constraining means that are configured to prevent a faster-clocked one of the independently-clocked circuits from overwhelming a more slowly-clocked other of the independently-clocked circuits. In one implementation, independently-clocked telecommunication-shelves house a distributed set of line cards and switch cards. An asynchronous interconnect is provided between the independently-clocked shelves for carrying job requests and payload data between the distributed line cards and the distributed switch cards. The multi-shelf system is scalable and robust because additional or replacement line and switch cards may be inserted into one or another of the independently-clocked shelves as desired and because a unified clock-tree is not needed for synchronizing activities within the interconnected, but independently clocked shelves.

19 Claims, 12 Drawing Sheets

U.S. PATENT DOCUMENTS

| | | | |
|---|---|---|---|
| 4,497,023 | A | 1/1985 | Moorer |
| 5,325,527 | A | 6/1994 | Cwikowski et al. |
| 5,889,944 | A | 3/1999 | Butt et al. |
| 6,055,564 | A | 4/2000 | Phaal |
| 6,198,413 | B1 | 3/2001 | Widmer |
| 6,247,061 | B1 | 6/2001 | Douceur et al. |
| 6,502,121 | B1 * | 12/2002 | Threlkeld .................. 718/100 |
| 6,636,891 | B1 | 10/2003 | LeClair |
| 2002/0198923 | A1 | 12/2002 | Hayes |

OTHER PUBLICATIONS

Fibre Channel Physical and Signaling Interface (FC☐PH) Rev 4.3, ANSI X3.230:1994 (available from Global Engineering, 15 Inverness Way East, Englewood, CO 80112-5704 (1 page). (See also http://www.ietf.org/internet-drafts/draft-monia-ips-ifcparch-00.txt).

* cited by examiner

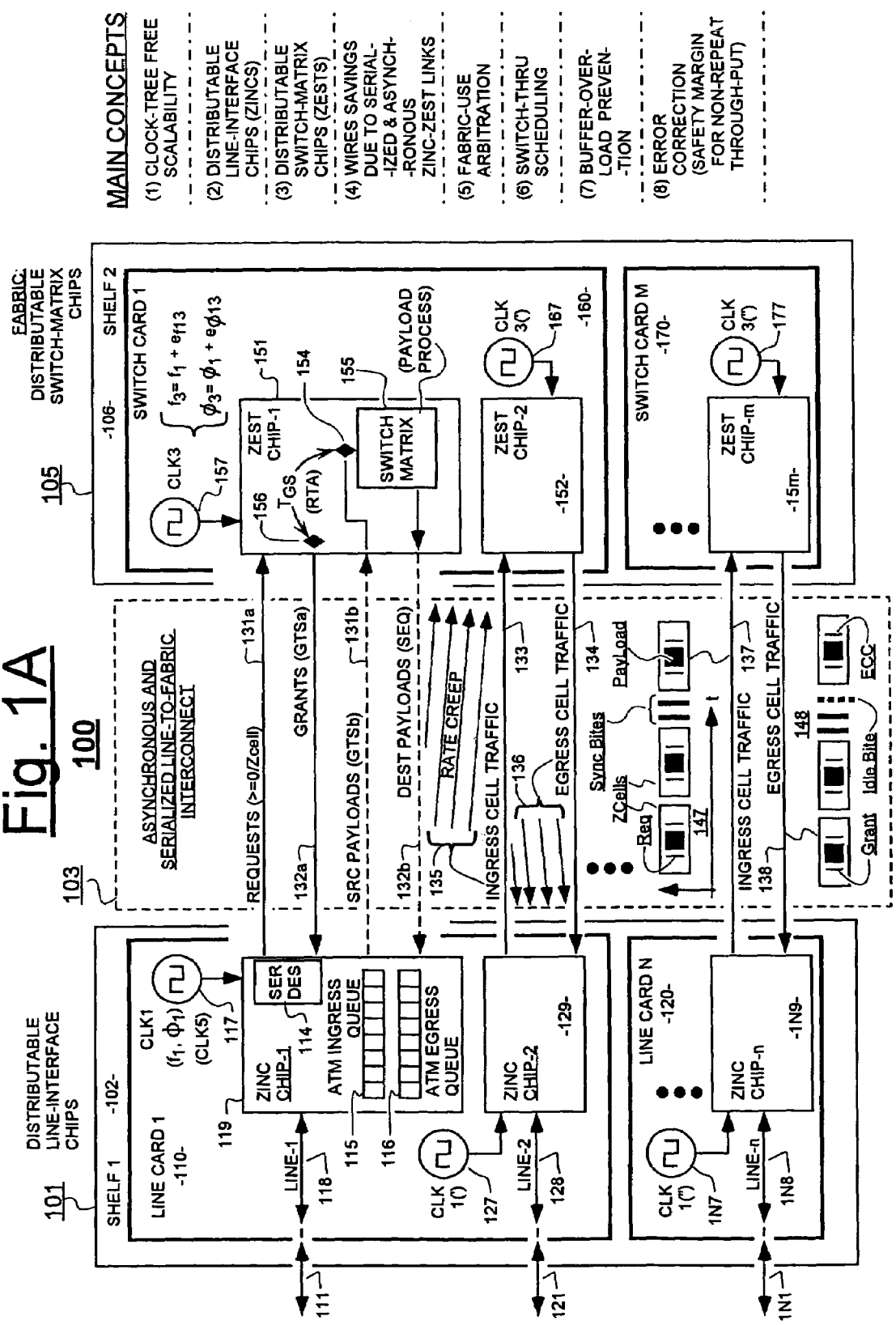

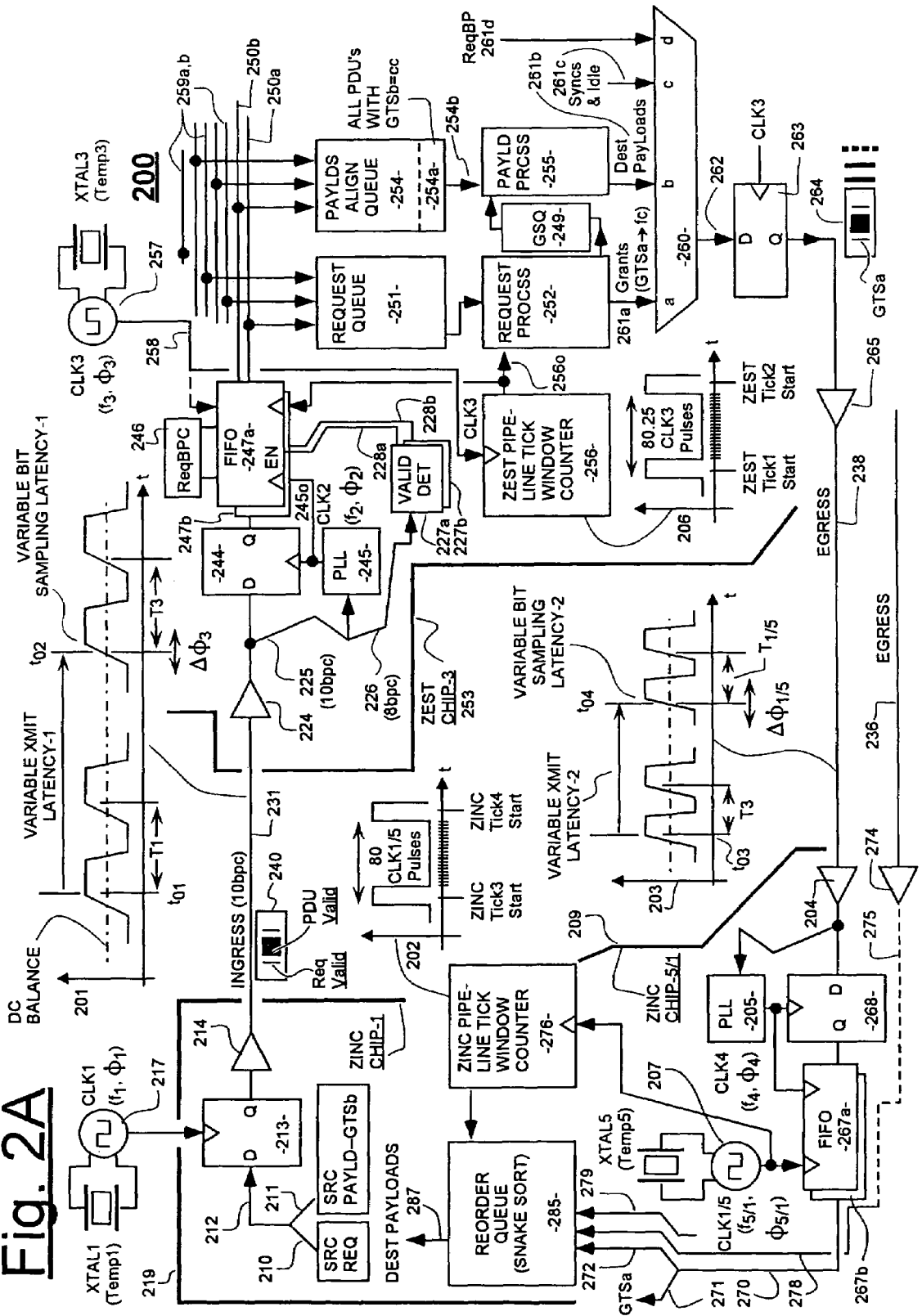

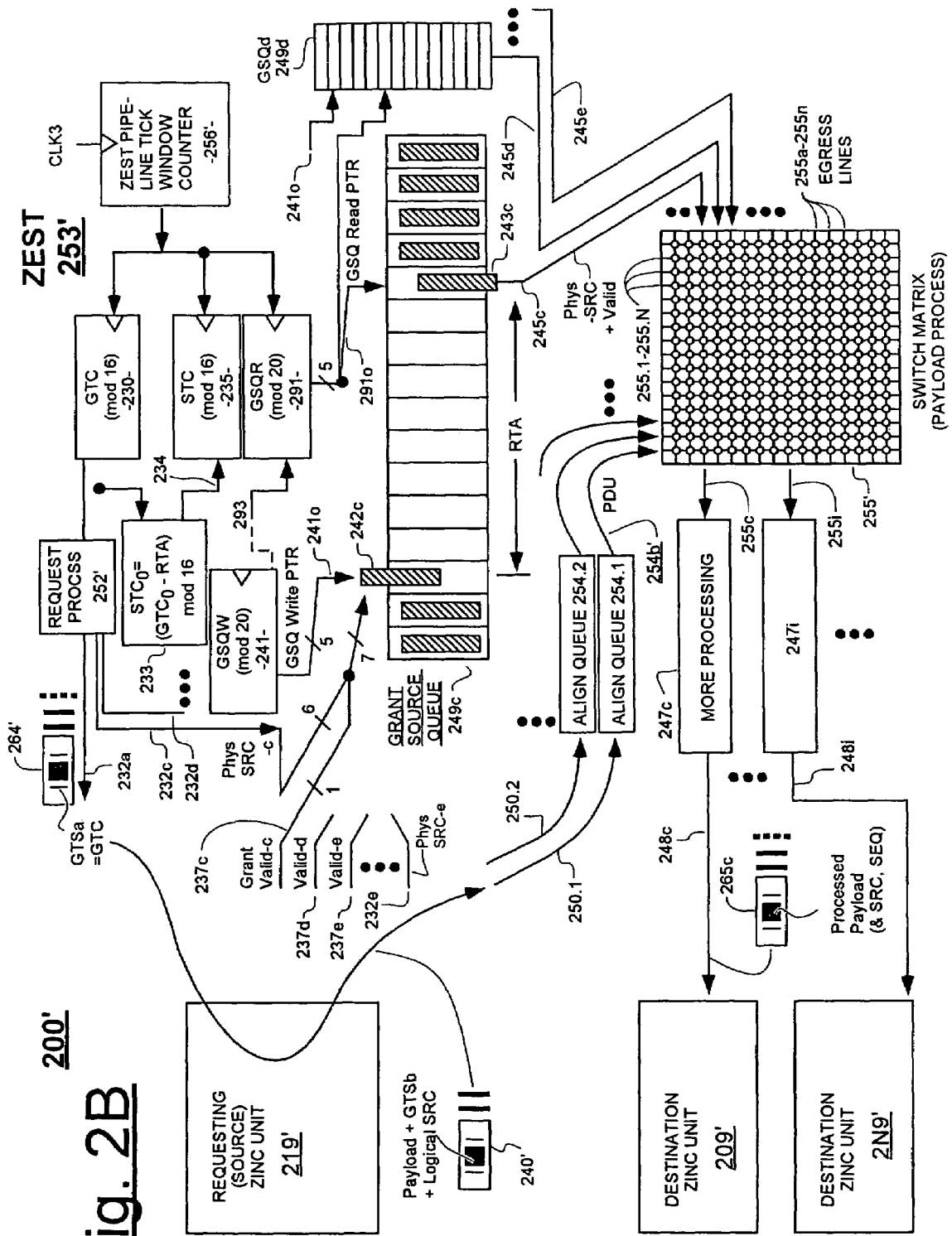

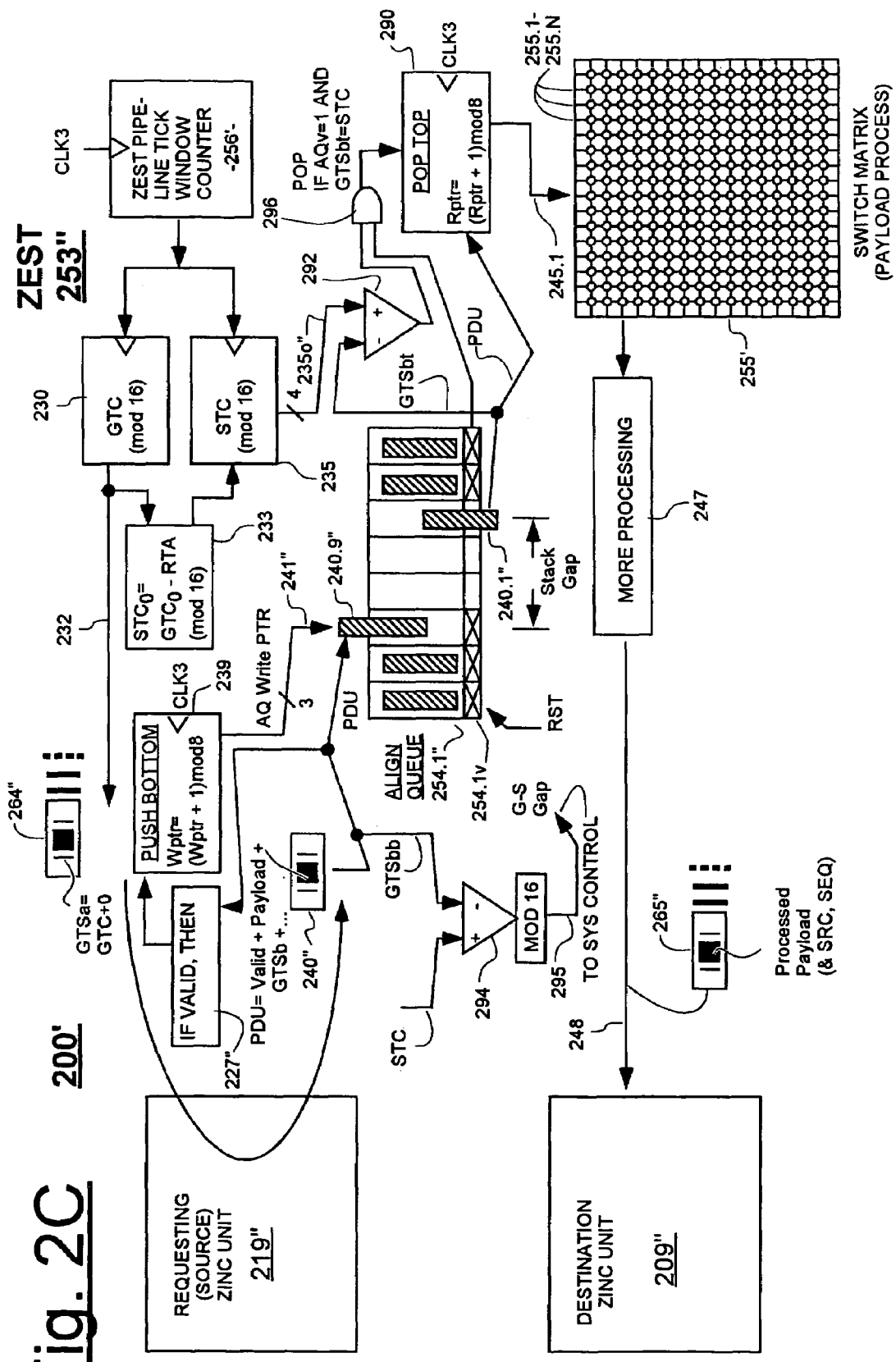

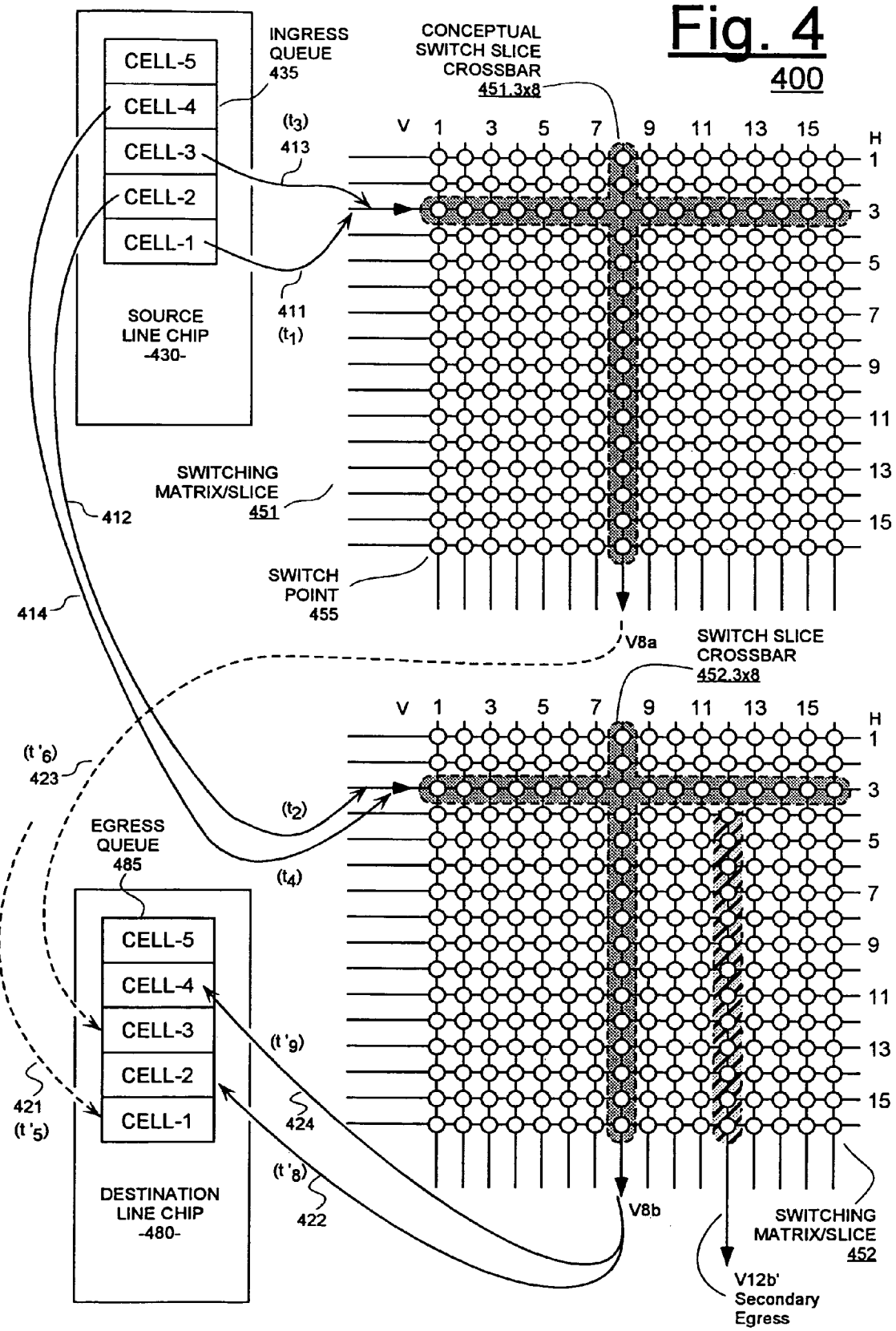

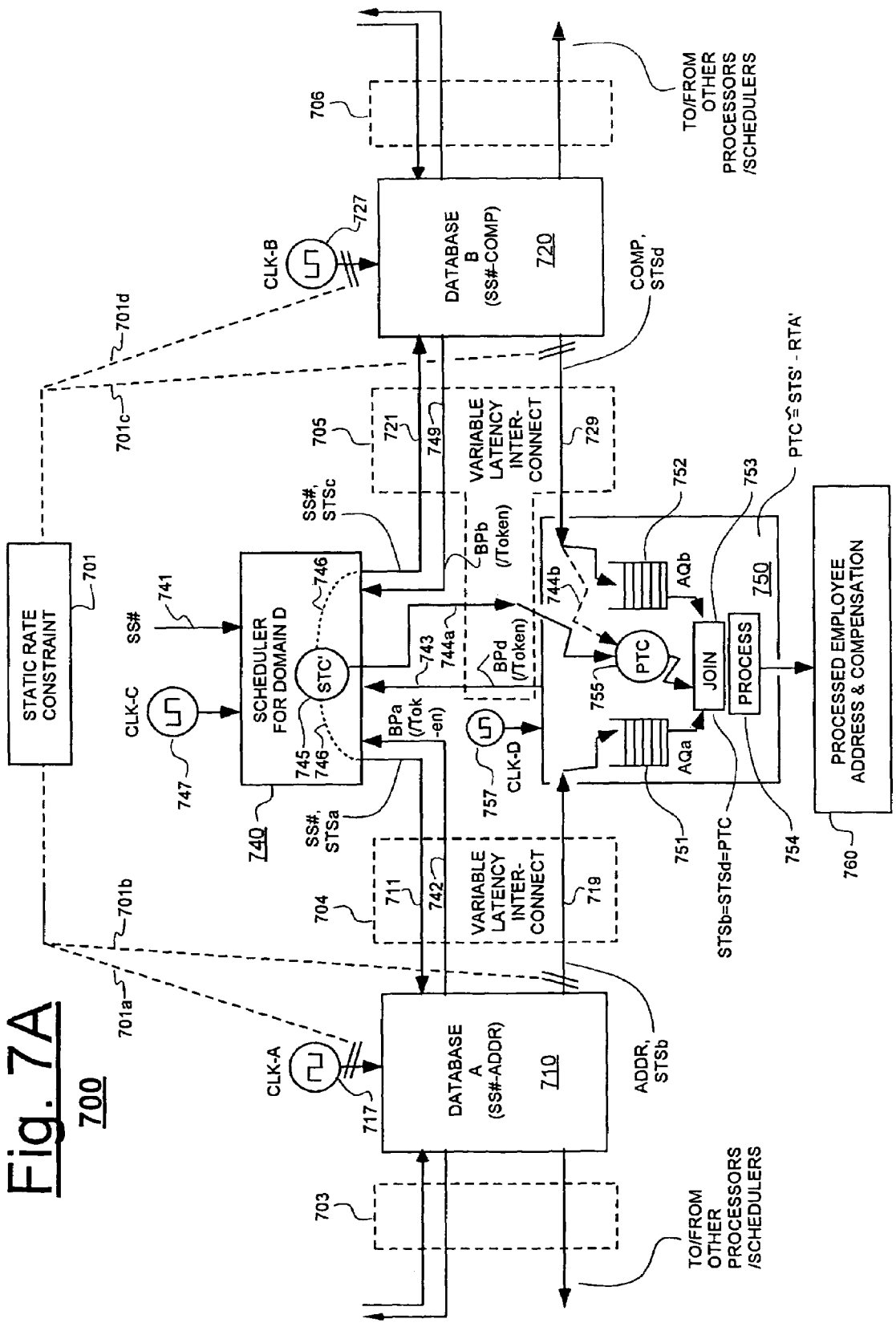

VARIABLY DELAYABLE TRANSMISSION OF PACKETS BETWEEN INDEPENDENTLY CLOCKED SOURCE, INTERMEDIATE, AND DESTINATION CIRCUITS WHILE MAINTAINING ORDERLY AND TIMELY PROCESSING IN ONE OR BOTH OF THE INTERMEDIATE AND DESTINATION CIRCUITS

CROSS REFERENCE TO APPLICATION

The following U.S. patent application is owned by the owner of the present application, benefit of its priority date is claimed and its disclosure is incorporated herein by reference:

(A) Ser. No. 09/997,507 filed Nov. 26, 2001 now U.S. Pat. No. 7,181,485 by Onchuen (Daryn) Lau, et al and which is originally entitled, Variably Delayable Transmission of Packets Between Independently Clocked Source, Intermediate, and Destination Circuits While Maintaining Orderly and Timely Processing in One or Both of the Intermediate and Destination Circuits.

FIELD OF DISCLOSURE

The present disclosure of invention relates generally to transmission between circuits of digital packets or cells or otherwise-framed sets of data, and to synchronized processing of the transmitted digital packets/cells/data-sets within the circuits, where the processing is such as may occur in high-speed telecommunication systems.

The disclosure relates more specifically to rate-disparity and synchronization problems that can develop when attempts are made to switch and/or otherwise process high-rate digital traffic in a timely and orderly manner while moving packets: (1) from a packet sourcing circuit that operates in synchronism with a first clock, (2) over an interconnect that may have variable delay (spatially and/or temporally) to a packet processing circuit that operates in synchronism with an independent second clock, and (3) over the interconnect (with the possibility of other variable delay) to a packet-sinking circuit {receiving destination} that operates in synchronism with a possibly-independent, third clock.

CROSS REFERENCE TO CO-OWNED APPLICATIONS

The following copending U.S. patent applications are owned by the owner of the present application, and their disclosures are incorporated herein by reference:

(A) Ser. No. 09/847,711 filed May 1, 2001 by Onchuen (Daryn) Lau, Chris D. Bergen, et al, and which was originally entitled, MULTISERVICE SWITCHING SYSTEM WITH DISTRIBUTED SWITCH FABRIC;

(B) Ser. No. 09/846,875 filed May 1, 2001 by Matthew D. Ornes, Christopher I. W. Norrie, and Gene K. Chui, which was originally entitled, METHOD AND SYSTEM FOR ERROR CORRECTION OVER SERIAL LINK;

(C) Ser. No. 09/905,394 filed Jul. 13, 2001 by Matthew D. Ornes, Gene K. Chui, and Christopher I. W. Norrie, and originally entitled, "Apparatus and Method for Reordering Sequence Indicated Information Units into Proper Sequence"; and (D) Ser. No. 09/865,258 filed May 25, 2001 by Matthew D. Ornes, Gene K. Chui, and Christopher I. W. Norrie, and originally entitled, "Method and Apparatus for Scheduling Static and Dynamic Traffic through a Switch Fabric".

CROSS REFERENCE TO PATENTS

The disclosures of the following U.S. patents are incorporated herein by reference:

(A) U.S. Pat. No. 4,486,739, issued Dec. 4, 1984 to Franaszek et al. and entitled "Byte Oriented DC Balanced (0,4) 8B/10B Partitioned Block Transmission Code"; and (B) U.S. Pat. No. 6,198,413, issued Mar. 6, 2001 to Widmer and entitled "Partitioned DC Balanced (0,6) 16B/18B Transmission Code with Error Correction".

CROSS REFERENCE TO RELATED OTHER PUBLICATIONS

The following publications are cited here for purposes of reference:

(A) CSIX-L1: Common Switch Interface Specification-L1, Published Aug. 5, 2000 as Specification Version: 1.0 at Internet URL: http://-www.csix.org/csixl1.pdf.; and (B) Fibre Channel Physical and Signaling Interface (FC-PH) Rev 4.3, ANSI X3.230: 1994 (available from Global Engineering, 15 Inverness Way East, Englewood, Colo. 80112-5704. (See also http://www.ietf.org/internet-drafts/draft-monia-ips-ifcparch-00.txt)

RESERVATION OF EXTRA-PATENT RIGHTS AND RESOLUTIONS OF CONFLICTS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

DESCRIPTION OF RELATED ART

In a synchronous digital circuit (SyCkt), signal processing activities are often aligned with the frequency (f) and phase ($\phi$) or duty cycle of a seed clock signal (e.g., a crystal's oscillations) or with the frequencies and/or phases of progeny clock signals derived from the seed. Thus if the frequency (f) and/or phase ($\phi$) of the seed clock signal changes even slightly due to local temperature variations, local voltage variations, or like perturbations, all the synchronous activities within the one synchronous circuit (SyCkt) can continue to remain aligned to each other despite the change. It is therefore conventionally desirable to distribute and/or replicate progeny of the seed clock signal throughout the synchronous circuit (SyCkt) so that intra-circuit operations may remain aligned to one another in spite of frequency or phase or duty cycle changes.

However, as a given, synchronous digital circuit (SyCkt) is made larger and larger, clock skew becomes a problem. It takes time for clock signals to flow from a seed point to all parts of the SyCkt and this often results in undesired phase skews between parts. Skew-compensating clock-tree structures may be devised to help assure that all parts of a single synchronous circuit (SyCkt) can continue to operate in desired phase relation with each other despite the distance between parts. Under this approach, anti-skew clock-trees typically have to be provided each within a given integrated circuit (IC) package and/or across the printed circuit board (PCB) of a given module and/or across the printed circuit backplane of given 'frame' or 'shelf' or other like circuit supporter and/or container (housing).

There comes a point, though, when the expanding size of a digital system may make it impractical to keep all parts synchronized to a common seed clock by way of a skew-compensating clock-tree structure or like solutions. The system may grow to such a large size that it extends across multiple 'shelves' or 'main frames' or other like housings. The physical conditions of such growth may call for each top-level housing or each hierarchical subdivision thereof to have its own, independent, seed clock. At this stage in the upward scaling of system size, it becomes very difficult to assure that all parts of the physically-distributed system are operating at exactly a same frequency (f) and/or at a same phase relationship ($\phi$) and/or duty cycle with- respect to one another despite variations in local temperatures, power supply voltages, distances between shelves, and so forth. Often, slight differences in frequency (f) and/or phase ($\phi$) and/or duty cycle between parts of a distributed system is not a problem if transactions occur in burst-like manner with slack time being present between bursts. FIFO's or like buffers may be used to synchronize received bursts of data to the local seed clock of the receiving shelf or of the corresponding other form of circuit supporter and/or container.

There are, however, unique situations where transmissions tend to be continuous (having essentially no breathing time between transactions) as opposed to being sparse and bursty and where it may therefore be necessary to keep a first set of transmitted signals in very close rate and/or phase relationship to a second set of signals while letting the two sets move through independently-clocked parts of the overall system, and perhaps even over transmission paths of variable delay. Generally the problematic situation arises when a plurality of independently clocked, source circuits are allowed to continuously stream respective processing jobs into an independently clocked, processing circuit. One problem related to such a situation is how to schedule the jobs so as to avoid processing collisions. Another problem related to such a situation is how to prevent one of the independently-clocked source circuits from outpacing the processing circuit.

The present disclosure explicates such scheduling and outpacing problems by presenting as one example, a distributed switch fabric system in which phase and frequency aligned source signals (ingress signals) are split up into multiple sets. The split sets are passed through separately clocked, processing units (e.g., switch slices). After being processed (e.g., switched) the split sets are reunited (reassembled) in timely and orderly manner for presentation to a phase and rate sensitive destination. Problems and advantages associated with such a distributed processing arrangement will become clearer from the below, detailed description. At an abstract level, some of the associated problems can be summarized as follows: (1) How can one avoid contention and still multiplex multiple processings through a shared first resource (e.g., a switch slice), when that first resource is independently clocked by a respective first clock, and the process directing signals come from respective second and third resources that are independently clocked by respective second and third clocks, and perhaps the second and third resources are spaced-away from the shared first resource, chronologically-speaking, by variable distances? (2) Given that in a data flow path, the average output rate (over a relatively long time span) needs to match the average input rate, how can one avoid rate overrun when a first data flow circuit feeds a second data flow circuit, and the first data flow circuit is independently clocked at a frequency that might be higher than the clock frequency of the second data flow circuit? (3) If an ordered, source data flow is segmented into separate subflows that move through independently clocked, processing circuits (e.g., a switch slices) and/or through transmission paths having different time delays, how can one re-assemble the subflows to provide a destination data flow that is ordered in substantially the same way as was the source data flow?

By way of a more concrete example, consider the following situation and how it may benefit from distributed processing. But consider also how it may require rate consistency and order consistency for its processed data. In the example, a digitized, high-definition, televideo conference is taking place between three or more randomly selectable parties, where the parties can located at random distances (within a reasonable range) away from one another. The back and forth, rasterized video signals need to remain in-sequence, and uninterrupted so that all end users perceive their digitally televised exchanges as occurring in the present tense (real time) and without detectable gaps or changes in picture and voice quality. Such rate-wise and order-wise constrained communications may need to be sent, at least in part, using a Time Domain Multiplexing (TDM) protocol or the like. The TDM digitized traffic may be of a unicast type or it may have a multicast aspect whereby cells or packets of the digitized data are more efficiently handled by simultaneously transmitting the packets of a common source to many destinations rather than by unicasting them as individual flows each from a single source to a specifically addressed destination. In order to efficiently provide a desired routing bandwidth for such high-quality televideo communications, it may be advantageous to break a continuous, serial TDM stream into a plurality of smaller packets or cells and to simultaneously route those smaller cells distributively and in parallel through a parallel set of switching matrices (cell-processing units). Then, after they are switched-through the parallel matrices, and/or they are otherwise distributively processed in parallel, those of the processed cells which are heading towards a common destination, are to be reunited to move in proper rate and order into a continuous and serial TDM stream at the destination-side. One problem that emerges in the carrying out such a scheme is how to assure that all the distributively-processed pieces that return to the destination get there on time and in the correct order. Another problem is how to schedule the distributed processings. A problem of an encompassingly greater magnitude is how to make such a packet processing scheme (cell routing scheme) scalable so that it can grow in size, independently of clocking concerns, and it can thereby accommodate the needs of growing populations of end users and growing traffic densities.

SUMMARY

Structures and methods may be provided in accordance with the present disclosure of invention for overcoming one or more of the above-described problems.

(A) More specifically, in accordance with one broad aspect of the present disclosure, techniques are provided for allowing independently clocked requestors to have their respectively requested jobs processed in an independently clocked, job processor with little fear of conflict, even if there are respectively different communication latencies between the job processor (e.g., switching chip) and the respective requestors (e.g., line interface chips).

(B) In accordance with a second broad aspect of the present disclosure, techniques are provided for orderly pairing of, or otherwise orderly joining or combining of data units (e.g., data payloads) that were output by independently clocked data processors (e.g., switching chips), even if there are respectively different and/or variable communication latencies between the plural data processors and the locus (e.g., a line interface chip) where the data units are to be paired together or otherwise joined or combined.

(C) In accordance with a third broad aspect of the present disclosure, a combination of static and dynamic rate control techniques are provided for equalizing the effective data flow rates of independently clocked data sources, data processors, and data sinks.

More specifically, in accordance with one detailed aspect of the present disclosure, a cell (or packet) switching fabric is provided with an ability to have: (a) independently-clocked, line-interface units; (b) a distributively-shareable set of independently-clocked, cell-processing units (e.g., switch-matrix chips), and (c) an interconnect which is allowed to provide variable communication latencies between inter-communicating ones of the line-interface units and the cell-processing units.

Because the line-interface units and the cell-processing units can be independently clocked, no clock-tree structure is needed for synchronizing their activities. The independence from reliance on a clock-tree frees the system (which system is comprised of independently clocked, line-interface and data-processing units) to grow larger in size and speed so as to accommodate higher volumes and/or higher rates of traffic throughput. The cell-processing fabric (switching fabric) can be distributed broadly instead of having to be bound to a common printed circuit backplane or within a given 'frame' or 'shelf' or other like housings as might be the case for an alternate system that needs a clock tree due to such an alternate system's need to synchronize activities in its various parts to a common seed clock.

In accordance with a second detailed aspect of the present disclosure, a time stamping mechanism is provided to compensate for variable, round-trip latencies associated with cells that carry service requests, service grants, and the actual payloads that are to be serviced (e.g., switched through respective switch-matrices).

In accordance with a third detailed aspect of the present disclosure, a destination reordering mechanism is provided to compensate for variable, return-trip latencies associated with cells that carry serviced payloads (ones that have been switched through respective, and perhaps independently-clocked, and differently linked, switch-matrices) so that serviced payloads can arrive at their intended destinations in an intended order, and can at the same time, usually meet average, payload-latency times specified for the overall switching operations of the system.

In accordance with a fourth detailed aspect of the present disclosure, a static link-rate constraining mechanism is combined with a dynamic link-rate adjusting mechanism to help more-slowly clocked; receiving ones of the line-interface and/or cell-processing units to avoid being outpaced by the effectively higher processing rates of more-quickly clocked and data-outputting ones of the line-interface and/or cell-processing units.

A data-cell processing method in accordance with the present disclosure may be used in a distributed cell-processing system having a first plurality of independently clocked cell-processing units (e.g., switch slices), a second plurality of independently clocked cell-sourcing/sinking units (e.g., line cards), and an interconnect that potentially provides variable and different interconnect latencies between the first and second pluralities of units. Such a cell-processing method may comprise: (a) providing an independent, temporal reference frame for each of the independently clocked cell-processing units and time aligning processing-grants given by respective ones of the independently clocked cell-processing units, and corresponding processings of data cells in the respective ones of the independently clocked cell-processing units each to the respective temporal reference frame (e.g., local ticks) of its respective cell-processing unit; (b) re-ordering processed ones of the data cells as they arrive, in receiving ones of the cell-sinking units to thereby arrange the data cells that arrive over the variable-latencies interconnect according to an order that the cells had amongst one another when originated from sourcing ones of the sourcing/sinking units; and (c) constraining the effective requesting, granting, cell-processing, and cell-transmission rates of the independently clocked, cell-processing and sourcing/sinking units so that when faster-clocked ones of the units send data to comparatively slower-clocked ones of the units, the faster-clocked, sending units will not outpace the maximum data receive-and-process rates of the comparatively slower-clocked receiving units.

A data processing system in accordance with the present disclosure which does not need a clock-tree to coordinate all its operations may comprise: (a) one or more independently clocked data processors; (b) one or more independently clocked data sources; (c) an interconnect which interconnects the one or more data sources to the one or more data processors, where the interconnections between respective data sources and data processors may have respectively variable latencies (spatially and/or temporally speaking); (d) one or more schedulers that schedule when data processing operations are to occur in the one or more data processors, where the one or more schedulers use respective time stamps that are respectively coordinated to respective time frames of respective ones of the one or more, independently clocked, data processors for indicating when in the respective time frames the scheduled operations of the data processors are to occur; and (e) a rate constraining mechanism for constraining effective data-sourcing and data-processing rates of the independently clocked, data sources and data processors so that when faster-clocked ones of the sources and processors send data to comparatively slower-clocked ones of the sources and processors, the faster-clocked, sending units will not outpace the maximum data receive-and-process rates of the comparatively slower-clocked receiving units. In one embodiment, the rate constraining mechanism includes a static constraining means for consistently slowing effective data rate in one direction such as that of data moving from processors to sources; and a dynamic constraining means for responding to back pressure flags and dynamically slowing effective data rate in the other direction such as that of data moving from sources to processors in response to activated back pressure flags sent from the processors to the data sources.

Other aspects of the disclosure will become apparent from the below detailed description.

BRIEF DESCRIPTION OF THE DRAWINGS

The below detailed description section makes reference to the accompanying drawings, in which:

FIG. 1A is a block diagram of a combined, service requests arbitrating system, and payload servicing system arranged in accordance with the invention to enable a distributed switch fabric that can have independently clocked, source, destination, and intermediate payload-servicing chips;

FIG. 2A is a schematic diagram showing details of problems encountered due to independent clocking of the source, destination, and intermediate servicing chips, and some of the solutions;

FIG. 2B is a schematic showing details of a Grant Source Queue (GSQ) within a first embodiment of a payload aligning mechanism in accordance with the disclosure;

FIG. 2C is a schematic showing details of a PDU Alignment Queue (AQ) within a first embodiment of a payload aligning mechanism in accordance with the disclosure;

FIG. 4 is a conceptual diagram showing how multiple switch slices may be used in parallel to increase payload-throughput rates of a switch fabric;

FIG. 7A is a block diagram of a distributed database system in accordance with the disclosure.

DEFINITIONS AND CAVEATS

Figure 1B:
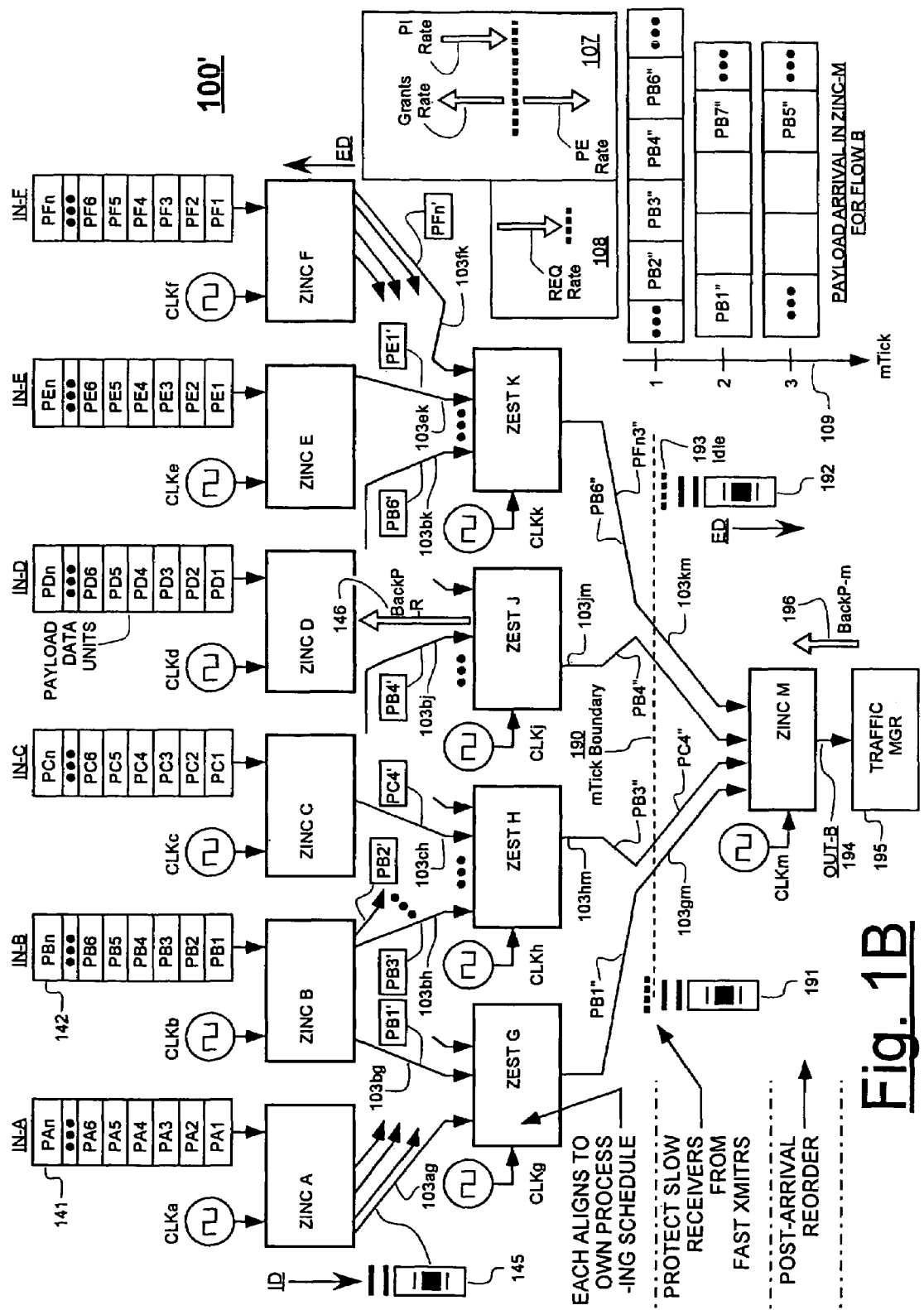
FIG. 1B is a flow diagram for explaining problems that can arise, and solutions that may be implemented when using a distributed cell-processing system having independently clocked cell-processing units, independently clocked cell-sourcing/sinking units, and an asynchronous interface between such units.

New technologies often benefit from the coining of new terminologies that describe novel characteristics. Such is true for the 'Z-cell' based switching systems disclosed in the above-incorporated U.S. patent application Ser. No. 09/847,711 and such is also true for the error correction schemes disclosed in the above-incorporated U.S. patent application Ser. No. 09/846,875. The disclosed methods in these earlier-filed applications are merely examples of signal processing technologies that can be used in combination with the method of the present disclosure involving the fixing of grant to processing latency. Other signal processing technologies and signal exchange protocols may be used. The methods of Ser. Nos. 09/847,711 and/or 09/846,875 are not considered to be best modes for carrying out the more-generically applicable, latency-fixing methods and structures disclosed herein. They are merely specific examples of what could be done in combination with such latency-fixing.

A number of terms used in U.S. patent application Ser. No. 09/847,711 will be re-used herein for purposes of example. It should be noted however, that the payload-processing units described herein are not limited to the ZEST chips of Ser. No. 09/847,711. The line card units described herein are not synonymous with or limited to the ZINC chips of Ser. No. 09/847,711. The request/grant protocols described herein are not limited to the Z-cell based, request/grant protocols disclosed in Ser. No. 09/847,711. Reasons for why should become apparent below. Moreover, use of the term 'chip' herein does not narrow the ordinary meaning of 'unit'. Descriptions found herein of ZINC and ZEST 'chips' do not preclude the broader implementation of such entities as ZINC or ZEST 'units' that are not necessarily each a monolithic, integrated circuit.

DETAILED DESCRIPTION

FIG. 1A is a block diagram of a digital telecommunications system 100 to which the here disclosed invention may be applied. A broader description of a surrounding environment for the system may be found in the above-cited U.S. application Ser. No. 09/847,711 filed May 1, 2001 by Onchuen (Daryn) Lau, et al, and originally entitled, MULTISERVICE SWITCHING SYSTEM WITH DISTRIBUTED SWITCH FABRIC. The present disclosure focuses on how various subsystems within system 100 may be controlled to provide timely and orderly processing of packets or data cells (or other kinds of framed data sets) which are exchanged between layers 101 and 105 of the system even though parts of layers 101 and 105 may be independently clocked and even though variable communication latencies may exist (in a spatial and/or temporal sense) between inter-communicating ones of data transmitting and data receiving units within layers 101 and 105.

System 100 may include a hierarchy of circuit-containing and/or circuit-supporting means such as: (1) mother boards or backplane boards (not shown); (2) daughter printed circuit boards (PCB's) which may removably plug into the mother boards or into other board receiving means; (3) multi-chip modules (MCM's) and/or (4) monolithic integrated circuits (IC's) which may be mounted on either or both of the mother and daughter PCB's. The illustrated PCB's may include so-called, line cards 110, 120, etc. and so-called, switch cards 160, 170, etc. The line cards 110, 120, etc. connect to out-of-system communications lines 111, 121, . . . , 1N1. The switch cards 160, 170, etc. may support a plurality of switch-matrix units 155 (and/or other cell-processing units) as shall be detailed below.

The hierarchy of circuit-containing and/or circuit-supporting means can additionally or alternatively include: main frames or shelves (e.g., 102, 106, etc.) which may respectively house one or more of the boards 110-170 as well as power supplies, cooling units, and other ancillary support systems. The specific number of boards and/or shelves used is not important here and neither are the specific numbers of chips (IC's) that are provided in each such circuit containing and/or supporting means. What is important, as will shortly become clearer, is that so-called, line-interface units 1119, 129, ... , 1N9 (embodiments of which are also referred to herein as ZINC chips) and so-called switch-matrix units 151, 152, ... , 15m (embodiments of which are also referred to herein as ZEST chips) may be physically distributed—within bounds of engineering reason—across a plurality of spaced-apart ones of the circuit-containing/supporting means and independently clocked so as to obviate the use of a single seed clock and/or an associated clock-tree across the whole system. The spacings between the circuit-containing/supporting means (e.g., 102 and 106) may be as much as several hundred meters in terms of lengths of optical interconnect fibers and/or electrical cables provided between the circuit-containing/supporting means. This allows for upward scaling of physical system size as well as capabilities.

The out-of-system traffic lines 111, 121, ... , 1N1 may be designed to carry high-rate ATM or TDM or IP traffic (Asynchronous Transfer Mode; Time Domain Multiplexing mode; and Internet Protocol respectively), where each traffic line is operating at a high rate such as OC-1 through OC-192 or higher or lower. Respective and incoming packets of a first ATM line or of another such traffic line may need to be switched from that traffic sourcing line (ingress line, e.g., 111) to a dynamically-assigned one or more destination lines (egress lines, e.g. 1N1). It is the job of system 100 to timely route cells (which cells are referred to below as ZCells) that carry the switched traffic within payload sections of the routed cells.

In terms of a broad functional overview, system 100 may be seen as comprising three basic layers: (a) a line-interfacing layer 101 having line-interfacing units, (b) a payload-processing fabric layer 105 (also referred to as in one embodiment as a switch fabric layer 105) having payload-processing units, and (c) a line-to-fabric interconnect layer 103 for allowing the line-interfacing units to distributively use the payload-processing units for processing of their respective payloads. As indicated above, various parts of the line-to-fabric interconnect layer 103 may have respectively different and/or variable latencies associated with them (due to different fiber lengths, changing temperatures and/or other factors). Payload traffic can flow from a payload source (e.g., 115) in first layer 101, through the interconnect layer 103, through one or a distributed plurality of intermediate processing units (e.g., 155) in fabric layer 105, and then back through the interconnect layer 103, and to one or a distributed plurality of destinations (e.g., 116) in layer 101. The line-to-fabric interconnect layer 103 acts as the conduit for the traffic moving distributively from layer 101 to fabric layer 105, and then back again to layer 101.

Resources of the switch fabric layer 105 are dynamically allocatable based on resource availability and priority of requests. Thus, in FIG. 1A we see that line-card generated REQUESTS for use of the fabric resources may travel from layer 101 to one or more parts of layer 105 by way of ingress-directed interconnect lines such as line 131a. (In one embodiment, the request density of ingress traffic moving on lines such as 131a may be characterized as zero, one, or more requests per cell (indicated as 'Requests≧0/ZCell'}.) Fabric-generated GRANTS for use of the requested fabric resources may travel from layer 105 to layer 101 by way of egress-directed interconnect lines such as line 132a. Dashed ingress line 131b and egress line 132b are typically the same lines as those respectively represented by solid lines 131a and 132a. They are shown separately so that their associated stimulus and response sequences can be more easily seen (that is, request, grant, sourced data, and processed data in that order).

After layer 101 receives a GRANT, it may send a corresponding, ingress payload (sourced payload) as indicated by dashed line 131b to layer 105. After receipt of the sourced payload 131b, layer 105 may process the payload in subsection 155, and then transmit the processed payload (destination payload) as indicated by dashed line 132b to layer 101. Of importance, various parts of line-interfacing layer 101 and fabric layer 105 may be independently clocked. Note the potentially-independent clocks: 117, 127, 1N7 illustrated in layer 101 and 157, 167, 177 illustrated in layer 103. Problems can emerge due to differences between effective clock rates. In summarized terms: if the sourcing end of a data flow is putting out data at a faster average rate than the maximum average rate that can be absorbed by a sinking end (downstream end) of the data flow, some of the too-quickly sourced data will eventually have to be dropped. Or stated metaphorically and more colloquially: if a faucet is dumping water into a bathtub at a faster average rate than that which can be swallowed by the sink pipe, then no matter how big the bathtub, eventually it will overflow and some of the sourced water will be lost. This summarized problem of a source outpacing a sink applies to: (a) REQUESTS 131a that are pouring out from independently clocked parts of layer 101 and into independently clocked parts of layer 105; (b) GRANTS 132a that are pouring back out from independently clocked parts of layer 105 and into independently clocked parts of layer 101; (c) ingressing payloads 131b pouring from layer 101 to layer 105, and (d) egressing payloads 132b pouring from layer 105 to layer 101. Before discussing these and related problems, we first describe system 100 in more detail.

The line-interfacing layer 101 (also referred to herein as the traffic ingress/egress layer 101) may comprise a plurality of N line cards (either virtually or physically) and, as introduced above, these line cards may be respectively denoted as 110, 120, ... , 1N0. The integer, N can be a fairly large number such as 32 or 64 or larger. Each of the virtual or physical line cards 110-1N0 may be associated with a respective, line-interfacing unit (e.g., ZINC chip), 119-1N9.

The switch fabric layer 105 may have a plurality of m switching units (separated either virtually or physically) and in similar vein these may be respectively denoted as 151, 152, ... , 15m. Integer value, m can be selected from a range of numbers such as 2 through 16 inclusively, or higher. Each of switching units 151-15m may be associated with a respective, virtual or physical, switch card such as the illustrated physical cards 160 and 170.

The line-to-fabric interconnect layer 103 may be merely a parallel-wired backplane for coupling the flow of traffic signals back and forth between layers 101 and 105. In a more typical configuration however, the line-to-fabric interconnect layer 103 comprises a plurality of high-speed electrical or optical transmission lines for carrying heavily-serialized, data signals between layers 101 and 105. The carried data is deserialized to one extent or another as it travels out of interconnect layer 103 and into one of layers 101 and 105. In such an arrangement, conversion means are provided for converting between a more heavily-serialized optical or electrical transmission scheme used at the core of line-to-fabric interconnect layer 103 and less-serialized electrical or optical transmission and processing schemes used in core portions of layers 101 and 105. FIG. 1A shows as an example of such a conversion means, a SERDES device 114 (SERializing and DESerializing unit) provided at a boundary between the line-to-fabric interconnect layer 103 and layer 101. The SERDES device 114 can be integrated partially or fully into the illustrated ZINC chip 119. In one embodiment, the SERDES device 114 is provided as one or more separate monolithic IC's that are adapted for handling the relatively high switching rates of the more-heavily serialized side of the transmission traffic. In a specific set of embodiments, the SERDES device(s) 114 is/are used for converting the serialization level of transmitted signals between a more heavily-serialized, 10 serial bits per character (10 bpc) transmission technique used at the core of interface layer 103 (which more heavily-serialized interface technique could use 2-wire differential pair transmissions) and a more-parallel, but still 10 bpc-encoded, transmission and processing scheme (typically nondifferential) used closer to core regions of line-interfacing layer 101 and of switch fabric layer 105. Deeper within the core regions of layers 101 and 105, a differently encoded, 8 parallel bits per character (8 bpc), signal transmission and processing scheme may be used. Although in one embodiment, the dividing lines between different chips and/or packagings is drawn such that 8 pbc/10 pbc code conversion occurs on the chips and/or in the packagings of the ZINC and ZEST units; while serialization/parallelization occurs on the chips and/or in the packagings of the SERDES units (e.g., 114), it is within the contemplation of this disclosure to move the dividing lines elsewhere. For example, code conversion between 8 pbc/10 pbc formats (or other formats such as, 16 pbc/18 pbc formats) may be carried out partially of fully on the chips and/or in the packagings of the SERDES units. Similarly, although in one embodiment, error checking and correction (ECC) in the 10 pbc code domain occurs on the chips and/or in the packagings of the ZINC and ZEST units; it is within the contemplation of this disclosure to have such error handling occur partially of fully on the chips and/or in the packagings of the SERDES units.

The use of the high-speed serialized optical and/or electrical (e.g., differential drive) communications within layer 103 allows for convenient, long-distance inter-card communications (e.g., at least across about 100 meters or less, if not over a few thousand meters) and for reduction of numbers of electrical wires or optical fibers between the cards so that, if desired, various ones of the line and switch cards can be conveniently located in different—and more importantly, independently clocked—housings such as shelves 102 and 106 which circuit support means may be furthermore independently powered, cooled and/or otherwise supported. If switch units/cards are distributed across two or more such independently supported shelves or other circuit support means; and one of the shelves (or other circuit support means) becomes inoperative (either intentionally because of routine maintenance or unexpectedly because of loss of a power supply, loss of cooling, etc.) then the switch units/cards in the still-operative other ones of the circuit support means can continue to provide service and the system 100(') can continue to remain functional. Thus overall system reliability is enhanced.

Additionally or alternatively, the use of the higher level of serialization in layer 103 allows the line-interfacing units 119, 129, . . . , 1N9 and/or the switching units 151, 152, . . . 15m to be conveniently located in one or more different shelves, or spaced-far-apart PBC's, or other forms of spaced, relatively-far-apart ($\geq 0.5$ meter) circuit-supporting/containing means, where the latter supporting/containing means may be independently clocked, do not need to be connected to a common clock-tree structure, and do not need to be sustained by common power supplies, cooling subsystems and/or so forth. This provides system designers with flexibility and many options for controlling system size, operating costs, and/or reliability by resorting to a variety of different system layouts.

Figure 3:
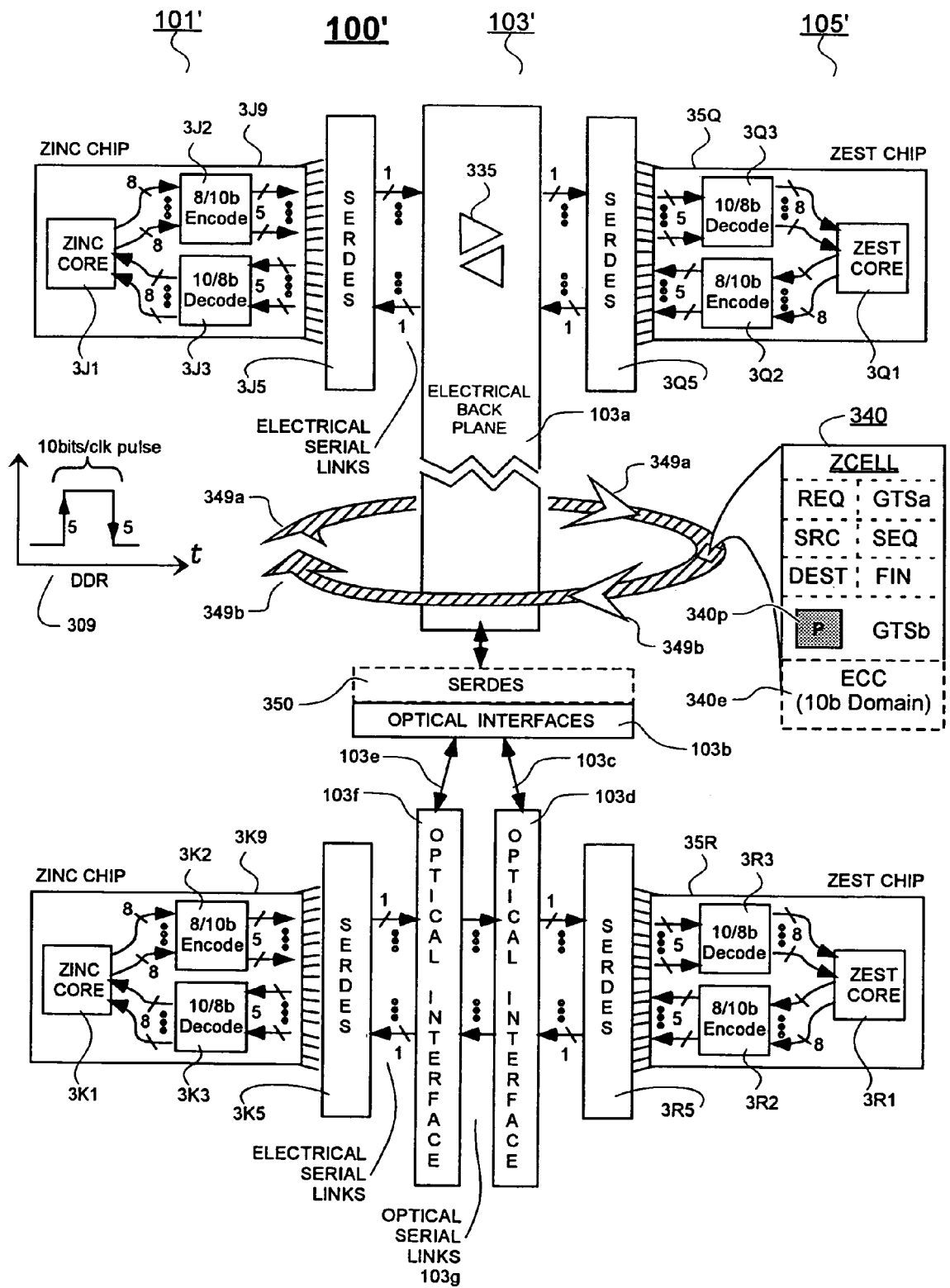
FIG. 3 is a schematic diagram showing possible embodiments for a serialized and asynchronous line-to-fabric interconnect layer of the system of FIG. 1.

Although the below-detailed FIG. 3 depicts the serialization and de-serialization functions of the SERDES devices as being carried out within the interface layer, it should be understood that the exemplary depiction does not preclude such SERDES devices from being physically placed on respective ones of physical line and switch cards. The depiction also does not preclude part or all of the serialization and de-serialization functions of the SERDES devices or of other transmission conversion means from being monolithically integrated into respective ones of the ZINC and ZEST chips as implied by 114 of FIG. 1A. Of course, if such monolithic integration is to be carried out, the latter ZINC and ZEST chips should use an appropriate high speed transistor or like technology for supporting the high frequency switching rates of the highly-serialized data streams. Code conversions such as between the 8 pbc/10 pbc or like coding domains may be carried out externally to the ZINC and ZEST chips even though one set of embodiments disclosed here has the code conversions being carried out in a monolithically integrated fashion within the ZINC chips (e.g., 119) and the ZEST chips (151). These variations concerning where the serialization and de-serialization functions should be carried out, and/or where the respective 8 pbc/10 pbc or like code conversions should be carried out, are within the scope of the present disclosure.

Referring to the exemplary configuration 100' shown in FIG. 3, and for purposes of initial comprehension, there is shown what appears to be a constantly circulating stream 349 of payload-and/or-control carrying signals that move back and forth between the line-interfacing layer 101' and the fabric layer 105' by way of the line-to-fabric interconnect layer 103'. The data-carrying signals 340 are referred to herein as ZCells. Actually, a same ZCell (340) does not necessarily circulate through the line-to-fabric interconnect layer 103' for carrying different payload data, control data and/or other items of data between the line-interfacing layer 101' and the fabric layer 105'. The line-interfacing layer 101' can asynchronously issue a respective set of ZCells 349a moving in the ingress-direction and the fabric layer 105' can asynchronously issue a different stream of ZCells 349b moving in the egress-direction. Because parts of layers 101' and 105' may be independently clocked, the asynchronously issued ZCells of ingress-directed streams (349a) might end up flowing at cells-per-second rates that are different from the rates of the egress-directed streams (349b). This can cause a rate-disparity problem for which solutions will be described below.

The ingress-directed and egress-directed payloads of each given line card, 110-1N0 may be carried within a respective payload or 'PDU' section 340p of the ZCells 340 moving in the respective ingress-directed and egress-directed streams, 349a and 349b. (See also 520 of FIG. 5A.) The payload-carrying section 340p may also contain an associated-with-payload Grant Time Stamp (GTSb) when the ZCell is moving in the ingress-direction 349a. The function of the GTSb stamp will be detailed below.

Each ZCell 340 may further include an Error Checking and Correction (ECC) field 340e which is designed for correcting transient errors that may occur as data of the ZCell 340 moves through heavily-serialized parts of the line-to-fabric interconnect layer 103'. In one embodiment, the ECC field 340e is structured to support DC-balanced and/or cell-framing and/or clock-recovering, asynchronous serial traffic flow through the line-to-fabric interconnect layer 103'. Because the highly-serialized, high-frequency optical and/or electrical transmission and conversion components in the line-to-fabric interconnect layer 103' tend to be susceptible to transient noise, and the bit rate tends to be high, there is a fair likelihood of experiencing an erroneous flip of a bit fairly often, but much less often than once per ZCell. For example, if the bit flip error rate of an optical portion of the serialized-link is about $10^{-9}$ flipped bits per second and the bit transmission rate is about $10^{+9}$ bits per second (1 Gbps), then the expected average error rate is about one flip per second. ECC field 340e should be specifically designed for at least correcting such serial-link induced, one-bit transient errors. The ECC field 340e may also be designed to function cooperatively in the clock-reconstructing, serialized domain (e.g., 10 pbc domain) found at the core of the interface layer 103. A detailed description of such an ECC field may be found in the above-cited, U.S. application Ser. No. 09/846,875 filed May 1, 2001 by Matthew D. Ornes, et al. which was originally entitled, METHOD AND SYSTEM FOR ERROR CORRECTION OVER SERIAL LINK.

Each ZCell 340 may further include logical source (SRC) and logical sequence number (SEQ) fields for respectively identifying a logical point of origin (which may be virtual rather than real) for the payload data and an order of payload (P) within the sequence of ingressing cells as may be originally seen logically or actually when the payload cells (P in section 340p) ingress through a given, source line (e.g., 111). Each ZCell 340 may further include either a Switch Request field (REQ) or a Grant field (which Grant field—see 514D of FIG. 5D for example—includes a pre-payload Grant Time Stamp (GTSa) field). One or the other of the Request and Grant fields is disposed in a shared field (see 514 of FIG. 5A) of the ZCell. The REQ field may be used for requesting a processing time slot for a given resource (e.g., a slice crossbar) within a switching chip (a ZEST chip). The pre-payload GTSa subfield within the Grant field may be used for identifying a future time slot for carrying out switching and/or other cell processing, where that future time slot is measured within the timing reference frame of a respective and independently clocked, switch fabric unit (ZEST chip) that gave the grant. A copy or derivative (GTSb) of the original GTSa field may be carried back to the same switch fabric unit/chip by a future ZCell, where that future ZCell also carries the payload 340p that is to be switched through (and/or otherwise processed by) the grant-giving one of fabric chips 151-15m at a time designated by the original GTSa field, where that designated time is defined within the time frame of the grant-giving fabric chip. The depiction of a ZCell 340 given in FIG. 3 is meant to be introductory rather than detailed. More detailed descriptions of fields that may be provided in ZCell 340 and of their respective functions will be given below, when we discuss FIGS. 5A-5F.

Referring again to the broad overview provided by FIG. 1A, it may be seen that each line-interfacing unit, such as ZINC chip 119, may be associated with a corresponding bidirectional traffic line 111. Line-interfacing units/chips 129-1N9 are similarly associated with respective traffic lines 121-1N1. If the bidirectional traffic line 111 is optical, then appropriate optical/electrical converting transducers and serializing and de-serializing buffer (SERDES) circuits (not shown) may be provided between the external traffic line 111 and its corresponding line card 110 and/or ZINC chip 129 for interfacing with the primarily electrical and more parallel circuitry of the line-interfacing chip.

For the illustrated case of line 111, that out-of-system traffic line is assumed to be carrying bidirectional ATM traffic. Corresponding ZINC chip 119 is therefore shown to include an ingress queue 115 for storing ingressing ATM cells and an egress queue 116 for storing egressing ATM cells. Each ZINC chip (e.g., 129, . . . , 1N9) may have a different traffic protocol associated with it (e.g., TDM or IP rather than ATM). It is also within the contemplation of the present disclosure to have a switching system 100 wherein two or more, or even all of the ZINC units/chips 119-1N9 operate under a same telecom protocol such as ATM, IP, TDM, or another such protocol.

Each ZINC chip (119, 129, 139, . . . 1N9) typically has a plurality of m ZCell egress ports and a same number, m, of ZCell ingress ports. Each port may be 5 parallel bits wide (optionally with DDR—Dual Data Rate clocking) or 10 parallel bits wide, or it may be more-serialized as appropriate. Typically, serialization down to a 1 bit wide ingress or egress stream (which could use 2-wire differential drive for its transmission) occurs at the boundary where the line-to-fabric interconnect layer 103 meshes with the ZINC chips. (See also FIG. 3.) Respective ones of the first through $m^{th}$ egress/ingress ports on a given ZINC chip (e.g., 119) should each couple by way of interconnect layer 103 to a respective one of switch fabric chips 151-15m. As already seen, each cell-processing chip 151-15m in the fabric layer 105 is also referred to herein as a ZEST chip (ZCell-based Enhanced Switch Technology chip). Each line-interface chip is similarly referred to as a ZINC chip (ZCell-based INterface Connecting chip). ZINC chip 119 on line card 1 connects, both ingress-wise and egress-wise, to each of fabric chips, ZEST 1 through ZEST m. In a typical system (100), ZINC chip 1N9 on line card N also connects, both ingress-wise and egress-wise, to each of fabric chips, ZEST 1 through ZEST m. Intermediate ones of the line-interfacing chips between 119 and 1N9 typically also each connect, both ingress-wise and egress-wise, to each of ZEST 1 through ZEST m. In a variation, some line-interfacing chips (ZINC's) may be hardwired to a fewer number of switch fabric units (ZEST chips) than are others of the ZINC chips.

Each ZEST chip (e.g., payload-processing IC 151) typically has a plurality of N, ZCell ingress ports and a plurality of N, ZCell egress ports, with each such port corresponding to a respective one of ZINC chips (line-interfacing IC's) 119 through 1N9. It is possible in alternate embodiments to have ratios of 2:1 or other ratios (which ratios are not 1:1) between the number of ingress ports per ZEST chip versus the number of line-interfacing ZINC chips and to also have non-1:1 ratios between the number of egress ports per ZEST chip versus the number of line-interfacing ZINC chips. But to keep things simple here, we focus here on the 1:1 ratio arrangement. Again, each ZEST port may be 5 parallel wires wide (optionally with DDR) or 10 parallel bits wide or it may be more-serialized as appropriate. Typically, serialization down to a 1 bit wide ingress or egress stream (which 1-bit serialization level could use 2-wire differential drive for its transmission) occurs at the boundary where the line-to-fabric interconnect layer 103 meshes with the ZEST chips. (See FIG. 3.)

A given ZINC chip such as 119 may try to selectively distribute parts of the data in its ingress queue (115) for approximately simultaneous processing by (e.g., switching through) all m of the ZEST chips 151-15m. If successful, such a distribution of payload processing work should provide that given ZINC chip (119) a with relatively maximal throughput of its ingress-direction payloads (the P's in the ZCells 340 the ZINC sends out) through the fabric layer 105. Alternatively, a given ZINC (e.g., 119) may request less-distributed processing (e.g., switched routing) of its ingress queue data through only one of its ingress-direction ports to just one of the ZEST units, say unit 152. This would give the ZINC a relatively minimal throughput of payload processing through the processing fabric layer 105. The reasons for this may be appreciated by quick reference to FIG. 4, which drawing will be discussed later below.

Referring again to FIG. 3, an important feature of the illustrated cell-distributing and processing system 100' is that it allows for the interposing between ZINC and ZEST chips of one or more transceivers and/or of different-length/speed links 335 as may be provided in the line-to-fabric interconnect layer 103'. This ability to interpose different-length and/or speed links 335 (which can result in differentiated and/or variable latencies through the line-to-fabric interconnect layer 103') allows system designers to conveniently position one or more of ZEST chips 151-15m outside an independently clocked shelf (e.g., 102 of FIG. 1A) that contains one or more of the ZINC chips 119-1N9 and/or to conveniently position one or more of ZINC chips 119-1N9 outside an independently clocked shelf (e.g., 106) that contains one or more of the ZEST chips 151-15m. In other words, the interposing of the interconnect layer 103' between the line-interfacing layer 101' and the switch fabric layer 105' allows the cell-distributing and processing system 100' to scale to larger sizes without being limited by how many line-interfacing chips and/or cell-processing (e.g., cell-switching) devices can be packed into a single shelf and without being constrained to clocking all shelves from a single clock seed and/or connecting all shelves to a common clock-tree structure. However, in providing this scalability option, some means should be further provided to help the ZINC chips and the ZEST chips cope with the variable signal-propagation latencies that may be created by the interposing of the interconnect layer 103' and its possibly diverse link lengths or delays. Some means should be yet further provided to help the ZINC and ZEST units cope with the possibility that the independent clocks of some of these units are running faster than the independent clocks of others.

In the exemplary embodiment 100' of FIG. 3, the line-to-fabric interconnect layer 103' may include one or both of an electrical backplane 103a (e.g., a multilayer printed circuit board or tapped bus cable) and some or all of optical linking elements 103b-103g. ZCells such as 340 can travel, during an ingress phase 349a, from a given, payload-sourcing ZINC chip (e.g., 3J9 or 3K9; where J and K are selected from the series 1, 2, ..., N) to a corresponding one or more ZEST chips (e.g., 35Q and/or 35R; where Q and R are selected from the series 1, 2, ..., m) by traversing through one or the other or both of the electrical backplane 103a and the optical link elements 103b-103g. Similarly, on a return trip or egress phase 349b, a given ZCell may travel from a respective ZEST chip to a designated one ZINC chip (assuming unicasting) or to a designated plurality of ZINC chips (assuming multicasting) by traveling through one or both of the illustrated electrical and optical pathways. As a result, the round-trip time(s) for a given payload (P, or multiple copies of multicast payloads) may vary depending on what pathways through the line-to-fabric interconnect layer 103' the corresponding, and payload-carrying ZCells took during their respective ingress (349a) and egress (349b) phases. The round-trip time(s) may also vary as functions of temperature, power supply conditions and other such factors. Control fields such as the GTS-a, SRC and SEQ fields of payload-carrying ZCells such as 340 may be used to compensate for the variable ingress and variable egress trip times of an embedded payload (P). The ECC field of each payload-carrying ZCell 340 may be used to detect and/or correct errors which might develop during passage of the ZCell signals through the line-to-fabric interconnect layer 103'.

In one embodiment, the ECC field is a 20-bit long, self-checking field that is organized for DC-balanced and/or clock-recoverable asynchronous transmission over serialized electrical and/or optical links. It provides single bit correction of error for other fields of the ZCell 340 after those other fields have been converted from an eight bits-per-character coding domain (8 pbc domain) to a ten bits-per-character coding domain (10 pbc). Accordingly, it is seen in FIG. 3 that a first ZINC chip, 3J9 includes a core section 3J1 that operates in the eight bits-per-byte coding domain. ZINC chip 3J9, however, includes a first 8-bit to 10-bit encoder 3J2 that transforms eight-bit characters into the ten-bits per character coding domain (10 bpc) for realizing DC-balance and/or clock-recoverability. The 8 pbc to 10 pbc conversion (3J2) and optional, subsequent addition of the ECC field (340e) should be carried out before the corresponding characters are serialized by SERializing and DE-Serializing unit (SERDES) 3J5. The ECC field 340e may be inserted as a fixed-parity, two-character addition (in the 10 pbc domain) to the ZCell during this transformation. Although 8 pbc to 10 pbc code conversion (e.g., 3J2) is frequently mentioned herein, it is also within the contemplation of this disclosure to use other forms of code conversion that allow for clock-recovery from, and maintenance of DC balance in, asynchronous signals. An example of such an alternate code conversion is the 16 pbc/18 pbc technique disclosed in the above-cited, U.S. Pat. No. 6,198,413. In one embodiment, although each transformed ZCell character is 10 bits wide, it is physically output from its respective port of the m egress ports of its ZINC chip (e.g., 3J9) as two 5-bit-parallel bursts on opposed rising and falling edges of each clock pulse. Such a DDR scheme (Dual Data Rate) is shown graphically at 309. Thus although each ZINC egress port of that embodiment is 5-bits wide, 10 bits of data are output per local clock pulse.

In one embodiment, the illustrated first SERDES unit, 3J5 of FIG. 3 may be provided on the line card of ZINC chip 3J9 for converting the less-serialized, ten-bits-per-clock-pulse (10 bpcp) signals into corresponding, and faster switched, one-bit serialized electrical signals before forwarding them into electrical backplane 103a and/or optical interface section 103b. In an alternate embodiment, the 10 bpcp signals can be transmitted as 5-bit wide DDR signals directly on the electrical backplane 103a, in which case the SERDES chip(s) would be positioned at dashed location 350 rather than solid-line positions 3J5 and 3Q5. The latter approach, however, would call for a greater number, per line card, of transmission lines on backplane 103a than does the more-serializing approach. If there are 16 ZEST chips and 64 line cards in system 100', then the line-to-switch layer 103' may be asked to support 16×64=1024 ZCell ingress pathways and a like number of egress pathways. If each such pathway calls for 5 lines, not counting clocks and other controls, that comes out to 2048×5=10,240 wires, each being locally clocked at 125 MHz, under a DDR regime that produces an effective data output rate of 250 Mbps (Mega bits per second). On the other hand, if the more-serializing approach is used, the pathway count can reduce down by a factor of five to 2,048 transmission lines (or wave guides) if nondifferential signaling is used or down by a factor of two and a half to 4,096 transmission lines if a differential-pair signaling is used. In the latter cases, the respective per wire, or per differential-pair, bit rate of the carried signals goes up five fold to 1.25 Gbps. That higher bit rate places greater stress on the designers of the backplane 103*a* to deal with RF problems. Intermediate, partial-serializing solutions, with or without use of differential-pair signaling, are also contemplated. For example, the number of wires on the backplane 103*a* may be doubled so that the per-line/pair bit rate can be halved to 625 Mbps. As another example, the number of wires on backplane 103*a* may be halved by use of multiplexing, but that would double the per-line/pair bit rate to 2.50 Gbps.

There are several reasons why use of more serialized data transmission in the line-to-fabric interconnect layer 103' is advantageous. First, such serialization helps to minimize potential skew at the destination end of the line-to-fabric link between the each of the bits in the groups of 5 bits depicted at 309 and also it helps to minimize potential skew between those bits and their respective clock edges (which edges are reconstructed at the destination end if asynchronous transmission is used). It can be difficult to other wise maintain close RLC matching between parallel lines of a long bus that carries the data in less-serialized form. Second, system reliability may be improved because there are fewer points of potential failure (e.g., a poorly mated, detachable connector) when a fewer number of wires and/or fibers are used. Third, the system can be made physically more compact because of the reduced number of physical wires and/or fibers and associated connectors and/or supports.

Continuing now with our tracking of signal flow in FIG. 3, after it is output from a ZINC chip such as 3J9 and it is made more serial by a first SERDES such as 3J5, the ZINC-to-ZEST ingress traffic (349*a*) continues from the intermediate layer 103' into a second SERDES unit such as 3Q5 or 3R5. Within the respective, receiving ZEST chip (35Q or 35R), a ten bit-to-eight bit decoder (3Q3 or 3R3) returns the received signal to the eight bits-per-byte coding domain and forwards the transformed data to the corresponding ZEST core (3Q1 or 3R1). ECC checking and correction is carried out before the 10/8 pbc decode. The 8 pbc version of the ZCell body may have one or more CRC fields that may be used for detecting multi-bit errors in their respective body parts.

The ZEST-to-ZINC egress path (349*b*) follows essentially the same set of operations in the reverse direction. In ZEST chip 35Q, an eight-to-ten bit encoder 3Q2 converts egressing ZCell signals into DC-balanced streams coded in the ten bit domain, and adds the 10 pbc-coded ECC field (340*e*), before forwarding them to a third SERDES unit 3Q5. The serialized signals are then passed through one or both of electrical backplane 103*a* and optical interface 103*b* for receipt by the SERDES unit (e.g., 3K5) of a dynamically-identified or statically-preidentified, destination line card. Within the corresponding ZINC chip (e.g., 3K9), the converted-to-parallel signals are transformed from the ten bit coding domain to the eight bits-per-byte domain by a decoder such as 3K3. From there they are forwarded to the ZINC core 3K1 for further processing.

In one embodiment, the local (outer-core) clock rate of each ZINC and that of each ZEST chip is independently clocked at about 125 MHz with an allowed frequency tolerance of about 0.04%. Each SERDES unit outputs a 1.25 Gbps stream per direction per port (125 Mbps×10 bpcp=1, 250 Megabits per second). The ZINC and ZEST chips each maintain their own internal, core timing structures. For one subset of embodiments, there are actually two, local core clocks per chip: an outer core clock running at about 125 MHz±0.04% and an inner core clock running at about 150 MHz±0.04%. Internal timing references of the respective ZINC and ZEST units are referred to herein respectively as a 'ZINC tick' and a 'ZEST tick'. The ZINC and ZEST chips also lock on to (e.g., via PLL's, DLL's, or the like), within their peripheries, the apparent clocks and apparent cell frames of 10 pbc-encoded asynchronous signals coming in from the interconnect layer 103'. As may be seen at 206 in FIG. 2A, for one embodiment, the average length of a ZEST tick may be programmably set to be slightly greater than the average length of a ZINC tick (see graph 202). The reason why this is done will be given when we return to discussing link-rate adjustment techniques used in FIGS. 1A and 1B.

We have already indicated that in one embodiment all the ZINC local outer clocks (e.g., 117, 127, . . . , 1N7) and the ZEST local outer clocks (e.g., 157, 167, . . . , 177) should be running at about 125 MHz each. But there 100 can be many such local clocks; for example, as many as N independent ZINC local clocks and as many as m independent ZEST local clocks. Because of local variations, even under tight tolerance, some clocks may be running comparatively slower or faster than others. Thus if all the streams of ZCell ingress traffic 135 into a given ZEST (e.g., 152) from all ZINC units are considered, the rate-disparity problem (rate creep-ahead) will be essentially guaranteed. Actually, the rate disparity problem is essentially guaranteed even if we have just two independently clocked circuits, one at the ZINC side and one at the ZEST side of an interconnect link. It is very difficult, if not impossible, to keep two independent clocks exactly at the same frequency and phase. As a result, at least some ZCell streams are probably being produced by ZINC's that are being clocked faster than the local clock rate of the receiving ZEST chip (152). Similarly, for the ZCell egress traffic direction, 136, at least some ZCell streams are probably being produced by ZEST's that are being clocked faster than the local clock rate (e.g., 127) of the receiving ZINC unit (129). So there is a rate disparity problem. Also, the internal frames of temporal references in the circuits at the opposed ends of the line-to-fabric interconnect layer 103 will generally be different. So there is a scheduling problem.

In one variation, the local timing references or local 'ticks' in each chip span an average time period of approximately 80 pulses of the local, outer-core clock of the chip (ZINC or ZEST). The span of one tick's worth of local clock pulses can vary from one locality to another, and/or it can vary over time, because the core and peripheral clocks of various ZINC and/or ZEST chips can be operating at slightly different frequencies due to a variety of factors including local temperature, power supply voltages, IC fabrication effects, and so forth. Aside from timing differences that develop due to differences in tick lengths (tick deltas), other forms of skew may develop between the starts or stops of processing in respective ZINC and ZEST chips because of different signal propagation times through different pathways in the interconnect layer 103 and/or because of different signal propagation times exhibited by same pathways at different times.

Referring to FIG. 1A, if the local clock (CLK1) 117 of a given ZINC chip (119) is running slightly faster than local clock (CLK3) 157 of a corresponding ZEST chip (151), it is possible that the corresponding ZEST may not be able to process a continuous stream of incoming REQUESTs (131*a*) from that more quickly-clocked ZINC fast enough because the maximum processing rate of the more-slowly clocked ZEST unit is being exceeded. Some requests may get dropped. In lay terms: water may be entering the bathtub faster than it can be drained out by the drain pipe, and as a result some of the water may undesirably spill out over the rim of the bathtub. More technically speaking, if corrective steps are not taken, the averaged-over-long-time rate of requests output by the request transmitter (119) may be greater than the averaged-over-long-time rate of requests that can be processed by the requests receiver (151) due to differences in clock frequencies or due to other rate-related factors. In certain circumstances, disruptive degradations to system performance may occur if the rate of incoming requests (131a) consistently outpaces the request-receiver's ability to handle them, and some requests end up being dropped. Grants will not be given to the dropped requests. As a result, corresponding payloads may not get processed by the fabric layer 105 as quickly as desired because the missing service-grants. Throughput through the whole system 100 may suffer significantly. So it is desirable to have a rate-control mechanism which assures that differences in the rates of the independent clocks (e.g., 117, 157) do not produce a rate overrun condition.

One, some-what unrelated technique for smoothing out workloads and reducing the possibility that request-senders may overwhelm request-receivers is disclosed in the above-cited U.S. application Ser. No. 09/847,711 filed May 1, 2001 by Onchuen (Daryn) Lau, et al, and originally entitled, MULTISERVICE SWITCHING SYSTEM WITH DISTRIBUTED SWITCH FABRIC. That technique involves a competitive distributing of requests to plural ZEST's so that the work loads of processing requests and switching subsequent payloads is distributed smoothly across the fabric layer 105. However, that technique does not eliminate the possibility that a given request-sender (ZINC unit) is being clocked faster than a given request-receiver (ZEST unit), and as a result, the request-sender will ultimately overwhelm the slower-clocked receiver. The present disclosure focuses on that further aspect of the problem, namely, the overflow that may be caused by rate-disparity conditions such as by the transmitter's clock running faster than the receiver's clock.

In one embodiment, each ingressing ZCell (147) can carry 1, 2, or more requests (>0 valid Requests/ZCell) in a valid request-carrying field of the ZCell. If a given ZEST detects that the incoming rate of valid request fields may be overwhelming its local, request-fields processing rate (see the ReqBPC controller 246 in FIG. 2A), that ZEST can dynamically and responsively send an active back pressure signal (see ReqBP signal 261d in FIG. 2A) to the corresponding ZINC in a corresponding flow (349b) of egressing ZCells. In response, the ZINC should reduce the effective rate of request fields it sends to the complaining ZEST. It may elect to redirect some of its requests to other ZEST units.

The dynamic back-pressure technique mentioned above solves the problem of excessive rates of incoming request fields overwhelming a slow-clocked ZEST chip. It does not, however, solve the rate-differential problem going the other way; where a faster-clocked ZEST is sending grants (132a) back to a slower clocked, source ZINC. Nor does it solve the rate-differential problem that occurs when a faster-clocked ZEST is sending egressing payloads (132b) to a slower clocked, destination ZINC. In one embodiment, both of the latter problems are simultaneously solved on a static basis by periodically inserting an idle state into the ZEST ticks (see graph 206 of FIG. 2A) and thereby constraining the effective ZCell-processing rates of all ZEST units, including the fastest-clocked one of such ZEST units, so that the averaged-over-long-time rates of even the fastest-clocked ZEST unit can be no faster than the averaged-over-long-time cell processing-rate of the slowest-clocked one of the ZINC units. Thus, in the illustrated embodiment 100, the rate disparity problem is solved by providing a combination of a static rate constraining mechanism operating on traffic moving in a first direction (egress) and a dynamic back pressure mechanism operating on traffic moving in a second direction (request ingress).

The data-flow tree shown in FIG. 1B is intended to provide an alternate way of explaining the rate-disparity problem and the combined static/dynamic way of solving it. (An alternate way would be to use dynamic back pressuring in both the egress and ingress directions.) Consider the set of six ingressing data flows respectively identified in FIG. 1B as IN-A, IN-B, . . . , IN-F. Respective queues such as 141, 142, etc., have been filled to one extent or another by the ingressing data flows with respective payload data units (PDU's) PA1-PAn, PB1-PBn, . . . , PF1-PFn (where n here is a generic and relatively large number not to be confused with the number of ZINC units). The queued PDU's are awaiting their respective chances to ingress into the switch fabric. They will catch passages out of respective ZINC units A-F by riding inside ZCells moving in the ingress-direction (ID), such as cell 145. These ID ZCells (e.g., 145) will carry requests-for-processing from each of ZINC units A-F to one or more of ZEST units G-K by way of respective ID interconnect lines 103ag through 103fk. Each of the independently clocked, ZINC units, A-F can decide for itself how many of the independently clocked, ZEST units, G-K, will be asked to accept and to process the queued-up payloads of the given ZINC unit (e.g., A). If grants are given and the requesting ZINC units receive the grants, the respective payload queues 141, 142, etc. will be discharged (on a basis of oldest-awaiting PDU going out first) and carried by further ID ZCells (e.g., like 145) for processing within the grant-giving ones of the ZEST units, G-K.

Let us follow more closely the data flow of the PDU's in queue 142 (which payloads are denoted as PB1-PBn) for showing by example, why independent clocking and/or variable interconnect latencies can cause rate disparity and scheduling problems. Assume that clock CLKb of ZINC B is running slightly faster than respective CLKj of respective ZEST J. Assume that ZINC B has elected to send a stream of requests to ZEST J by way of respective interconnect line 103bj. The requests will ask for switching of some of its PDU's, PB1-PBn to destination ZINC unit M by way of ZEST J. In response to receiving one corresponding grant, ZINC B causes dispatched payload PB4' to be one of the payloads that moves within a respective ZCell over interconnect line 103bj and through ZEST J while making its way over egress-direction line 103jm and to destination ZINC M. The post-switching (processed) payload, PB4" finally gets to ZINC M by riding inside an egress-directed (ED) ZCell such as 192.

Contrastingly, the same ZINC B may cause another one of its dispatched payloads, say PB1', to travel over interconnect line 103bg, then through ZEST G, and then through line 103gm to get to the same destination ZINC, M. And as further indicated in FIG. 1B, ZINC B may cause yet another of its dispatched payloads, PB3' to travel over interconnect line 103bh, then through ZEST H, and then through line 103hm to get to destination ZINC M.

While the illustrated ZEST units, G-K are receiving and granting requests associated with IN-B payloads, PB1 through PBn, the same ZEST units, G-K may also be simultaneously receiving requests and giving out grants for the processing of payloads of other data flows, such as for the illustrated PC4' moving on line 103ch into ZEST H or such as for further payloads PE1' and PFn' shown to be moving over respective lines 103*ek* and 103*fk* into ZEST K. If ZINC C asks ZEST H to move processed payload PC4" out over ED line 103*hm* to ZINC M, that PC4" payload should not be allowed to use line 103*hm* at the same time that the processed PB3" payload uses line 103*hm*. One of the respective requests from ZINC's B and C should be awarded an early time slot for using line 103*hm* while the other will have to try for a later time slot. A problem associated with the provision of independent clocks (CLKa-CLKm) is that of determining when exactly each time slot begins and ends for allocated use of transmission line (e.g., 103*hm*). It will be seen that this and other problems may be solved by using of a time stamp (GTS) which references a specific time span (tick) within the time frame of a corresponding ZEST unit.

Processed payloads such as the illustrated PB1" (on line 103*gm*), PB3" (on 103*hm*), PB4" (on 103*jm*) and PB1" (on 103*km*) are received into destination ZINC M from respective ZEST units G, H, J, K and others (not shown—e.g. the one that processes PB2'). We have already assumed that CLKj of ZEST unit J is running slower than CLKb of ZINC B. Let us further assume that CLKm of ZINC unit M is running slower than respective clocks CLKj, CLKh, CLKJ, CLKk, etc. of respective ZEST units G-K-etc. And let us assume moreover that CLKk is the fastest of the ZEST-driving clocks. Corresponding ZEST unit K may therefore be pushing processed payloads (e.g., PB6"-PFn") into slow-clocked, ZINC M at an averaged-over-time rate that is greater than the maximum average rate that slow-clocked, ZINC M can handle such processed payloads. The same may be true for the egress-direction outputs 103*gm*-103*jm* of illustrated ZEST units G-J. To phrase it colloquially, the faucets G-K that are feeding sink M, may be doing so at averaged-over-time rates that exceed the long-haul average rate at which sink M can drain such fast-moving of a flow. This is not to be confused with the per m-Tick 'volume' of flow that sink M can swallow in single one of its local 'ticks'. Sink M should have been designed to swallow at least one payload from each of the available ZEST's (G-K-etc.) in each of its local, m-Ticks. The problem is not one of handling the width of a received flow, or a burst of such flow, but rather that coping with an excessively high, average rate of flow over a relatively long time. If the latter factor is more than ZINC M can handle, then no matter how large the internal buffers of M are made, eventually they will overflow.

One solution, but not the only solution, is to place a static set of rate-limiting clamps on the output of all the ZEST units (G-K-etc.) such that the effective, average output rate of the fastest-clocked ZEST is guaranteed (providing system specifications are complied with) to be no faster than the effective and over-long-haul average, input-processing rate of the slowest-clocked one of the ZINC units (e.g., M). Referring to box 107, if such a static rate clamping is provided, three problems are solved in one fell swoop without having to resort to the complexities of a dynamic back 15 pressuring mechanism or another dynamic control mechanism (e.g., token exchange, see FIG. 7B). First, the Payloads Egress rate (PE rate) is guaranteed to not outpace the ability of the slowest-clocked one of the ZINC units (e.g., M) to absorb such a payload rate because the ZEST outputs are statically clamped. And since grants move from ZEST's to ZINC's over the same egress-direction lines, the grants-giving rate of the fastest-clocked ZEST is guaranteed by the static clamping to be no faster than the effective grants-processing rate of the slowest-clocked one of the ZINC units. Moreover, because ingress-direction payloads (e.g., PB4') do not get dispatched over a given link faster than the grants given for them over that link, the static clamping mechanism indirectly guarantees that the ingress-directed, payloads-dispatching rate (PI rate); where payloads move from a relatively fast-clocked ZINC and over that given link to a corresponding ZEST, will be no faster than the effective payloads-processing rate of the corresponding ZEST unit. Thus, as indicated by concept box 107, the placing of the rate-limiting static clamps on the outputs of all the ZEST units solves the rates-disparity problems for: (a) the PE rate (payload egress rate), (b) the Grants rate, and (c) the PI rate (payloads ingress rate).

In one set of embodiments, the static rate-limiting clamps on the outputs of all the ZEST units is implemented by the periodic, forced insertion of an idle state into the sequential processing states of each ZEST unit. Each ZEST can be made to output an idle bite 193 for each of its respective and periodically invoked idle states. (The term 'bite' is defined later below as an interconnect-compatible character.) Other approaches may be used for statically limiting the effective payload and grant output rates of the ZEST units G-K. For example, each ZEST may alternatively output an additional sync bite for one or more of its respective idle states. Alternatively, the size of the ZCells output from the ZEST's (G-K) may be dynamically modulated to increase the period of the ZCell and thereby reduce the effective cell output rate. The extra bits in the elongated ZCell may provide additional functions as may be desirable for a given system. A disadvantage of using ZCells with dynamically changing cell size is that such variability in cell size can unduly complicate the circuits which frame the ZCells and provide error correction for the ZCells.

Another static clamping option is to specify outer-core clock frequencies for all the ZEST chips which are lower than the outer-core clock frequencies for all the ZINC chips. That too would statically guarantee that no ZEST chip can outpace a ZINC chip if system specifications are adhered with. A disadvantage of using two or more different clock frequencies is that system manufacturing costs would tend to increase and maintenance logistics would be overly complicated. It is much easier to have one clock frequency specified for the outer cores of all chips in the system.

An alternate approach for clamping the output rates of the ZEST units could be to try and dynamically send back-pressure bits 196 from the outpaced ZINC M unit to respective ones of ZEST units G-K in response to the ZINC M unit detecting that outputs from corresponding ones of the ZEST units G-K are outpacing the maximum, average intake rate of the ZINC M unit. One problem with such a dynamic approach however, is that the ZEST units G-K do not directly control the rate of traffic flowing through them. Instead, it is the upstream ZINC units A-F that do so. A method would be needed for directing the back-pressure flag to responsible ones of the upstream ZINC units A-F.

Although, back pressure bits 196 are not used for limiting ZEST output 'rate' in the illustrated embodiment 100', such back-pressure bits 196 may nonetheless be used for limiting ZEST output 'volume'. If overflow threshold limits are crossed in buffers of the receiver 195 (traffic manager unit) of the output 194 of the ZINC M unit, then the ZINC M unit may convey corresponding back pressure bits 196 to all the ZEST's (G-K) that feed it to let them know that the outflow device (traffic manager unit 195) is not coping with the outflow 'volume' it is receiving. In such a case, the ZEST's (G-K) may temporarily elect to give preferential grants for outflows (payload egresses) to outflow devices (line cards) other than the backing up one. This temporary 'surge' solution is not to be confused with the 'persistent' rate problem that comes about from having an independent, local clock (e.g., CLKk) of one ZEST unit persistently outpacing the independent, local clock (e.g., CLKm) of a ZEST unit.

Referring to FIG. 1A, the insertion of the so-called 'idle bites' every so often into the egress cell traffic flow 138 is shown at 148. It may be used to guarantee, in systems that specify a consistent outer-core clock frequency (e.g., 125 MHz), that the effective ZCell output rate of the fastest-clocked one of the ZEST chips 151-15m is no greater than the on-average, acceptable, ZCell input rate of the slowest-clocked one of the ZINC chips 119-1N9. The term 'bite' refers herein to a character as encoded in the 10 pbc or like domain (e.g., 18 pbc) of the core, serialized part of the line-to-fabric interconnect layer 103. It is within the contemplation of this disclosure that the term 'bite' can alternatively refer herein to another kind of interconnect-compatible character such as, for example, one encoded for DC balance and clock recovery but using a character space that calls for 18 bits per character. The term 'byte', by contrast refers to a character as encoded in the 8 pbc or like domain (e.g., 16 pbc) of the cores of the ZINC and ZEST chips. It is within the contemplation of this disclosure that the term 'byte' can alternatively refer herein to another kind of core-compatible character such as, for example, one encoded using a character space that calls for 9 bits per character. Another could use 16 bits per character, which is encoded to 18 bits per character when serialized into an asynchronous stream.

In one embodiment, each idle bite is coded as the K28.0 character. Two synchronization bites which precede the idle bite in the ZEST-to-ZINC traffic stream 138 are coded as either one or both of the K28.5 and K28.1 characters. The bit sequences of the K28.0, K28.5 and K28.1 characters may be defined as established by the above-cited, Fibre Channel Physical and Signaling Interface industry standard.

For purposes of a simple concrete example concerning periodic idle states, assume that frequency variation tolerance between the independent clocks (117-177) of system 100 is allowed to be as high as 5%. In such a case, one should insert at least one idle bite into egress stream 138 after each set of 20 other bites. This way, the effective data output rate of the fastest-clocked one of the ZEST chips is guaranteed to be equal to or less than the maximum acceptable, data input rate of the slowest-clocked one of the ZINC chips. In a more realistic case where the allowed frequency tolerance of about 0.04%, we can insert as few as one idle bite into egress stream 138 after a large number of other bites, say one idle bite for each set of 320 other bites. This forces the fastest-clocked ZEST chip to have an effective cell rate that is about 0.31% (=1/320) below the cell rate of the median clocked one of the ZINC chips; which is clearly a greater margin of safety than that called for by the allowed frequency tolerance of about 0.04% of that embodiment. In the case where each ZCell is 79 bites long; and 2 sync bites are inserted after every pair of ZCells, the 1 for 320 idle insertion rate works out to inserting an idle state once after every four ZCells (4×(79+1)=320). Insertion of idle bites and/or other non-data bites (e.g., sync bites) between ZCells at other repetitions rates is, of course, possible in accordance with the above stated objective of the idle states insertion process. Specifying of different, nominal clock frequencies is also possible as an additional or alternate way of providing static rate clamping.

Not all ZINC or ZEST chips of system 100 have to be independently clocked as might be inferred from FIGS. 1A-B. Those drawings merely depict a worst case possibility. It is not only often possible, but usually desirable for ZINC or ZEST chips of a same backplane or of a same shelf to share a common seed clock (e.g., CLK1) so that all such closely-contained chips can run at the same frequency. Use of 2 or more independent clock generators (e.g., 117 and 157) becomes desirable when the design requires spaced-far-apart shelves or like spaced-far-apart circuit-containing/supporting means. If the entire system 100 is in a same shelf, then the asynchronous interconnect layer 103 may be dispensed with, the SERDES devices such as 114 may be omitted, and the sync and idle bites (148) may be programmably turned off since there is no longer a need for them.

Given that insertion of idle bites (in a system that includes independently clocked ZINC's and ZEST's) guarantees the rate-disparity problem will not to occur in the ZEST-to-ZINC egress-direction (136, 138), the problem of preventing a faster-clocked transmitter from overwhelming a comparatively, slower clocked receiver; simplifies to one of compensating (link-rate adjusting) for rate creep 135 in the ZINC-to-ZEST ingress-direction (135, 137) for requests. Note that concept box 108 of FIG. 1B is the ingress-direction counterpart to concept box 107. Concept box 108 shows that the independently clocked rate of incoming request fields can be a problem for more slowly-clocked ones of the ZEST units. As seen in depiction 147 of FIG. 1A, for that illustrated embodiment, no idle bites are inserted in the ingress-direction ZCell flow. Instead, a number of other steps are taken to prevent rate-caused, buffer-overflow in the egress flow-receiving ZEST-chips. One of these steps is the inclusion in the egress-direction 138 of back-pressure flags (BP) sent in ZCells moving from the request-receiving ZEST chips to the request generating ZINC chips to let the ZINC chips know that a particular ZEST chip (e.g., 152) is being overwhelmed (135) with a beyond-threshold rate of incoming request fields. (The threshold may be programmably established, and empirically varied to comply with system specifics.) In response to the back pressure flags, the alerted ZINC chips can ease the situation by electing to redirect their requests to others of the ZEST chips (e.g., 151 and 15m).

Referring to FIG. 1B, and explaining the dynamic rate constraint mechanism from a slightly different angle: it may be seen from FIG. 1B that the one rate-disparity problem not covered in concept box 107 is that of average rate of request-carrying ZCells flowing from independently clocked ZINC units (A-F) to independently clocked ZEST units (G-K). In fact, the static clamping down (193) on the effective processing rates of the ZEST units (G-K) essentially guarantees that there will be rate disparity problem going the other way, as requests are persistently pumped from ZINC's to ZEST's. Concept box 108 indicates that a separate mechanism may be used to deal with this problem. Each ZEST unit (G-K) may include a means for detecting when the average effective rate of valid request-carrying fields coming in from a specific ZINC unit (e.g., ZINC D) is outpacing the ability of that ZEST unit (G-K) to capture and process such valid request-carrying fields. Request back pressure controller (ReqBPC) 246 of FIG. 2A represents such a means. It will be further discussed below. For the overview purposes of FIG. 1B, it is sufficient to understand that back pressure bits 146 may be issued from a given ZEST (e.g., J) to a corresponding ZINC (e.g., D) in response to detection of an excessive average rate of incoming request fields. The corresponding ZINC (e.g., D) may then responsively elect to send some of its requests to other of the ZEST units (G, H, K-etc.) and may by such redistribution of job loading, reduce the average effective rate of request fields coming into a relatively, slowly-clocked one (J) of the ZEST units (payload processing units).

Still referring to FIG. 1B, there are two additional problems that arise from the use of independently clocked, ZINC and ZEST units and from the use of an line-to-fabric interconnect layer 103 that allows for variable transmission latencies. One of the problems is that there is no fixed timing reference within which payload-processing may be scheduled. The solution, briefly, is to have each ZEST unit perform scheduling according to its own, local timing reference. This will be discussed in greater detail below. The third problem which FIG. 1B elucidates, is that of payload ordering at the destination end of the data flow.

For understanding the payload ordering problem, again consider the IN-B data flow and its original sequence of payloads: PB1, PB2, PB3, etc. as shown within buffer 142. In getting to destination ZINC unit M, first payload PB1 experiences the cumulative effects of the signal propagation delays of ID line 103*bg*, the possible delays of buffering within the ZEST G unit, and the signal propagation delays of ED line 103*gm*. By contrast, third payload PB3 experiences the signal propagation delays of ID line 103*bh*, the possible delays of buffering within the ZEST H unit, and the signal propagation delays of ED line 103*hm*. Second payload PB2 may experience cumulative signal propagation delays that differ from those of PB1 and PB3 by a finite maximum amount, say 1 to 8 ticks as measured in the timing reference provided by the CLKm clock of the destination ZINC unit M. The same problem of variable signal propagation delay may apply to others of the originally-ordered payloads, PB4-PBn of the IN-B data flow.

In many circumstances (but not necessarily all) we would like to have the same order in outflow OUT-B emerging on line 194 of the destination ZINC unit M. However, as shown in the time versus payload graph at 109, processed payload PB1" may arrive at ZINC unit M in a second tick of ZINC M while payloads PB2"-PB4" arrive in an earlier, first tick, and while PB5" arrives in a later, third tick, and so forth. One possible method for reordering the payloads arriving in a destination ZINC unit such as M will be detailed when we discuss FIG. 6. For now it is to be pointed out that even a small timing variance of one clock pulse can delay the effective arrival of a payload at the destination (M) by an additional full tick as measured in the destination (M) because of the boundary-crossing effect. Consider ZCells 191 and 192 which may be respectively carrying PB1" and PB2" in the egress-direction. Assume that due to insertion of an idle bite (193) just before it arrives, ZCell 191 does not finish arriving until after a boundary 190 for a next local m-Tick is crossed in ZINC unit M. On the other hand, because an idle bite (193) is not interjected into its stream just before it arrives, ZCell 192 manages to complete its arrival into a receiving buffer (not shown) of ZINC unit M just before the boundary 190 for local m-Tick number two is crossed in ZINC unit M. As a result of this one clock cycle differential, payload PB2" is deemed to have arrived during m-Tick number 1 while PB1" is deemed to have arrived during m-Tick number 2. The question raised for later consideration is how many m-Ticks might separate the effective arrival times of what were originally, adjacent payloads such as PB1 and PB2. If the answer is a very large number, that may result in the need for a fairly large re-order queue (e.g., 685 of FIG. 6). On the other hand, if the maximum spread at the destination site (ZINC M) between originally-adjacent payloads (e.g., PB1 and PB2) can be kept fairly small, that can help to reduce the size of the re-order queue.

There other ways in which queue size can be minimized and the costs of the implementing hardware (particularly parts that are to be crammed together into a common, monolithic integrated circuit) can thereby be advantageously reduced. Referring to FIG. 2A, one technique used for minimizing queue depth is that of not-storing invalid-payload data and/or invalid-request data in receiving buffers of ZEST chips. ZCells such as 240 that are ingressing on line 231 into ZEST unit 253 preferably include a payload valid bit (PDU valid, see 521 of FIG. 5A) within a payload-carrying section of such cells and/or one or more request valid bits (e.g., 551, 555 of FIG. 5B) within request-carrying sections of such ZCells 240. Valid state detecting circuits such as 227*a* and 227*b* are preferably provided (see also 227" of FIG. 2C) within the receiving circuitry of each ZEST and/or ZINC chip for detecting whether request, payload or other data covered by a respective valid bit or field, is valid or not. (For simplicity sake, only two valid detection circuits 227*a*, 227*b* are shown for the case of ZEST chip 253 and more specifically for FIFO 247*a* which receives ingressing request traffic from line 231 and for FIFO 247*b* which receives ingressing payload traffic from line 231. It is understood that essentially the same functionality should repeat for all input-receiving FIFO's (e.g., 247*c*, 247*d*, etc., not shown) and all respective ingress lines of the ZEST as well as other ZEST's and for all egress lines of the ZINC chips and their respective FIFO's (e.g., 267*a*, 267*b*, etc.).) If a respective valid bit indicates that its corresponding data section (request or PDU) is invalid, then a disabling signal is sent along a line such as 228*a* or 228*b* to the enable terminal (EN) of the respective data-receiving buffer (e.g., requests-receiving FIFO 247*a*, payloads-receiving FIFO 247*b*) to prevent the respective, invalid input data from being loaded into the buffer (FIFO). Storage space within the buffer (e.g., FIFO's 247*a*, 247*b*) and/or subsequent data-storing queues (251 and 254) may therefore be conserved because invalid data is not being storied in such spaces. Moreover, the not-stored, invalid data is thereafter not considered—even briefly—by subsequent processing circuits (e.g., 252, 255) and that helps to speed processing along. In cases where at least some of the incoming ZCells 240 have their valid bits set to false for payloads or requests, the effective ingressing, payload or requests rate for the receiving chip (e.g., 253, ZEST chip-3) is reduced. This is a further way of preventing a fast-clocked source (ZINC chip 219) from overwhelming a slower-clocked receiver (e.g., ZEST chip 253).

As can be seen from the more detailed view point of FIG. 2A (at 207, 217, 257) local clock rates of different source and destination chips can vary due to local factors such as local temperatures, local power supply voltages, variations in manufacture of local components (e.g., crystals of the local clock seeds), etc. Even slight variations in local clock frequencies or phases can have significant impact on when a given round of requesting activities, granting activities, and payload processing activities is resolved. By missing just a single clock cycle, a given ZCell (e.g., 191 of FIG. 1B) may miss coming in before a given processing boundary (190) and because of that the ZCell's passenger(s) {requests and/or payload} may be relegated to being processed at a significantly later time.

Consider more specifically that the round-trip experience of a to-be-routed payload (PDU of ZCell 240) typically includes synchronized processing under up to three or more independent clocks; namely those of the source ZINC unit, the processing-fabric ZEST unit, and the destination ZINC unit. The round-trip experience can also include the variable latencies associated with plural transports through the line-to-fabric interconnect layer 103 as the payload moves between source and destination. More specifically, consider a payload that is output from a first ZINC chip 219 (whose outer-core is clocked by CLK1 generator 217). That sourced payload (211) may be serialized and asynchronously transported across ingress link 231 as it moves to ZEST unit253. The transported payload is then de-serialized for processing internally within ZEST chip 253 (whose outer-core is clocked by CLK3 generator 257); and after being switched, the payload is then serialized and asynchronously transmitted by way of egress link 238 to a destination ZINC chip different from the source ZINC (say destination ZINC-5, which is clocked by CLK5 generator 207). The latencies which such a round trip involves can vary significantly, depending on line lengths and delays encountered in the line-to-fabric interconnect layer 103 at given times, as well as missed processing window boundaries (190) in the switch fabric layer 105 and/or missed processing window boundaries in the line-interfacing layer 101.

Referring to a first, time-versus-bit-presence graph 201 included in FIG. 2A, consider a two-bit signal being output by an in-ZINC register 213 at approximately first time point, $t_{01}$. Because register 213 is clocked by the CLK1 source 217, the initial 2-bit sequence has a period of T1. Link-line driving unit 214 outputs the 2-bit sequence information onto interconnect link-line 231. In so doing, the link-line driving unit 214 is understood to perform various link interfacing functions such as converting from the 8 pbc coding domain to the 10 pbc coding domain, adding an ECC field and further serializing the signal before outputting it onto link line 231. For illustration sake, the two output bits are assumed to both be logic 1 and the asynchronous signaling method is assumed to be a simple return to zero method (RZ). The 8/10 pbc encoding performed by unit 214 tries to maintain a DC balance over a long sampling period that contains T1 as a small subpart of it. Because ingress line 231 can be of variable length and/or can have variable signal propagation delays at different times, there is a variable transmit latency associated with the span from $t_{01}$ until second time point, $t_{02}$, at which latter point the 2-bit signal arrives in receiving unit 224 of ZEST chip 253. The 10 bpc version of the received signal is coupled by way of path 225 into a phase-locked loop (PLL) 245 or into another clock recovering mechanism. There, the ZINC-side CLK1 frequency, $f_1$, is re-established in the recovered clock signal 245o (CLK2) output by the PLL 245. The recovered clock signal 245o is fed into a sampling register such as 244 or an equivalent sampling means such that the bits of incoming signal 225 can be appropriately framed and sampled.

The recovered clock signal 245o or its equivalent is also fed into data-writing stages of respective FirstIn/FirstOut buffers (FIFO's) 247a and 247b or like interfaces. Such interfaces (247) are typically provided for transferring synchronous data between independently clocked circuits; which in this case are the circuits because clocked by the CLK2 signal (245o) and the CLK3 signal (258). In the illustrated example, request fields from received ZCells are routed to FIFO 247a while payloads are routed to FIFO 247b. The output stages (data-reading stages) of FIFO's 247a,b are in effect clocked by the local CLK3 signal 258. (Actually, the read-outs from FIFO's 247a,b are clocked by the local ZEST tick signal 256o, whose counter 256 is in turn clocked by the CLK3 signal 258.) Due to possible variances, the recovered clock signal 245o (CLK2) can have a slightly different frequency, $f_2$ and a slightly different phase, $\phi_2$ than the corresponding $f_3$ and $\phi_3$ of the ZEST-core, clock signal,

258 (CLK3) Because of the variations possible in frequency and phase, the sampling periods, T3, of the data reading stages of FIFO's 247a,b may shift and stretch or shrink such that, at times, the FIFO-output, sampling windows; represented by T3 are one signal pulse ahead, or one signal pulse behind, relative to where they were just a short while before along the timing frame of the recovered clock signal 245o (CLK2). FIG. 2A shows a worst case situation where the sampling window T3 of FIFO outputs such as 250a, 250b have managed to shift to crossing closely with the threshold points of rising signal-strength edges of recovered clock signal 245o (CLK2). Here, there is danger that a back edge of a given request (250a, 259a) or of a given payload (250b, 259b) coming through FIFO's 247a,b may extend just-barely—by as little as one bit period—across a boundary between two ZEST ticks and may thereby suffer an added latency of one ZEST tick. (about 80 beats of the CLK3 signal) due to that slight phase shift.

The respective, request and payload data outputs, 250, 259 of FIFO's 247a, 247b respectively feed into request queue 251 and payloads-aligning queue 254. Because of the various delays that a ZCell (240) can encounter from the time it is launched from a ZINC chip (219) until its valid data is output by a FIFO such as 247a and/or 247b onto a respective, ZEST core line such as 250a or 250b, the ZCell may arrive before, after or during various, synchronous processing windows developing within the receiving ZEST chip, as has already been alluded to above in the discussion of frequency and phase differences possible between the CLK2 and CLK3 signals.

More specifically, the ZINC-to-ZEST latency of a core signal such as 250a, which is output by FIFO 247a, can change from system to system, and/or over time within a given system, due to the variable length and/or variable propagation delay of link 231 and/or due to dynamically-changing, data throughput latencies in FIFO's 247a,b. Request portions of the received, sampled and resynchronized, core signals such as 250a, if there are any such valid request portions, are stored into the request queue 251, as already mentioned. (Non-valid request data is preferably not stored and is not counted by a request back pressure controller 246.) Payload sections of similarly received, sampled and resynchronized, core signals 250b, if there are any such valid payload sections, are stored into the payloads align queue (AQ) 254, as already mentioned.

The signal receiving, sampling and resynchronizing structures described so far (224, 244, 245, 246, 247a,b) are provided for handling requests and payloads sent over just one of many ingress links, namely, the input 231 from first ZINC chip 219. Each receiving ZEST chip such as 253 generally has many copies of the described ingress link (231) and its associated signal receiving, sampling and resynchronizing structures (224, 244-247a,b). Each of the latter copies, supplies its respectively received, sampled and resynchronized input signal into the request queue (RQ) 251 and/or the align queue (AQ) 254 by way further lines 259a,b as is indicated in FIG. 2A. The signals on core lines 250a, 250b, 259a, 259b have respective, and usually different, transmit latencies associated with them. Even if they (ZCells 240) were all launched from the line-interfacing layer 101 at the same time, they can often emerge at different times on respective ones of core-receiving lines 250a-b, 259a-b.

Within ZEST chip 253, there is an important timing window which has already been referred to herein, namely, the 'ZEST tick'. A tick-window counter 256 may be provided in chip 253 and operated in synchronism with the local CLK3 signal 258 to define the local tick window. Such a tick-window counter 256 generates one or both of a local tick-start signal and local tick-end signal as is indicated in the signal-strength versus time graph at 206. In one embodiment, the span of a ZEST tick is, on average, 80.25 pulses of the CLK3 signal. The ZEST tick window span (206) varies depending on whether an idle state is to be inserted for causing an idle bite to be included in the egress signal (238) or not. If not, then the ZEST tick can be 80 CLK3 pulses long (in the case of a 79 bite ZCell). If yes, then the ZEST tick can be 81 CLK3 pulses long. Given that in the illustrated embodiment there is one idle bite inserted for every set of 4 ZCells, the average ZEST tick span works out to be 80.25 pulses of the CLK3 signal. Of course, other lengths for ZEST ticks may be used in different embodiments as may be appropriate for statically constraining the effective ZEST output rates and/or for controlling pipelined actions carried out within ZEST chip 253.

At the start of a given ZEST tick (206), a certain number of requests will have been received (224), sampled (244), resynchronized (247*a*) and stored into request queue (RQ) 251. These already queued requests (251) are taken into consideration by a request arbitrating processor 252 during each successive ZEST tick. The requests which are taken into consideration are allowed to compete with one another for a limited number of grants (261*a*). Requests which do not quite make it into the request queue 251 before the start of a given ZEST tick do not get to compete in the arbitration round (252) of that given ZEST tick and thus they may have to wait as much as the span of a ZEST tick (if not more) before getting a chance to compete for and win a respective grant from the ZEST chip 253. Accordingly, the one-bit variable sampling latency depicted in graph 201 can factor into an additional loss of 80-81 CLK3 pulses or more, if the corresponding request does not make it into the request queue 251 on time. Requests that do not win a grant within one arbitration round, can remain within the request queue 251 to try again in a next round (next ZEST tick). After a predetermined amount of aging, the oldest requests are purged from the request queue 251. In one embodiment, requests are allowed to age up to six ZEST ticks and are then purged.

In one embodiment, each ingressing ZCell (240) can carry no valid requests, 1 or 2 valid requests. The effective rate at which valid request fields can ingress into a given ZEST chip may therefore vary as a function of the average request validity density in the incoming ZCells (240). The illustrated request back-pressure controller (ReqBPC) 246 keeps track of the number of valid request fields that are being saved into, and accumulating in the requests-receiving FIFO 247*a*. If a programmably-established, overflow-warning threshold of the requests FIFO 247*a* is reached, and/or the ReqBPC 246 detects that an inordinate number of ZCells (240) are coming in with full validity densities of requests (2 or more per ingressing ZCell), the ReqBPC 246 may responsively set a request back pressure flag 261*d* in egressing ZCells to an active state, thereby warning ZINC units that are getting grants back from that ZEST unit that they should instead begin directing a greater portion or all of their requests to other ZEST units because the back pressuring ZEST (e.g., 253) detects that it is being stressed by receipt of too many valid request fields. On the other hand, of course, if the overflow-warning threshold of the request queue 251 is not reached, and the ReqBPC 246 is not detecting that an inordinate number of ZCells (240) are coming in with valid request fields, then the request back pressure flag 261*d* in egressing ZCells may be reset to an inactive state, thereby indicating to ZINC units that are getting grants back from that ZEST unit that the ZINC's can continue to direct all or a portion of their requests to the unpressured ZEST.

For those of the ZEST-received requests that succeed in winning a grant within a given arbitration round, the in-ZEST arbitration processor 252 inserts a corresponding grant signal (which grant includes a GTSa stamp subfield) into a subsequently outgoing ZCell 264. The arbitration processor 252 simultaneously inputs into an adjustable-delay FIFO (referred to here as a Grant Source Queue, or GSQ) 249, an indication of which of the competing requests has won future ownership over a corresponding one (unicast) or more (multicast) of the processing-output lines (261*b*) at a scheduled future time (fc). GSQ 249 supplies this winner-identifying information (source-identifying information) to payload processing unit 255 at a later time (e.g., RTA ticks later) when a corresponding source payload (254*b*) has been returned and is ready to be processed (e.g., switched). A ZCell-forming multiplexer such as shown at 260 may be used for forming outgoing ZCells 264 for carrying grants 261*a*, post-processing payloads 261*b*, a back pressure flag 261*d*, and for including other data in the ZCells or additional transmission characters such as sync and idle bites between the ZCells (261*c*). Bits within each outgoing ZCell may be synchronized by register 263 to the local CLK3 clock. Egress unit 265 cooperates with multiplexer 260 to transform the ZCell 264 (conversion to 10 pbc coding domain and addition of ECC plus sync and idle bites 261*c*) before the so-processed ZCell signal 264 (including the GTSa grant time stamp) is transmitted asynchronously by egress link 238 to receiving unit 204 of a destination ZINC chip 209/219. (For the case of the returned grant, the destination ZINC chip is typically the same one 219 that sent the request. For the case of a switched payload, the destination ZINC chip 209 is typically different from the one 219 that sent the request.)

In the destination ZINC chip 209/219, a signal recovery mechanism 204-205-268 recovers a corresponding clock signal CLK4 by use of PLL 205 (or an equivalent) and by use of a sampling register 268 (or an equivalent). Valid-detect functions such as 227/228 is also included, but not shown for sake of brevity. Sampled results are fed into FIFO's 267*a*, 267*b* (valid grants into 267*a*, valid payloads into 267*b*) or equivalent re-synchronizers. The variable latencies possible here are represented by graph 203 whose depictions are similar to those of already-described graph 201. Grant portions (271) of the re-synchronized egressing ZCells 270 should be arriving in the same ZINC that sent the corresponding request (210) and thus the local clock is the same CLK1 as before. When the grant 271 is received with its included GTSa subfield, a corresponding source payload 211 is responsively sent out along line 212 for transmission back along ingress link 231 to the ZEST chip 253 that gave the grant. The source payload is accompanied by a second Grant Time Stamp (GTSb) that is a copy of, or derived from the ZEST-sourced, Grant Time Stamp (GTSa, 271). All the problems discussed above concerning variable transmit latency and variable bit sampling latency apply again as the source payload 211 is sent out in the next ZCell 240 for processing by the ZEST chip 253 that gave the grant 261*a*, 271. Due to space limitations in the drawings, the valid-detect circuits for FIFO's 267*a*, 267*b* are not shown but are understood to be coupled in a manner similar to the valid-detect circuits 227*a*, 227*b* of FIFO's 247*a*, 247*b*. It is also to be understood that dashed line 275 represents repetition of the clock-recovery means (205), sampling means (268), valid-detect means (227) and re-synchronizing means (267*a*, 267*b*) for respective others (236) of the egress lines coming into ZINC unit 209/219. Due to space limitations in the drawings, these were not fully shown.

When payloads from different ZINC chips arrive in the align queue 254 of ZEST chip 253, the arriving payloads of respective post-synchronization lines 250b, 259b can each have a different ZINC-to-ZEST latency associated with it. The latency can be due to the round-trip combination of time taken by the grant (261a) to move across egress line 238 in a first ZCell 264 and time taken by the actual payload (211) to cross ingress line 231 in its respective ZCell 240. As a result, the payloads in the align queue (AQ) 254 do not necessarily arrive at that queue in the same order that their corresponding requests 210 went out from respective ZINC chips or their grants 261a were given or went out from corresponding ZEST chips. A primary problem therefore arises concerning how to provide for a scheduled form of switching; even though it is not known what latencies will be experienced between a grant-giving time (e.g., at output 261a) and the arrival of a corresponding payload to the ZEST unit (e.g., on bus 250b 259b). A secondary concern which arises from this variable latencies environment is that of appropriately manage egressing payloads so that appropriate ones of the destination ZINC units (e.g., 209) will receive their respective destination payloads (261b) in an order that is at least close to what was intended when the respective requests 210 went out from the ingress side ZINC units (e.g., 219). The destination ZINC units should not be burdened with having to reorder, their there-arriving payloads by wider reorder distances (see FIGS. 1B and 6) than imposed upon them by the variable latencies of the ZEST-to-ZINC egress links.

Here we introduce the concept of a Roundtrip Adjustment Factor (RTA). Referring to FIG. 1A, the time difference $T_{GS}$ between a first in-ZEST event (156) when a grant is given by, or sent out from, a given ZEST chip 151 and a second in-ZEST event (154) when a corresponding payload is passed into a switch matrix 155 (and/or otherwise synchronously processed) in that ZEST chip 151 can be measured accurately within the time frame (CLK3) of that ZEST chip 151 (the payload processor). A precise schedule can therefore be arranged, within the timing reference frame of that given processor unit (ZEST chip) 151, for when in time (marked as event 154), a given payload will move into and/or through the switch matrix 155, and/or when that payload will be otherwise synchronously processed, where the processing time point 154 can be set relative to when (event 156) the corresponding and preceding grant (132a) was given within, or was sent out from the same ZEST chip 151. In one set of embodiments, RTA (=fixed $T_{GS}$) is programmably set to a fixed value, for example, between 6-19 ZEST ticks inclusive. In essence, a fixed latency (e.g., of about 8 ticks) is enforced for the round-trip time from grant release (156) to payload processing (154). This fixed latency should be consistently maintained even if all the payloads that are to be simultaneously switched, arrive early in the AQ 254, that is, well before their scheduled processing time. RTA should be set at least equal to the maximum expected, nonanomalous round trip delay that would occur between grant release and payload processing (e.g., switching) if the fixed RTA were not being enforced, where this takes into account the variable latency associated with all the various links of the interconnect layer 103 (assuming, of course, that the interconnect link in layer 103 is operative). Therefore, RTA is at least greater than the average round trip delay that would otherwise be seen between grant release and payload processing (e.g., switching) if round trip $T_{GS}$ were not forced to be fixed, where this takes into account all the latencies associated with the various links of interconnect layer 103.

Often, payloads will arrive for processing in such a way that the arriving payloads are in time-staggered relation to one another. Later-arriving ones of the payloads (as long as they are not too late) can be time aligned with earlier-arriving ones of the payloads so that all, or most, of the payloads that were scheduled to be processed (e.g., switched through matrix 155) at a same, processor-referenced time can be so-processed in unison. The RTA value may also be used for matching up, time-aligned payloads 254b (FIG. 2A) with corresponding, time-aligned identifiers that indicate where the payload is to be fetched from during processing (source identifiers). The latter source-identifiers are stored in the Grant Source Queue (GSQ) 249 (FIG. 2A) when corresponding grants are given. A just-in time retrieval mechanism may be used to retrieve the source-identifiers from the GSQ 249 so that the retrieved identifiers may be used to indicate which one or more of plural destination lines (261b in FIG. 2A, 255a-255n in FIG. 2B) the post-processing payloads are to emerge on.

In one embodiment, each grant that is sent out from its respective ZEST unit 151 at local time point 156 (FIG. 2A), is tagged with a corresponding and so-called, first Grant Time Stamp (GTSa). The ZCell-carried, GTSa signal identifies at least one of the local time of grant-giving and/or of grant-transmission or of a future local time (referenced to the payload processor's local clock) at which payload-processing (e.g., switch-through) will occur or a time point offset by a predetermined amount from such event markers. This GTSa value is copied into (or otherwise predictively and uniquely transformed into) a GTSb signal that then accompanies the ingressing payloads (131b) when they return to the grant-giving ZEST chip 151. Those of the received payloads which have a second Grant Time Stamp (GTSb) that corresponds to a scheduled, in-ZEST, event time (where the latter event time was first indicated by the first Grant Time Stamp (GTSa)) get processed (e.g., switched through switch matrix 155) at the scheduled local time per their GTSb marker. Those of the received payloads which do not have an appropriate GTSb stamp (usually because they arrived too early, although sometimes because they are too late) are held in the align queue (AQ) 254 until their apparently-scheduled processing time comes up.

Thus, even though the round-trip time between grant release 156 and payload arrival 131b (FIG. 1) may vary from payload to payload, this being perhaps because of the unique paths that the round-trip ZCell signals take (e.g., through line-to-fabric interconnect layer 103), received payloads 131b may nonetheless be re-aligned relative to a local one or more event markers so that such stagger-wise arriving payloads may be processed together at a pre-arranged local time 154 of the ZEST unit. In other words, the amount of time that a given payload sits in the align queue ($T_{SAQ}$=Time Sitting in Align Queue) may vary in accordance with the unique latencies experienced by that payload. But the sum of $T_{SAQ}$ and the unique latencies may be made equal to a fixed round-trip time between grant release and payload processing, namely, RTA. Thus, even though arrival time may vary from payload to payload, and/or from ingress link to ingress link, the local time point for processing these differently-arriving payloads may be precisely fixed by fixing $T_{GS}$. Although the present disclosure details a self-aligning GTS method (Grant Time Stamp method of FIG. 2C) for establishing what the $T_{SAQ}$ (Time Sitting in Align Queue) should be for each payload, it is within the contemplation of this disclosure to use other methods wherein the $T_{SAQ}$ of each payload is partially or fully defined by other means.

Referring to FIG. 2A, and stating the variable $T_{SAQ}$ concept in a slightly different way, payloads which have an accompanying GTSb tag that corresponds to a local, time marker (e.g., the future count, fc, contemplated by the GTSa time stamp)—where the local time marker is based on the local time frame of the receiving-ZEST (253)—may be deemed as belonging to a next group 254a of payloads that are scheduled to be processed (e.g., switched) by payload processing unit 255 when a next, local ZEST tick 206 corresponding to GTSb begins. Payloads within align queue 254 that do not have such a matching GTSb stamp are not so processed at that local time. Thus, payloads which were scheduled to be processed by unit 255 at a same, pre-scheduled time slot, get to do so if they had been properly received into the align queue (AQ) 254 by the time when the processing current count, cc, coincides with GTSb. The latter GTSb event marker identifies the ZEST tick for which the payloads whose grants were tagged with GTSa were scheduled to be processed. Those preceding grants were tagged at an earlier time, namely the current local time (cc) minus RTA. The grant tag, or GTSa stamp identifies the future local count (fc) at which switching (and/or other processing) will occur. The difference between an earlier, local clock count (GTCa) associated with the first GTSa stamping and a later, local clock count (GTCb) associated with the scheduled processing (the switch-through) can be made equal to an empirically-adjustable constant value, namely, RTA.

Once a specific RTA is picked, payloads that arrive very early within the span of that RTA, that is; well before their scheduled processing (switch-through) time, will generally be made to wait longer (a bigger $T_{SAQ}$) in the align queue (254). Payloads that arrive fairly late within the span of that RTA, that is; shortly before their scheduled processing (switch-through) time, will generally be made to spend less or no time (a relatively smaller $T_{SAQ}$) in the align queue (254). The align queue delay ($T_{SAQ}$) may be individually modified for each payload such that the time span (RTA) from grant-release to payload-processing (switch-through) becomes a constant. In other words, for each received payload, the switch-through and/or other processing step 255 is variably time delayed so as to occur a constant time after (RTA after), the local, current count of the grant (as marked by GTSa). And the GTSb tags of the payloads that are to be now processed (switched-through) should correspond to the difference: GTC-RTA, which difference represents the local GTC count as it was RTA local ticks ago.

FIG. 2B shows more details of a first RTA-compliant embodiment 200' by way of which this concept may be carried out. At the time that a grant is locally given by a request processor 252' within ZEST unit 253', the request processor 252' should know several important things. It should know the identity of the physical source line (one of lines 255.1 through 255.N) through which the payload will be later coming into the payload processing unit 255' because this is part of the later-in-time processing event that the request processor 252' should be scheduling for at an earlier time. The request processor 252' should also know at grant time what the identity is of the corresponding physical output line or lines (shown as horizontal lines 255a-n in unit 255' of FIG. 2B) from which processed-payloads will emerge from the payload processing unit 255'. Moreover, the request processor 252' should also know the scheduled time slot at which the payload-processing will be carried out. It is the job of the request processor 252' to produce such information. Because of this, information about the scheduled payload-processing event is most trustworthy when read out directly from the request processor 252'. (It could alternatively be retrieved as information tagged onto returning payloads, but then, such round-trip carried information may be corrupted by in-transit error mechanisms.)

In the illustrated embodiment 200', the identification (Phys SRC) of the physical source line (255.1 through 255.N) whose input payload will be processed (e.g., switched-through) and thereafter output by a physical output line (e.g., 255c) of the payload processing unit 255' is read out directly (e.g., 232c, 232d, etc.) from the request processor 252' at the time of grant and stored locally within the ZEST unit 253' for safe keeping. Each of physical output lines 255a-255n of the payload processing unit 255' has a respective GSQ storing row, 249a, 249b, 249c, etc. associated with it. For sake of illustrative brevity, only GSQ rows c and d (249c and 249d) are shown. The identification (Phys SRC: 232c, 232d, etc.) of the physical source line (255.1 through 255.N) whose input payload will be processed (e.g., switched-through) and thereafter output by the physical output line (e.g., 255c) of a corresponding GSQ row (e.g., 249c) is stored in a time-related position (e.g., 242c) of that GSQ row. In one embodiment, there are 64 physical source lines per ZEST chip, and thus a mere 6 bits are sufficient for identifying a unique one of the physical source lines as each corresponding GSQ entry. An additional 7th bit may stored as a grant-valid bit (e.g., 237c) to verify that a grant had been truly given for the corresponding time slot and for the physical output line (255a-255n). In one embodiment, if the grant-valid bit (237c, 237d, etc.) is later found to be false, at the time the processed (e.g., switch-through) payload is to be output, the corresponding egress line 255a-255n outputs zeroes in place of the bits of the payload. If the grant-valid bit (237c, 237d, etc.) is found to be true, its respective Phys SRC identifier (232c, 232d, etc.) may be read out of the GSQ and used to select the payload that will be processed and thereafter output, the corresponding one of egress lines 255a-255n.

Note that the term, 'physical source line' refers to the unique hardware that will carry a given, ingressing payload. System software may think that the payload is being passed through a differently-numbered, 'logical source line'. A logical-to-physical mapping means (not shown) may be included in each ZEST chip (253') for providing the logical-to-physical mapping function. The logical-to-physical mapping function is not directly germane to the presently disclosed invention and hence is not detailed herein. It may be appreciated that one use of the logical-to-physical mapping function might be to compensate for failed lines. Another use of the logical-to-physical mapping function might be to cause a single ZEST chip (253') to behave as if it were a virtual plurality of two or more, smaller ZEST units. Note further, that the described routing of payloads from a pre-identified source (Phys SRC) implies egress-ended control of signal routing. In one embodiment, each payload egressing circuit (e.g., 255c) needs only to learn at the start of the corresponding time slot, the identification of the one payload which will egress therefrom during that time slot. This approach simplifies multicasting. If one payload is to be multicast, each of the multicasting egress circuits (e.g., 255c) fetches that same one payload. On the other hand, if we had used ingress-ended control of signal routing, then in the case of multicasting, each ingress circuit would have to keep track of the N egress lines from which the one payload is to emerge. And that N-tupled tracking function would have to be stored and repeated for each processing time slot because, at the ingress side (ingress side of the AQ), that time slot has not yet arrived.

To summarize thus far what we have shown with FIG. 2B, observe that each payload egressing circuit (e.g., 255c) has a respective grant source-tracking queue row (GSQ). Each such GSQ 249a-n keeps track of what physical source line was scheduled to function as an input for the processed-payload that is to be output by the respective physical egress line 255a-255n of that GSQ row 249a-n when the promised processing time (GTSa+RTA) arrives per the grant given by the local ZEST unit 253'. (Like the source lines, the egress line 255a-255n may also be assigned different physical and logical identifying values.) To keep track of when the promised time arrives, a first, modulo-P counter 230 (the local Grant Time Counter, GTC) may be provided for sequencing through a local, first count sequence in synchronism with the local tick counter 256'. P is the number of unique, round robin time slots that are each assignable for processing a batch of payloads. When a grant is given by the local ZEST unit 253' and/or the grant is sent out on egress line 232 to a requesting ZINC unit 219', the local GTC value (or an equivalent time marker) is stamped into the grant-carrying ZCell 264' as the GTSa signal (the grant time stamp). A second modulo-P counter 235 (Switch Time Counter, STC) may be further provided in the same ZEST chip 253' for sequencing out of phase with the GTC 230 and through a local, second count, also in synchronism with the local tick counter 256'.

In the illustrated example, the mod base, P is equal to 16. So each of the GTC and STC counters sequences through the values 0-15 or equivalents thereof. Other values of P are also contemplated as may be appropriate for scheduling future processings of later-arriving payloads. The STC count trails the GTC count by a sequence gap representing RTA. A corresponding relationship, $STC=(GTC-RTA)_{mod\ P}$, may be established by use of a loading unit 233, where the latter unit 233 loads (initializes) the STC counter 235 with the value, $(GTC-RTA)_{mod\ P}$ at the time the GTC counter 230 is reset or otherwise initialized. Other alternatives for establishing the STC=GTC-RTA relationship or its equivalents will of course now become apparent to those skilled in the art. One example of an alternative arrangement is to forego the second counter 235 and instead use a programmed adder or subtractor that is driven by GTC sequencer 230, and in response, generates the STC output signal 237 so as to maintain the relationship, $STC=(GTC-RTA)_{mod\ P}$, or an equivalent. The illustrated two counter approach is shown for purpose of making it easy to understand how the STC sequence lags the GTC sequence by a distance corresponding to RTA. In one embodiment, when the grant is given, GTSa equals the current GTC count value (or an equivalent thereof). A corresponding payload is processed (e.g., switched-through), when a returned GTSb stamp (in ZCell240') equals the current, lagging count of the STC counter 235.

In the embodiment 200' of FIG. 2B, a third counter (GSQW counter) 241 is provided as a modQ counterpart to the modP, GTC counter. In one embodiment, Q is equal to 20 because the RTA value can be as large as 19 or 20. (the 20 value assumes that the GSQ circuitry allows for both a write and a read from a same entry in one clock cycle.) The 5-bit GSQW counter output 241o is used as a WRITE pointer for identifying which location in GSQ row 249c will store a corresponding, validated payload source identification 242c and a corresponding source-validation bit 237. GSQW counter 241 is clocked by ZEST tick counter 256' as are counters 230, 235 and 291. If a grant is given to a particular request for using respective egress line 255c, the corresponding Phys SRC identification is written into the GSQ row-c position then pointed to by GSQW counter output 241o. That Phys SRC identification should be saved in the row-c part (249c) of the GSQ for at least RTA ticks.

A fourth counter (GSQR counter) 291 is provided as a modQ counterpart to the modP, STC counter. In the same way that the STC count trails the GTC count, the GSQR counter output signal 291o lags behind the GSQW counter output signal 241o according to the relationship, $GSQR=(GSQW-RTA)_{mod\ Q}$, so that the sequential phase gap between the GSQ read and write pointers represents the Round Trip Adjust value, RTA. The $GSQR=(GSQW-RTA)_{mod\ Q}$ relationship may be established by loading (initializing) the GSQR counter 291 with the value, $(GSQW-RTA)_{mod\ Q}$ at the time the GSQW counter 241 is reset or otherwise initialized. Interconnection 293 represents an initialization means for providing such initialization. Other alternatives for establishing the GSQR=GSQW-RTA relationship or its equivalents will of course now become apparent to those skilled in the art. One example of an alternative arrangement is to forego the fourth counter 291 and instead use a programmed adder or subtractor that is driven by GSQW sequencer 241, and in response, generates the GSQR output signal 291o so as to maintain the relationship, $GSQR=(GSQW-RTA)_{mod\ Q}$ or an equivalent. The illustrated two counter approach is shown for purpose of making it easy to understand how the GSQ Read pointer 291o lags the GSQ Write pointer 241o by a distance corresponding to RTA.

Because of the lagging phase of GSQR counter 291, the Read pointer signal 291o picks out for output from GSQ row 249c, the Phys SRC identifier (if valid) that was saved RTA ticks ago for indicating to egress line 255c what source is to be switched or otherwise processed and output through egress line 255c. The same GSQ Write pointer 241o and GSQ Read pointer 291o drive others of the Grant Source Queue rows such as 249a-b (not shown), 249d, 249e (not shown), etc. so that each GSQ row 249a, 249b, etc. is storing a respective grant-valid bit (e.g., Valid-d, Valid-e, etc.) and Phys SRC identifier (if valid) for its respective grant, if such a valid grant is given during a respective one of successive ZEST ticks. RTA ticks later, the Phys SRC identifier (if valid) is read out for use by payload processing unit 255. When, for example, entry 243c is read out. it should have its contents output along corresponding line 245c to the payload processing unit (switch-matrix) 255' for timely combining with an aligned payload (PDU) 264b' that comes out of a respective one of source AQ's (align queue columns) 254.1, 254.2, . . . , 254.N at the appointed time (RTA ticks after the respective grant was given). The GSQ contents read out on line 245c tell the output circuitry of egress line 255c if there is a valid PDU to be output, and if so, form which of AQ columns 254.1, 254.2, etc. it should be obtained. Stated otherwise, the grant-valid and Phys SRC signals 245c output by GSQ row 249c may be used to indicate if a valid grant was given RTA ticks ago and may be further used to select a corresponding one of time-aligned payloads 254b' as one for which the ZEST unit (253') gave a corresponding grant, an RTA number of local ticks ago for egress through corresponding egress line 255c. The scheduled switch-through processing may be followed by (or replaced by) other synchronous processing 247c within the ZEST unit (253').

After its scheduled processing occurs, the processed payload is inserted into a ZCell such as 265c and the payload-carrying ZCell 265c is transmitted by egress line 248c to destination ZINC unit 209'. In one embodiment, the processed payload is accompanied within ZCell 265c by a logical source identifier (SRC) and a logical sequence identifier (SEQ) as shall be explained below. The logical source identifier (SRC) in ZCell 265c may be the same as, or different from the physical source identifier (Phys SRC) output by line 245c.

Figure 6:
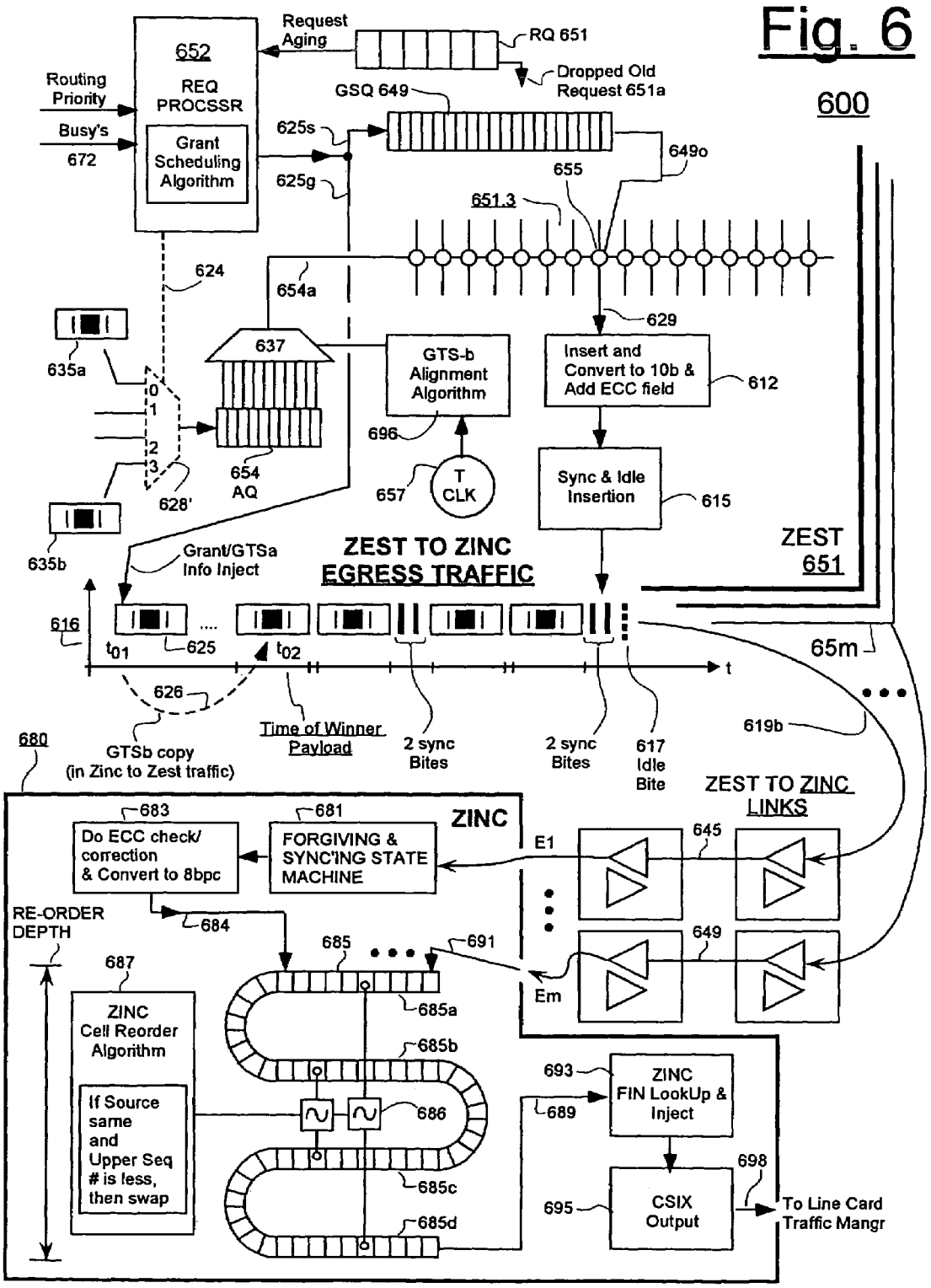
FIG. 6 is a block diagram showing a re-ordering scheme in accordance with the disclosure.

The time delay between grant-receive in the source, ZINC unit 219' and payload-receive in the destination, ZINC unit 209' should be approximately equal to the time span of RTA because the time delay between grant-transmit (or grant-giving) in ZEST unit 253' and payload-process (255) in ZEST unit 253' is made equal to RTA. However, the signal propagation delays of egress lines 232 and 248c, 248i, etc. may not be equal and/or these may each change over time. (Interconnect line 248i links subunit 247i of ZEST unit 253' to ZINC unit 2N9' as shown.) Because of this, processed-payloads arriving from different ZEST units to a given, destination ZINC may have to be further ordered within the destination ZINC unit 209' (and/or 2N9') if a specific order at the destination side is desired. The logical source (SRC) and sequence (SEQ) identifiers of ZCells such as 265c may be used for providing such ordering at the destination side. More will be described about this when FIG. 6 is addressed.

Referring to FIG. 2C, further details for the RTA-compliant embodiment 200' are shown. It should be understood that the illustrated align-queue column portion 254.1 of FIG. 2C is but one of many such AQ columns provided in ZEST unit 253' each for storing respective payloads arriving from a respective one of the many (e.g.,64) ingress lines (see 135 of FIG. 1A). FIG. 2B better shows that there are many such align queue columns, 254.1, 254.2, . . . , 254.N. The size of each, to-be-queued-and-aligned, payload section (PDU) can be fairly large (e.g., 52 or more bytes). So it is advantageous to be able to reduce the size of each AQ column portion (254.1 in FIG. 2C) such that no more space is consumed in the integrated circuitry of the ZEST unit 253" by each align queue portion than is necessary for delaying the arriving PDU's sufficiently long enough to maintain a maximum RTA value for the given system (100, FIG. 1A) and optionally for maintaining an acceptable margin of safety (Stack Gap) that assures the write pointer will not wrap ahead of the read pointer and thereby overwrite payloads that have not yet been switched (or otherwise processed). In one embodiment, where the request age-out time (251a, FIG. 2A) is set to 6 ticks, it has been found that the AQ time delay may also be safely set to 6 ticks. In such a case, it is not necessary to have for the AQ, a Q-number of entries of each GSQ row 249c as the one shown in FIG. 2B (where Q=20 or another such RTA-mandated value). Instead, an 8-entries per align queue portion 254.1" will suffice as is shown in FIG. 2C.

Align queue portion 254.1" of FIG. 2C may be thought of as a Push-into-Bottom and Pop-from-Top stack. When a valid PDU (payload plus other data, including a PDU valid bit) is received by way of a ZCell such as 240", the newly-received PDU 240.9" is pushed into the next available slot (e.g., the one pointed to by Write pointer 241') at the bottom of wrappable stack 254.1" and an AQ-entry valid bit (or register) 254.1v is set valid for that entry, thereby indicating the AQ entry slot contains a live PDU. The bottom-of-stack (Write) pointer counter is then advanced (by unit 239, in the illustrated case the advance is with a mod-8 wrap-around). If validity detector 227" detects that a received ZCell 240" does not contain a valid PDU section, no push (239) is performed and storage space within the AQ is thereby preserved.

The top-of-stack (Read) pointer counter 290 should be pointing to the oldest, live PDU 240.1" that is still awaiting processing (e.g., switch-through in payload processing unit 255). When the system is initialized (e.g., by way of a system RST signal) the AQ write pointer 241" and read pointer 290 may be pointing to a same empty entry slot in the AQ. If a ZCell 240" arrives with a valid-PDU bit set true, then the PDU is pushed into the bottom of the stack as indicated at 239, the AQ-entry valid bit 254.1v is set true, and the write pointer 241" is thereafter advanced. Comparator 292 compares the current STC count 235o" against the 'top' Grant Time Stamp (GTSbt) stored in the top-of-stack PDU 240.1". (That top-of-stack PDU 240.1" could be the same as the bottom-of-stack PDU 240.9 just pushed in, or it could be an older, live PDU.) When the STC count advances to equal GTSbt, and provided the AQv bit 254.1v is true for that slot, the corresponding, top-of-stack PDU 240.1" is popped off the stack. AND gate 296 of FIG. 2C represents the Boolean ANDing of the comparator result with the AQv bit 254.1v. When the pop occurs, the AQ-entry valid bit 254.1v is reset to false, and the Read pointer counter 290 is advanced (with mod8 wrap around) to point to the next-higher AQ entry slot in the wrap-around stack. The popped PDU 240.1 is processed (switched-through) by payload processing unit 255. As already explained, STC counter 235" is an out of phase counterpart of GTC counter 230" for implementing the relationship STC=(GTC-RTA)$_{mod\ P}$. So when GTSb of the popped PDU 240.1" equals STC, we are popping the PDU which got a corresponding grant RTA local ticks ago.

In the interim, between the release of the grant and the popping of the PDU 240.1", the GTSa stamp had traveled in ZCell 264" to ZINC unit 219", when the grant was received by ZINC unit 219", the corresponding payload (240") was sent back, the ZEST-received PDU was stored in stack column 254.1", and STC has been advancing towards equality with the GTSbt stamp value contained within that AQ-stored PDU 240.1". The delay between grant release and payload processing should therefore be equal to RTA.

If something goes wrong, it is possible, for the AQ Read and AQ Write pointers of this, reduced-size-AQ embodiment 200' to over-run one another. Comparator 294 may be optionally provided to test the gap between grant-release and switch-through times as represented by GTSbb (the GTSb value at the bottom 240.9" of the AQ stack) and STC. If the G-S gap value 295 detected by comparator 294 shifts outside a predefined, safe range (e.g., 0 to 8 ticks), then the ZEST unit 253" may elect to send an error alert to a system controller (not shown) by way of a processor interface or an in-band-control (IBC) interface. If the G-S gap value 295 is found to be 9-12 ticks, it may be assumed that the respective payloads are coming in far too early and an overflow flag may be raised by the detecting ZEST chip. If the G-S gap value 295 is found to be 13-16(0) ticks, it may be assumed that the respective payloads are coming in far too late and an underflow flag may be raised by the detecting ZEST chip. In response, the system controller may take corrective action as appropriate, for example by resetting the full system 100 (FIG. 1A) so as to bring all the ZINC and ZEST units into general synchronism with one another and/or adjusting the RTA value so as to reduce reoccurrence of the stack overflow or underflow problem. At the local level; in the ZEST chip that detects the apparent overflow or underflow, no corrective action is taken in one particular embodiment. Instead the apparently early or late payload is treated as valid and processed normally. This approach saves the system from being inadvertently restarted if the G-S gap threshold values were set too close to nominal operating conditions, and in fact nothing has gone wrong. It is left to the system controller (not shown) to collect G-S gap alerts from various ZEST chips and determine, based on the collective information, if corrective action of any sort should be taken, or if the system should be allowed to continue operating as is without interference.

Of course, it is also within the contemplation of the present disclosure to allow the overflow/underflow detecting ZEST chip to take corrective action on its own. For example, if the G-S gap value 295 shifted into a range that is indicative of an overflow, it may mean that new payloads (240.9") are coming in faster than the ZEST unit 253' is popping them off the respective AQ column (e.g., 254.1). The overflow-detecting ZEST unit 253" may responsively send back pressure bits 261$d$ (inside egressing ZCells) to the ZINC's that are currently overloading their respective align queue portions (254.1") asking them to reduce the number of requests being sent to this ZEST unit 253". Alternatively, or additionally, the overwhelmed ZEST unit 253" may temporarily stop giving grants to requests coming from those of the ZINC's that currently appear to be overloading their respective align queue portions (254.1").

Specific designs for the payload switching and/or processing unit 255 of FIGS. 2A-2C can vary from system to system. Such specific designs for the payload processing unit 255 are not vital to understanding the asynchronous frames/shelves concepts disclosed herein. However, for the sake of providing some explanation of why a given ZINC chip would want to send its payloads distributively through different ZEST units, FIG. 4 is presented as a conceptual diagram. It is used here for explaining how multiple ZEST units/slices (151-15$m$ of FIG. 1A) may be used to switch traffic at variable throughput rates. The illustrated conceptual system 400 in FIG. 4 is assumed to be very simple and to be comprised of just two fully populated switching matrices 451 and 452 (e.g., two ZEST chips). Switching matrices 451 and 452 are also referred to herein as first and second switching slices. (It is possible to have multiple 'slices' within a single chip.) In the simplified example of FIG. 4, each of the switching slices has 16 horizontally-extending ingress lines crossing with 16 vertically-extending egress lines, where a programmably activatable switching point such as 455 is provided at every intersection of the lines. Activation of a switching point such as 455 allows an ingressing signal on the corresponding horizontal line to egress along the corresponding vertical line. If the switching point (455) is deactivated, a conductive path is not formed between the intersecting horizontal and vertical lines at the position of that switching point.

Those skilled in the art will appreciate that the illustrated, and fully populated 16-by-16 matrix 251 of switching points (one of which is denoted as 455) is not the most practical way to implement a switching matrix; particularly as one scales to larger sized matrices such as 32-by-32, 64-by-64, or higher. Each switching point (455) capacitively 'loads' its respective horizontal and vertical connection lines. The total amount of loading on each line becomes excessive as one scales the conceptually-illustrated version to larger sizes. In more practical implementations, rather than the one-shot switching organization shown in FIG. 4, may be better to have cascaded stages of switching. There are many different designs for implementing practical, fully-populated, switching matrices or crossbars, including pipelined and cascaded approaches. Such is beyond the purview of the present disclosure. The simple, one-shot switching organization shown in FIG. 4 is the easiest way to explain the concepts behind the distributed switch fabric. Hence it is used for convenience's sake.

The term 'ingress channel' will be used herein to refer to what is conceptually-shown in FIG. 4 as a horizontally-extending ingress line in combination with its set of on-line switch points (455). For purposes of unicast traffic routing, when a given switch point (e.g., 455) is activated, it's horizontal ingress channel and vertical egress line may be deemed to be 'consumed' and thus unable to at that same time support unicast routing of other signals. The term 'crossbar' will be used herein to refer to a horizontally-extending ingress channel in combination with at least one of the vertically-extending egress lines. A notation such as 451.3×8 will refer herein to a crossbar defined in switch matrix 451 by ingress channel 3 and egress line 8. A notation such as 451.3 will refer herein to ingress channel 3 of switch matrix 451.

Each of horizontal ingress channels H1-H16 may receive egress traffic from a respective one of 16 ZINC units; each serving a respective one of 16 line cards in our simple example. We assume that line card number 3 (430) contains an ingress queue 435 currently holding five cells that want to be passed through the switch fabric and over to destination line card number 8 (480) at a pre-specified rate, say OC-24. We assume further that due to the utilized IC technology, the cells-per-second, throughput rate of a given switch slice crossbar is limited to a maximum value, say OC-12. One example of a switch slice crossbar is indicated by first shading at 451.3×8 to provide ingress via channel H3 and switched egress via line V8$a$. If the cells of ingress queue 435 are to move at the faster throughput rate of OC-24, then switching slice 451 will not by itself be able to support such a high throughput rate. However, if the cells of source line card 430 are spatially split apart as indicated by paths 411-414 so that roughly half the ingress cells (435) move through switch slice crossbar 451.3×8 while in roughly the same time span, the remainder of the sourced cells (435) move in parallel through a second switch slice crossbar 452.3×8, then the desired throughput rate can be realized. That is the basic concept behind using plural switch slices such as 451 and 452. But there are practical problems that need to be solved when moving to such a distributed switch fabric and when allowing switch slices to be linked to line cards by way of variable length and/or variable delay, interconnect links (e.g., 411 and 412).

More specifically, suppose that at first time point $t_1$, ingress CELL-1 is applied by interconnect path 411 to ingress channel H3 of slice 451 (also denoted as 451.3). Suppose that a second time point, $t_2$ which is fairly close to or identical to first time point $t_1$, ingress CELL-2 is applied by second interconnect path 412 to channel 452.3. The sequential order and closeness of time points $t_1$ and $t_2$ can vary from one implementation to the next and even during use of a given implementation. This can be so for several reasons. It may be that ingress CELL-2 departs from line card 430 before ingress CELL-1, or vice versa. The signal propagation delay of interconnect path 412 may be longer than that of first path 411, or vice versa. Ingress CELL-2 may develop an uncorrectable bit error during its travel across second path 412 (e.g., across the line-to-fabric interconnect layer 103' of FIG. 3) and may therefore have to be re-transmitted at a later time over same path 412. These are just examples. Other factors that may cause variations of arrival time at a given horizontal ingress channel, 45J.K may include temperature changes, IC fabrication process changes, clock skew, and so forth.

As CELL-1 and CELL-2 respectively arrive on the H3 lines (or their equivalents) of switch slices 451 and 452, the respective switching points of cross bars 451.3×8 and 452.3×8 should be activated so that, upon successful arrival (and post-arrival alignment), CELL-1 and CELL-2 can quickly traverse out from respective egress lines V8a and V8b (or their equivalents) for respective coupling along interconnect paths 421 and 422 to destination line card 480. However, as was the case with the ingress paths 411-412, the now egressing cells can encounter same kinds of delays problems on respective interconnect paths 421-422 before CELL-1 finally arrives in egress queue 485 at respective time point $t_5$, and CELL-2 finally arrives in queue 485 at respective time point $t_8$. Because of the possible variations in positionings of destination line card 480 (or just a destination ZINC unit) relative to each of switch slices 451, 452 and relative to source line card 430 (or just a source ZINC unit), and/or because of variations in signal propagation delays of interconnect paths 421-424, and/or because of other factors, the arrival times of egress cells such as CELL-1 through CELL-5 at destination queue 485 can vary significantly in terms of sequence and closeness to one another. One problem is therefore how to compensate for such timing variations.

Another problem is how to make efficient use of the ingress and egress resources of the switch slices 451, 452. For example, if egress line V8b (or its equivalent) is busy servicing a horizontal ingress channel other than 452.3, then CELLs-2 and 4 may not be able to get through at that time. However that should not mean that all other egress possibilities from channel 452.3 should be wasted at that time. It may be that egress line V12b is not busy and it can service another cell wanting to travel from line card 3 to line card 12 (not shown) by way of crossbar 452.3×12. So even if access requests by ingress CELLs-2 or 4 for switch slice crossbar 452.3×8 may be refused a 'grant' because V8b is 'busy', a 'secondary' request by another cell to use switch slice crossbar 452.3×12 (egresses through V12b') may be granted if egress line V12b' is not busy at the time of request arbitration. So-called, 'primary' ones of the requests that lost because of the V8b 'busy' problem may be queued up in a request buffer (251) within switch slice 452 for a predefined time length (e.g., up to about 6 ZEST ticks) and allowed to compete in future request arbitrations of ingress channel 452.3. If they age too much (e.g., more than roughly 6 ZEST ticks), the losing requests are dropped from the arbitration queue. More will be said about secondary requests and queue aging when we discuss FIG. 5B. In addition to secondary egress of a unicast ZCell from egress line V12b', it is possible to multicast plural copies of ZCell's simultaneously from one ingress channel such as 452.3 for egress by way of plural vertical lines such as V8b and V12b' to respective destination line cards. A problem associated with such multicasting, as well as with unicasting is how to efficiently and reliably keep track of which egress lines will service each ingressing payload at the correct time. An answer to this problem has already been shown in FIG. 2B through the use of a dedicated GSQ row (e.g., 249c, 249d) for assigning a source to each egress line.

Referring to FIG. 6, we now consider a view of a system embodiment 600 that handles ZEST-to-ZINC egress traffic. It is assumed here that an in-ZEST grant scheduling algorithm running in a request processor 652 has already injected, at a first time point, $t_{01}$, granting information 625g into a ZCell 625 that was dispatched back toward the requesting ZINC chip. The physical source identification 625s used in the grant scheduling was stored into GSQ 649.

The grant scheduling algorithm may have used one or more of the busy indications 672 from pre-assigned egress lines, routing priority codes, and request aging information to establish what payload processings will take place RTA ticks after each grant. When the grant-carrying ZCell 625 arrived at a corresponding, request-making ZINC chip, the GTSa information in ZCell 625 was copied or otherwise uniquely transformed, as indicated at 626, to define the GTSb code in the payload section of a ZINC-to-ZEST ZCell and combined together with the winning payload and launched at second time point, $t_{02}$, back to the granting ZEST chip.

The payload-carrying ZCell that was launched from ZINC to ZEST at second time point, $t_{02}$, is typically one of multiple payload-carrying ZCell's that were launched in quick response to the arrival times of grants from respective ZEST chips. The payloads typically have a specific order amongst themselves in the sourcing ZINC chip. But because the grant arrival times can vary due to the different-lengths/speeds of the interconnect links 132a (FIG. 1A), the requesting ZINC chip (119) may not launch payload-carrying ZCell's back to every one of the associated ingress channels in the same order the ZEST chips sent out their grants. Also due to the different-length/speed links of the line-to-fabric interconnect layer 103, the payloads may arrive at the differently located ZEST chips in orders other than exactly the way the grants went out. In other words, when the payloads are received in the grant-giving ZEST chips, the payloads may be out of alignment relative to the grants. We have explained already via FIGS. 2B-2C how ZEST-received payloads may be re-aligned locally to an in-ZEST time frame.

At locations 635a and 635b of FIG. 6, we show two payload-carrying ZCells that have arrived at different times for processing through ingress channel #3 of a given ZEST chip. Precursory requests (not shown) which are associated with payloads in ZCells 635a and 635b have already competed against other requests and won a right of passage through the line-to-fabric interconnect layer 103 when the scheduling mechanism in request processor 652 output corresponding grants (625g). Dashed symbol 628' represents the precursory competition amongst requests that allowed the payloads in ZCells 635a and 635b to arrive for storage in Alignment Queue (AQ) 654. Because there can be some variance in the exact order that given ZCells such as 635a or 635b arrive at the granting-ZEST chip, the respective payloads and their GTSb time stamps are stored in the Alignment Queue (AQ) 654. The local clock 657 within the ZEST chip determines when each crossbar-using time slot, T=n, (otherwise known as a ZEST tick) begins and ends. A GTSb realigning algorithm 696 scans the alignment queue 654 and pops those payloads 654a that are ripe for processing within the next-effective and local T clock count (657) based on the GTSb information carried with the corresponding payloads. GSQ 649 is used to identify for each of the egress lines (e.g., 629), which of the ripe payloads is to egress from that egress line. The switch point or points (655) of the identified source lines and vertical egress lines are activated by way of path 649o as the granted time slot of the queued payload goes into effect. The corresponding payload section (PDU of 635a or 635b) is then passed by way of path 654a from AQ popping mechanism 637 into the corresponding horizontal switch slice section 651.3 for egress from respective vertical lines such as 629.

After a payload passes through its allocated crossbar (651.3×J), the switched payload data is inserted by an in-ZEST insertion mechanism 612 into a ZCell package for return to the requesting ZINC chip. The in-ZEST insertion mechanism 612 further converts the egressing ZCell data into a clock-recoverable and DC-balanced coding domain (e.g., 10 pbc) and adds an ECC field to the end of converted ZCell. Subsequent unit 615 inserts two ten-bit sync characters after every pair of egressing ZCells. Insertion unit 615 may also be programmed to add an additional idle bite 617 after every second pair of synch bites or according to another static form of link-rate constraint. This sync and idle bite insertion is seen in the time versus data graph provided at 616. In one embodiment, the two synchronization bites in the ZEST-to-ZINC traffic are coded as either one or both of the K28.5 and K28.1 characters as set forth in the above-cited industry standard fiber channel specifications while the idle bite 617 is coded as the K28.0 character. The 4 ways in which the two sync bites can be coded (K28.1/K28.1; K28.1/K28.5; K28.5/K28.1; K28.5/K28.5) can be used to send 2-bit embedded messages along the ZEST-to-ZINC traffic route. The periodic insertion of idle bites such as 617 causes the throughput rate (in terms of payload bits per second) of the ZEST-to-ZINC egress traffic 619*b* to be slightly less than the payload throughput rate of ZINC-to-ZEST ingress traffic for the reasons given above concerning link-rate adjustment.

As seen in FIG. 6, ZEST-to-ZINC traffic 619*b* moves through interconnect link 645 of the line-to-fabric interconnect layer 103 and arrives at egress port E1 of ZINC chip 680. Egress port E1 services ZEST-to-ZINC traffic from ZEST chip 651. Egress ports E2-Em of ZINC chip 680 respectively service ZEST-to-ZINC traffic from respective other ZEST chips 65*i*-65*m* (not fully shown). For sake of brevity, FIG. 6 shows only the last of the series coming in by way of link 649 into egress port Em of ZINC chip 680.

Because the two sync bites of the ZEST-to-ZINC traffic 619*b* can come in four different organizations, and because errors in the interface layer 103 (e.g., within link 645) might cause one or more sync bites and idle bites to become corrupted while they move through the serialized transmission stream, ZCell framing problems may arise. To help resolve this problem, a front-end egress-receiving portion of each port, E1-Em may include a so-called, forgiving state machine 681 that tries to synchronize its states to the incoming sync bites, but is able to accommodate the periodic insertion of idle bites and is able to forgive and let the traffic through anyway, and maintain state synchronization, even if one or more of the sync and idle bites is on occasion corrupted. The forgiving state machine 681 maintains its currently recovered clock frequency and ZCell framing window (external tick window) and, if there is an egregious error or series of errors, it resets itself and patiently waits for a good next pair of sync bites, ordered according to one of the four, above-described possible permutations, and synchronizes itself to that next, well-received pair. It is to be understood that the forgiving state machine 681 operates to improve performance in the serialized domain of the system and has little to do with the asynchronous shelves aspect of the present disclosure. The forgiving state machine 681 is mentioned here just to indicate that accommodations for the idle bites and for errors in the sync bites might be desirable when framing the serialized ZCells.

The data that is received and synchronized-to by forgiving state machine 681 is next passed to converter unit 683. In converter unit 683, the 10 pbc ECC code is stripped off and used for error detection and/or error correction of itself (the ECC section) and of the serialized, other bites of the ZCell. The checked/corrected information of the ZCell is then converted to the 8 bits per character coding domain (8 pbc). A similar input through units alike to 681 and 683 occurs in parallel for each of egress ports E2-Em. Input path 691 is therefore to be understood as including its own counterparts of units 681 and 683 as will all the other input paths for the interposed other egress ports E2-E(m-1). In paths 684 through 691, the identification of the respective egress port, E1-Em is temporarily tagged onto the incoming data.

The synchronized, code-converted (8 pbc) and tagged outputs of paths 684-691 are temporarily stored in a top portion or top layer 685*a* of a snaking shift register 685. In the embodiment where m=16, there will be 16 ZCell-storing sections in top portion 685*a*. The shift clock runs fast enough so that by the time the next salvo of up to m-ZCell's arrive from ports E1-Em, the earlier batch of m ZCell's will have shifted into second layer 685*b* of the snaking shift register 685. By the time the subsequent salvo of ZCell's arrive from ports E1-Em, the earliest batch of m ZCell's will generally have shifted into third layer 685*c*, and so forth. The number of layers 685*a*, 685*b*, 685*c*, etc., in the snaking shift register 685 may be varied according to the re-order depth needed. To save on circuit size, one would want to have a minimally-sized reorder queue. Several factors should be considered in determining what minimum number of reorder layers 685*a*-685*c*-etc., may be acceptable. Referring to FIG. 1B, and more specifically to graph 109, it should be recalled that the maximum temporal distance between what logically should be temporally-adjacent payloads (e.g., PB4" and PB5") can be affected by the boundary-crossing effect 190, as well as by the maximum expectable delays in the line-to-fabric interconnect layer 103 and by the possibly different clocking rates of the independently clocked ZEST units (G-K). In one embodiment, it was found that at least six layers should be used in the reorder queue.

A so-called, snake-sort operation may occur as the batches of ZCell's move downstream along the snaking shift register 685 towards lower layers 685*c* and 685*d*. For details concerning a specific embodiment of the snake-sort operation, see the above-cited U.S. application Ser. No. 09/905, 394. Selective transposition units such as 686 are connected to the snake layers in the manner shown so that a spectrum of relatively wide and narrow-separation transpositions may be made in response to snake-sort algorithm 687. Algorithm control unit 687 can cause each of the transposition units 686 (only two shown, but more contemplated) to perform at least the following first test and follow-up action: IF in the ZCell's of the payloads currently passing-through the test ends of the transposition unit 686, the logical source identifications (e.g., field 526 in FIG. 5A) are the same, and if in the same ZCell's, the payload sequence number (e.g., field 525 in FIG. 5A) of the upper payload is less than the payload sequence number of the lower payload, THEN swap the ZCell's of the tested upper and lower layers (e.g., 685*a* and 685*d* respectively, or 685*b* and 685*c* respectively); ELSE, if there is no other basis for swapping, let the ZCell's pass through to the next stage of the snaking shift register 685 without swapping, and repeat the first test on the next arriving pair of ZCell's that present themselves to the respective transposition unit 686.

A second (lower priority) test and follow-up action of algorithm 687 may be constituted as follows: IF for the tagged ZCell's of the payloads currently passing-through the test ends of the transposition unit 686, the logical source identifications (e.g., 526) and the logical sequence number (e.g., 525) are the same, AND IF the tagged-on egress port number (E1-Em) of the upper payload is less than the egress port number of the lower payload, then swap the ZCell's of the tested upper and lower layers; ELSE, if there is no other basis for swapping, let the ZCell's pass through to the next stage of the snaking shift register 685 without swapping, and repeat the second test on the next arriving pair of ZCell's that present themselves to the respective transposition unit 686. This second test is useful in certain embodiments wherein payloads are dispatched to ZEST chips in an oldest-first manner. The oldest ingressing payload in a ZINC chip (e.g., in ingress queue 115 of FIG. 1A) is the one that normally should arrive at the destination ZINC chip (e.g., 129) before a later-sourced payload. The oldest such ingressing payload is also the one that is normally dispatched to a lower numbered ZEST chip while later-sourced payloads are normally dispatched to respectively higher numbered ZEST chips in one embodiment. Even though ingress-side payloads may all be dispatched simultaneously with a same source identification and source-side sequence number, the variable latencies through the line-to-fabric interconnect layer 103 (over time and/o because of differing link lengths) may cause the dispatched payloads to shift temporally relative to one another. At the destination end (685), if the source identification and source-side sequence numbers of tagged payloads are the same, they can be re-ordered according to the tagged-on egress port number (E1-Em) as expressed above, to thereby return them to their original, source-side order.

By the time the ZCell's of a given sourcing, line card have reached the exit 689 of the snaking shift register 685 at the destination ZINC chip, those ZCell's should have sorted themselves into the order indicated by their respective payload sequence numbers (e.g., field 525) and/or their tagged on egress port numbers. (Of course it is within the contemplation of this disclosure to swap based on other swapping algorithms as may be appropriate in view of payload dispatching sequences used at the ingress side ZINC chips.) As explained, the depth of the re-order queue 685 can vary from one embodiment to the next depending on what the maximal spread could be between originally adjacent payloads (see also graph 109 in FIG. 1B). In one set of embodiments the re-order queue 685 is given a depth of at least 6 to 8 local ZINC ticks to compensate for tick-boundary crossing extensions (see 190 of FIG. 1B) made possible by the insertion of idle bites.

Even though payloads of a given, sourcing, line card (e.g., line card 110) may be properly sorted by algorithm 687, they may still belong to different telecommunication 'flows'. Typically, the flow identification number used at the destination side will be different from the flow identification number used at the source side of the switching system 100. FIN lookup unit 693 includes a lookup table for converting the source FIN (e.g., field 531 of FIG. 5A) of each ZCell PDU into a corresponding destination FIN. Unit 693 further includes FIN injecting means for replacing the source FIN's with the corresponding destination FIN's in passing-through ZCell's.

In a subsequent CSIX-compatible output unit 695 of the destination line card's ZINC chip 680, the contents of the outgoing ZCell's may be repackaged into C-Frames 698 compliant with the above-cited CSIX industry standard. The C-Frames 698 may then be transmitted to a CSIX-compliant, traffic manager unit of the destination line card for further processing.

Figure 5A:
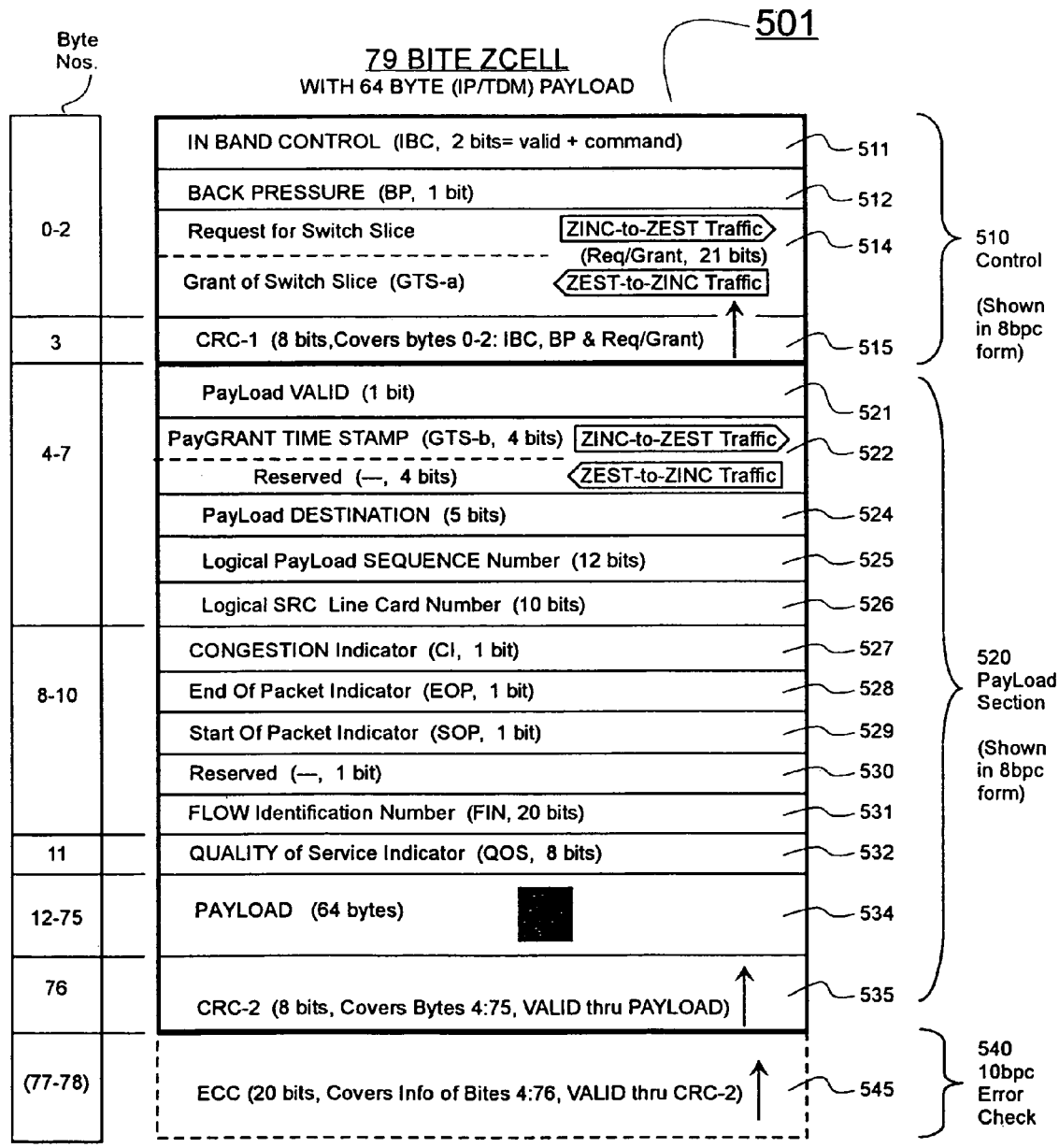
FIG. 5A shows a data structure of a first 79 word ZCell in accordance with the invention.

Referring to FIG. 5A, we now study in detail one possible data structure 501 for a ZCell signal that may be manufactured in accordance with the present disclosure and transmitted as such in a corresponding one of ZINC-to-ZEST traffic path (349a of FIG. 3) and ZEST-to-ZINC traffic path (349b of FIG. 3). The illustrated ZCell 501 is a so-called, 79-byte ZCell (when considered in the 8 bpc coding domain, or a so-called 79-bite ZCell when considered in the 10 pbc coding domain). This ZCell has a 64-byte/bite payload-transporting region 534. It is possible to produce within a given switching system ZCell's with a differently defined payload sizes and/or more or fewer amounts of control overhead. Once chosen, the ZCell size should be fixed for that switching system so that state machine 681 (FIG. 6) does not have to waste time, and thus lose bandwidth, adjusting on-the-fly to different ZCell sizes and/or formats.

The choice of size for the payload-carrying region 534 can significantly affect the efficiency of the given switching system. For example, if it is known that all line cards of the system will process only packets or cells or other framed data sets of sizes equal to or smaller than 52 bytes, such as may occur with ATM or like traffic, then it would be unwise to use ZCell's such as 501 with 64-byte/bite payload-carrying regions 534. (The 64-byte/bite size is chosen to correspond with packet lengths often seen conventional IP packet traffic.) In the latter ATM-based case, it would be wiser to shrink the size of the payload-carrying region to 52 bytes/bites so as to be compatible with the 52 bytes per cell format of ATM protocol. Every bit in the ZCell data structure consumes part of the finite bandwidth available in the line-to-switch interface layer 103/103' (see FIGS. 1A, 3). It is desirable to use a predominant part of that finite bandwidth for passing-through payload data rather than merely overhead data. However, as already seen above, certain control overhead such as the back pressure indicator (512), the Grant Time Stamps (GTSa and GTSb), logical source sequence number (525) and the logical source identification number (526) may be of valuable use for synchronizing activities of interacting parts of the line card layer 101 and the fabric layer 105 and for maintaining original payload order. Other control overhead such as the ECC field (545) may be of valuable use for assuring that serialized transmissions between the line card layer 101 and the fabric layer 105 can routinely pass through the line-to-fabric interconnect layer 103 with reduced amounts of error.

Besides minimizing overhead, it is also desirable to transport source cells in whole within one ZCell or as roughly equal halves within 2 ZCells or in the form of roughly equal thirds within 3 ZCells, etc., rather than having picked a size for payload-carrying region 534 that causes most, but not entirely all (e.g., $\geq 75\%$), of a given source cell to fill up a first ZCell and then to have a small remainder (e.g., $\leq 25\%$) of the given source cell barely fill the second ZCell that transports its content, thereby wasting a good portion (e.g., $\geq 50\%$) of the second ZCell's payload-carrying capacity.

Accordingly, the payload-carrying region 534 of the ZCell should be sized to efficiently match the expected cell sizes of the line cards. Also, besides the system-matching payload region 534, the ZCells should be organized to include so much further overhead as may be deemed essential for carrying out the various processes described herein. More specifically, in the specific implementation of FIG. 5A, it is seen that ZCell structure 501 includes a 32-bits long (as measured in the 8 pbc domain), control section 510 which provides in a 21 bits-wide subsection 514 the overlapping, and thus bandwidth preserving, functions of carrying requests during travel of the ZCell in ZINC-to-ZEST traffic (349a) and of carrying grants during travel in ZEST-to-ZINC traffic (349b). This dual use of a same field 514 for traffic-direction specific functions helps to assure that link bandwidth is not being wasted carrying useless bits in one of the directions.

ZCell 501 further includes a payload section 520 which comprises not only the payload-carrying region 534, but also a directionally-dedicated, GTSb field 522 for conveying the accompanying, and payload-associated Grant Time Stamp during travel in ZINC-to-ZEST traffic (349a). The GTS-b field 522 can be used to carry out the GTS-b alignment algorithm 696 of FIG. 6 when the ZCell 501 successfully reaches a targeted ZEST chip. The 4-bit field 522 does not currently have an assigned use in the ZEST-to-ZINC traffic direction (349b) and it is typically filled with O's or another code for indicating it is blank but reserved for future expansion use when it is embedded in ZEST-to-ZINC traffic (349b).

It may be noted that the contents of the payload section 520 are essentially independent of the contents of the control section 510. The contents of the control section 510 and of the payload section 520 happen to share the framework of a same ZCell 501 for moving across the line-to-fabric interconnect layer 103. The time versus content graph 616 of FIG. 6 shows that such sharing of framework can include sharing of benefits from the clock recovery and framing actions of the input state machine 681. The framework sharing aspect also provides the benefit to the control section 510 and payload-carrying section 520 of the link-rate adjustment provided by the periodically insertion of the idle bites (617). The egress-direction, grant signal of field 514 can go out at the same time as the unrelated, post-processing payload of field 534. Thus two rate-disparity problems associated with egress-directed payloads (PE) and egress-directed grants are solved simultaneously by the insertion of the idle bites (see again, the concept box 107 of FIG. 1B). It is noted here that the choice of number of idle bites, sync bites and their encodings is based on the type of interface layer 103 used. It is of course within the contemplation of this disclosure to use other numbers and/or insertion patterns of idle bites and/or sync bites and/or other coding and decoding schemes as may be appropriate in view of the interconnect layer 103 used.

It may be further noted here that the front end, control section 510 of ZCell 501 contains information whose error-free transport is not essential to the accurate and corresponding transport of payload data 534 in trailing section 520. In view of this, the back-end ECC section 545 of this embodiment is designed to not consume additional error-check/correct resources for protecting the front end, control section 510. This allows the ECC section 540 to be made of smaller size than may be needed for providing bit-flip correction to the entire ZCell 501. If a front end, state machine (e.g., 681) of a ZINC or ZEST chip fails to accurately synchronize with the first 4 bytes/bites (section 510) of an incoming ZCell but nonetheless manages to lock into fairly accurate clock synchronization and data framing with trailing sections 520 and 540, then the more essential payload data 534 may be considered to have successfully crossed the line-to-fabric interconnect layer 103 even if the contents of the first 4 bytes/bites (section 510) appear to have failed—either because a CRC-1 field 515 indicates the presence of error in control section 510 or because internal fields within a request/grant field 514 of section 510 do not comply with expected settings (e.g., valid=1). If the first CRC-1 field 515 of a received ZCell indicates an error, then request/grant field 514 of control section 510 will be ignored by the ZCell-receiving chip. However, the back pressure field 512 should be conservatively assumed to be true (BP=1) and will be accepted as a valid assertion of back pressure. The control-transmitter (more specifically the ZINC chip that sent a Request) should ultimately realize, after a predefined timeout has run (e.g., more than 12-14 ticks) or through other mechanisms, that its sending of the control section 510 was ignored, and the control-transmitting unit may then elect to retransmit the contents of the failed control section 510 in a later-sent ZCell.

Another included part of the payload section 520 is a 10 bits wide (as measured in the 8 pbc domain), logical source identification number (SRC) field 526. SRC field 526 is used for identifying the logical line card or other entity from which the current payload (534) ingressed into the fabric layer 105. Six bits of the SRC field 526 may be used for resolving amongst 64 line cards or other such source units. The remaining 4 bits may be used as an extension of FIN field 531 for resolving amongst larger numbers of flows or as an extension of field 526 for resolving amongst a larger number of line cards (e.g., 1024).

Yet another part of payload section 520 includes a payload sourcing sequence identification field 525 for identifying the logical order or sequence in which the accompanying payload 534 came in within the sourcing line card's (or other sourcing entity's) ingress traffic (e.g., 115 of FIG. 1A). Fields 525 and 526 can be used to carry out the snake-sort algorithm 687 of FIG. 6 when the ZCell 501 successfully reaches a destination ZINC chip 680.

As already explained, FIN field 531 can be used as a lookup key for FIN Lookup function 693 of FIG. 6. Additional lookup key bits may be extracted from slack areas of the SRC field 526.

Another field that may be included in the payload section 520 is a 5-bit, payload destination field 524 which may be used to define an extension of the destination port identification. Even though the 64 egress lines of a ZINC chip may associate with a respective 64 destinations, those destinations can be second-layer ZEST chips rather than destination line cards. By way of a simplified example, assume each ZEST chip defines a 32×32 switching matrix instead of the 64×64 matrix described for system 100 (FIG. 1A). Assume further that there are two layers of such 32×32 ZEST chips instead of the single layer G-K depicted in FIG. 1B. Then the payload destination field 524 may be used for facilitating multi-layer routing. This feature is beyond the purview of the asynchronous circuits being described herein and their linking by way of the variable latency line-to-fabric interconnect layer 103.

Referring still to FIG. 5A, yet other fields of the payload section 520 may be used to signal to the destination line card if the carried payload data 534 constitutes a start of a data packet (SOP indicator bit 529) or an end of a data packet (EOP indicator bit 528).

The 8-bit quality of service field (QOS) 532 indicates to a Traffic Manager chip (not shown) in the destination line card a current quality of service (bandwidth contract) that is to be supported for different kinds of cell types and routing requests based on threshold parameters that are pre-established in the Traffic Manager chips of the source line cards. Examples of QOS types for ATM traffic include: a best-effort contract, a constant bit rate contract and a variable bit rate contract. The Traffic Manager chips may respond to the QOS field 532 by managing traffic so as to try to meet their contract obligations.

The 1-bit congestion indicator field (CI) 527, if asserted (CI=1) indicates to more-downstream receiving devices (e.g., Traffic Manager chip in destination line card, see 698 in FIG. 6) that a congestion condition was detected upstream perhaps because an upstream buffer filled beyond a pre-defined threshold. The CI bit is either passed through as is or is set if a congestion condition is detected in the corresponding device that is carrying the CI bit. Typically it is the source line card's Traffic Manager (TM) chip or a further upstream device which sets the CI bit if buffers of the source TM chip or other upstream device are filling past threshold. The CI bit may also be asserted by a device on the destination side of the switch fabric.

The 8-bit, CRC-2 field 535 may be used to find presence of error in payload section 520. If CRC-2 field 535 indicates an error, then other parts of payload section 520 will be ignored by the ZCell-receiving chip. In addition to error protection by the CRC-2 field 535, additional error checking and correction functionality is provided by ECC field 545. ECC field 545 is tacked as a 2-bite (20 bits) entity after conversion of the payload section 520 from the 8 pbc domain to the 10 pbc domain and ECC field 545 is stripped off before or during back conversion from the 10 pbc coding domain to the 8 pbc domain.

Figure 5B:
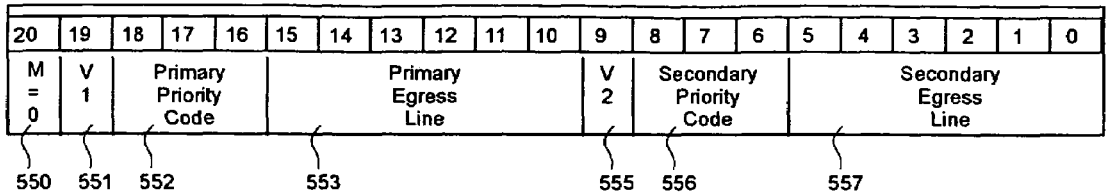
FIG. 5B shows the data structure of a 21 bit, unicast request field that may constitute field 514 of FIG. 5A.

Referring to FIG. 5B, a first filling data structure 514B for region 514 of ZCell 501 is described. Filler 514B can be used within ZINC-to-ZEST traffic (349a) for transporting one or two requests (a primary and a secondary one) from a given ZINC chip (e.g., 119 of FIG. 1A) to a corresponding ingress channel (e.g., 451.3 of FIG. 4) within a receiving ZEST chip. Within the 21-bit data structure 514B (as measured in the 8 pbc coding domain), most significant bit 20 defines a multicast flag 550 and that flag 550 is switched to zero (M=0) for the case of the illustrated, unicast request filler 514B. The next most significant bit, 19 defines a valid primary request flag 551 and that flag 551 is switched to true (V1=1) for the case where further fields 552 and 553 of the primary request contain valid data. If the primary valid flag is instead false (V1=0), then the primary request data fields, 552 and 553 are ignored by the ZEST grant mechanism (252) of the receiving ingress channel (451.3). In one embodiment, if V1=0, then the remainder of the unicast request filler 514B is deemed invalid. In other words, a secondary request (556-557) cannot be considered in that embodiment unless the secondary request is accompanied by a valid primary request (552-553). This is an optional, data-validating mechanism which assumes that the sending ZINC chip always completes distribution of its primary requests (552-553) into its ZINC-to-ZEST traffic transmissions before adding on secondary requests.

A 3-bit primary priority code in the range 0-7 fills the primary priority code field 552. Field 552 can be used by the ZEST grant mechanism (652) of the receiving ingress channel (651.3) to determine which of competing requests that are asking for access to respective egress lines by way of the one ingress channel, have an initially highest priority assigned to them, this giving them a better chance to win the grant. It is up to the traffic manager chip to define an initial primary priority code for each VOQ (e.g., 115 of FIG. 1A) of the payload sourcing unit. If the request-originating ZINC chip (119) fails to win grants and one or more of its VOQ's (115) fills beyond threshold, the ZINC chip can let the Traffic Manager chip know. The Traffic Manager chip may then set a new, higher priority for the back-congested VOQ.

The function of the 6-bit primary egress line field, 553 is basically given by its name. It identifies one of 64 possible, logically-identified destinations to which the later payload, if its request is granted, will be targeted. The actual line card to which the later payload is routed may be different than that indicated logically by the 6-bit primary egress line field. It may be further resolved by the 5-bit, payload destination field 524 (FIG. 5A) as described above.

For the respective V2 validity flag, priority code and egress line identification fields, 555-557 that fill the remainder of the unicast request filler 514B as shown, the functions are essentially the same as those for the primary request and thus do not need to be reiterated. As already described, in one embodiment, if V1=0, then the secondary request is deemed invalid even if V2=1.

Figure 5C:
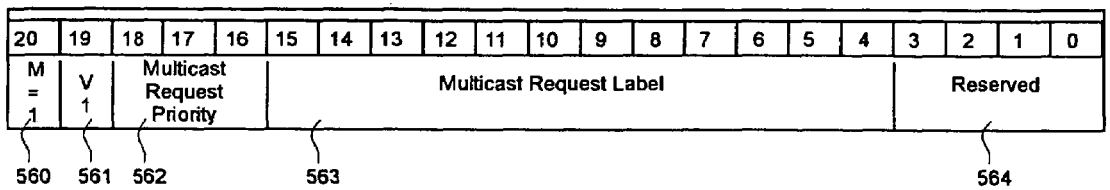
FIG. 5C shows the data structure of a 21 bit, multicast request field that may constitute field 514 of FIG. 5A.

Referring to FIG. 5C, a second filling data structure 514C for region 514 of ZCell 501 is described. Filler 514C can be used within ZINC-to-ZEST traffic (349a) for transporting a multicast request from a given ZINC chip to a corresponding ingress channel within a receiving ZEST chip. Within the 21-bit data structure 514C, most significant bit 20 again defines the multicast flag 560 and that flag 560 is switched to true (M=1) for the case of the illustrated, multicast request filler 514C. The next most significant bit, 19 defines the valid request flag 561 and that flag 561 is switched to true (V1=1) for the case where further fields 562 and 563 of the multicast request contain valid data. If the primary valid flag is instead false (V1=0), then request data fields, 562 and 563 are ignored by the ZEST grant mechanism (652) of the receiving ingress channel (651.3).

A 3-bit multicast priority code which has the value range, 0-7 fills the multicast priority code field 562. Field 562 can be used by the ZEST grant mechanism (652) of the receiving ingress channel to determine which of competing requests that are asking for access to respective egress lines by way of the one ingress channel, have an initially highest priority assigned to them, this giving them a better chance to win the grant. It is up to the traffic manager chip to define and optionally boost on a temporary basis, the multicast priority code for each VOQ. A turbo-boost part of the CSIX compatible interface may be used to optionally boost the priority code of given multicast VOQ on a temporary basis and to thereby increase the likelihood that the ingressing message will win grants from one or more of the ZEST chips the message competes in.

The function of the 12-bit, multicast label field 563 is to point to a specific entry within a lookup table (LUT, not shown) of the receiving ZEST chip, where that LUT entry then identifies the specific egress lines from which the multicast payload is to egress if its request is granted. The multicast label LUT may be programmed during system bootup or dynamically on the fly depending on system requirements. Initial configuration may be accomplished with bootup PROMS or the like which connect to the ZEST chips. Additionally or alternatively, the multicast label LUT may be programmed or patched by way of In-Band Control (IBC) sent from the line card layer 101 to the fabric layer 105 by way of IBC field 511 of the ZCells or by way of another control communications pathway. As shown in FIG. 5A, in one embodiment, the first two bits of a ZCell define a command-valid bit and a corresponding command bit. The command bit is considered valid by a receiving ZINC or ZEST chip if its accompanying command-valid bit is set true ('1'). Command bits may be serially transmitted from respective ZINC chips to respective ingress channels of the in-system ZEST chips by way of IBC fields 511. These may be used among other things for programming the multicast label LUT's as may be desired. The optional CPU interface on the ZEST chips may be used to configure the lookup tables and the like. Bits 0-3 (field 564) of the second filling data structure 514C are reserved for future expansion use.

Figure 5D:
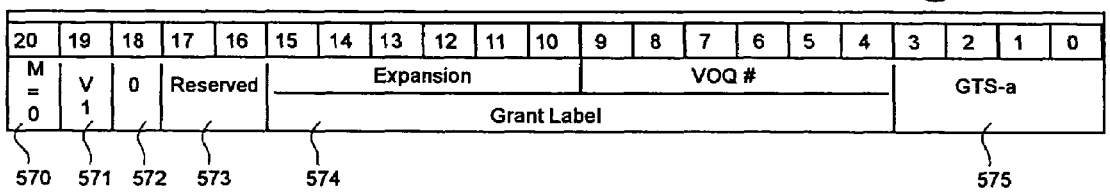
FIG. 5D shows the data structure of a 21 bit, non-TDM unicast grant field that may constitute field 514 of FIG. 5A.

Referring to FIG. 5D, a third filling data structure 514D for region 514 of ZCell 501 is described. Filler 514D can be used within ZEST-to-ZINC traffic (349b) for transporting a non-TDM unicast grant from a given ZEST chip for a corresponding ingress channel and to a receiving ZINC chip. Within the 21-bit data structure 514D, most significant bit 20 again defines the multicast flag 570 and that flag 570 is switched to false (M=0) for the case of the illustrated, unicast grant filler 514D. The next most significant bit, 19 defines the valid grant flag 571 and that flag 571 is switched to true (V1=1) for the case where trailing grant fields, 574-575 contain valid data.

Field 572 indicates TDM versus non-TDM traffic (see 592 of FIG. 5F) and it is set false (T=0) in the case of the non-TDM unicast grant filler 514D. The next most significant bits, 16-17 define a reserved field 573 which is reserved for future expansion use.

Bits 4-15 define a 12-bit grant label field 574 which identifies the VOQ for which the accompanying Grant Time Stamp (GTS-a, 575) is being sent. In one embodiment, the identification of the specific VOQ from which the unicast payload is to ingress into the fabric layer 105 is given directly by bits 4-9 while bits 10-15 are reserved for future expansion. In an alternate embodiment, the 12-bit grant label field 574 points to a specific entry within a lookup table (LUT, not shown) of the receiving ZINC chip, where that LUT entry then identifies the specific VOQ from which the unicast payload is to ingress into the switch fabric layer 105 given that its request is now being granted. The grant label LUT may be programmed during system bootup. This may be done with bootup PROMS or the like which connect to the ZINC chips. Additionally or alternatively, the grant label LUT may be programmed or patched by way of In-Band Control (IBC) sent from the switch fabric layer 105 to the line card layer 101 by way of IBC field 511 of the ZCells.

Bits 0-3 define the 4-bit Grant Time Stamp (GTS-a) field 575. As was already explained for FIGS. 2B-2C, the winning request is allocated a future one of soon upcoming time slots 0-15 on the rolling time drum of the GSQ. As was already explained for FIG. 6, when the winning VOQ receives GTS-a (575) from a ZCell launched at time point $t_{o1}$, the VOQ copies (626) that GTS-a code into the GTS-b field (522) of a return ZCell and launches the return ZCell at time point $t_{o2}$ back to the granting ingress channel. Re-align algorithm 696 then uses the GTS-b field (522) to accurately inject the accompanying payload (534) through the switch point (655) of the requested vertical egress line at the ZEST chip local time that corresponds to the GTS-b code.

Figure 5E:
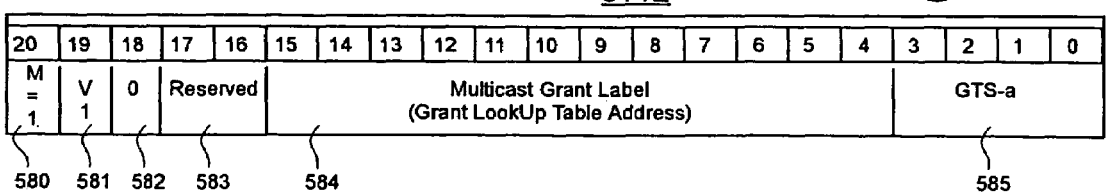
FIG. 5E shows the data structure of a 21 bit, non-TDM multicast grant field that may constitute field 514 of FIG. 5A.

Referring to FIG. 5E, a fourth filling data structure 514E for region 514 of ZCell 501 is described. Filler 514E can be used within ZEST-to-ZINC traffic (349b) for transporting a multicast grant from a given ZEST chip for plural egress from a corresponding ingress channel (e.g., 651.3 of FIG. 6), where the grant returns to a requesting ZINC chip. Within the 21-bit data structure 514E, most significant bit 20 again defines the multicast flag 580 and that flag 580 is switched to true (M=1) for the case of the illustrated, multicast grant filler 514E. The next most significant bit, 19 defines the valid grant flag 581 and that flag 581 is switched to true (V1=1) for the case where trailing grant fields, 584-585 contain valid data. As in the case of FIG. 5D, field 582 indicates TDM/non-TDM traffic and it is set false (T=0) in the case of the non-TDM multicast grant filler 514E. The next most significant bits, 16-17 again define a reserved-field 583 which is reserved for future expansion use.

Bits 4-15 define a 12-bit grant label field 584 which identifies a multicast VOQ entry for which the accompanying Grant Time Stamp (GTS-a, 575) is being sent. In one embodiment, the 12-bit grant label field 584 is the same as the request label 563 of the corresponding request. In an alternate embodiment, the 12-bit grant label field 584 points to a specific entry within a granted-VOQ lookup table (LUT, not shown) of the receiving ZINC chip, where that LUT entry then identifies the specific VOQ storage region from which the multicast payload is to ingress into the switch fabric layer 105 given that its request is now being granted. The grant label LUT may be programmed during system bootup. This may be done with bootup PROMS or the like which connect to the ZINC chips. Additionally or alternatively, the granted-VOQ labeling LUT may be programmed or patched by way of a CPU interface bus that may be provided in the ZINC chips.

Figure 5F:
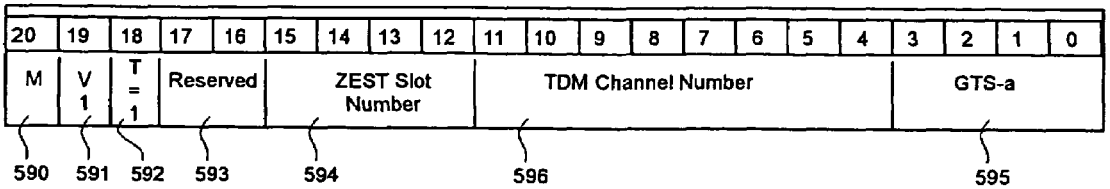
FIG. 5F shows the data structure of a 21 bit, TDM grant field that may constitute field 514 of FIG. 5A.

Referring to FIG. 5F, TDM-type ZINC-to-ZEST traffic is not preceded by individual requests for grants because the TDM, switch-through time slots are pre-dedicated on a periodic basis. Accordingly, a TDM request filler is not shown between FIGS. 5C and 5D. Nonetheless, grants such as the filler structure 514F illustrated in FIG. 5F are sent from the respective TDM-carrying ZEST chips to corresponding, TDM-carrying ZINC chips as part of the ZEST-to-ZINC traffic (349b) in order to induce the ZINC chips to timely forward their TDM-type payloads to the switch fabric layer 105.

As in the case of FIGS. 5D-5E, the fifth filling data structure 514F for region 514 of ZCell 501 is 21 bits long as measured in the 8 pbc coding domain. Most significant bit 20 again defines the multicast flag 590 and that flag 590 may be switched to true (M=1) if the illustrated, TDM grant filler 514F is to grant egress through a plurality of pre-identified egress lines. More typically, multicast flag 590 will be switched to false (M=0) because the TDM-type traffic is typically of a unicast style.

The next most significant bit, 19 of filler 514F defines the valid grant flag 591 and that flag 591 is switched to true (V1=1) for the case where trailing grant fields, 594-596 contain valid data. Field 592 indicates TDM traffic is therefore set true (T=1). The next most significant bits, 16-17 again define a reserved field 593 which is reserved for future expansion use.

Bits 4-11 define an 8-bit wide, TDM channel number field 596. Typically, a TDM transmission frame can contain data from up to 192 different channels. Each ZCell 501 can carry up to 64 bytes of a given channel's data within its payload-carrying region 534. The data-sourcing line card can arrange its to-be-switched data so that sequential bytes of a specific channel are packed together for efficient transmission by a same ZCell. Then when the grant 514F for that specific channel comes in, as indicated by channel number field 596, the sourcing ZINC chip can insert the so-packed sequential bytes of the identified channel into a next ZCell which is ingressing (349a) into the switch fabric layer 105.

Not all TDM traffic needs to move through the switch fabric layer 105 at high throughput rates (e.g., OC-12 or higher). Some TDM traffic may be content to pass through the switch fabric layer 105 at a much slower rate, such as between T3 and OC-12. In one embodiment, each ZEST-grantable, switching time slot is associated with up to 12 multiplexing slots. If all 12 slots are allocated to a given TDM stream, then the stream is consuming the full bandwidth of that ZEST-grantable, switching time slot (T). On the other hand, if 6 of the slots are used by one TDM stream while an interspersed 6 others of the slots are used by a second TDM stream, then each stream will be sharing a respective half of the full bandwidth available from that ZEST-grantable, switching time slot (T). In accordance with one embodiment, a TDM pre-dedicating module (not shown) of each ingress channel is responsible for interspersing over time, a plurality of slot numbers which are associated with different TDM channels or streams that happen to share the bandwidth of a given, ZEST-grantable, switching time slot (T) as provided by one or more ZEST chips. Field 594 (ZEST slot number) identifies the particular slot that is being serviced by the accompanying Grant Time Stamp of GTS-a field 595. As seen in FIG. 5F, the GTS-a field 595 is positioned across bits 0:3 as it also is in FIGS. 5D and 5E.

Referring again to FIG. 5A, some miscellaneous fields of ZCell structure 501 are now described. Back pressure field 512 is 1 bit wide and may used for dynamically inhibiting effective rate of signal flow in both the ZINC-to-ZEST traffic direction (349*a*) and the ZEST-to-ZINC traffic direction (349*b*). As already explained for FIG. 2A, If a requests-receiving buffer (e.g., 247*a* and/or 251) of a given ingress channel fills beyond a predefined, overfill threshold, the ZEST chip may detect this (246) and may begin to insert true, back pressure bits (261*d*, 512) into ZCell's (264) that are heading back to the requests-sourcing ZINC chip (e.g., of line card 3). In response, the ZINC chip should temporarily stop sending requests to the overwhelmed ingress channel. It may instead divert its requests to other ZEST chips. The temporarily overwhelmed ZEST unit is thereby given an opportunity to empty its request buffers 247*a*, 251 down below the BP-activating threshold level. Then the back pressure bits (512) flowing back to the request-sourcing ZINC chip (e.g., of line card 3) may be reset to false and the so-informed, ZINC chip can responsively elect to begin sending further requests to the previously over-loaded ingress channel.

In one embodiment, egressing payloads pass through two buffers in the ZINC chip (e.g., 680 of FIG. 6) of the destination line card. One of those buffers (e.g., snake 685*a*) receives ZCell's from the line-to-fabric interconnect layer 103 while the other buffer (inside CSIX output module 695) forwards payload data by way of CSIX compatible interface 698 to the corresponding traffic manager chip (not shown). The second of these two buffers (inside 695) may fill beyond a predefined, and respective overfill threshold. An overfill indicator signal of this second buffer (inside 695) may be logically ORred together with over-fill indicators of further downstream buffers (not shown) and the OR result may be inserted by the ZINC chip into the back pressure bits (512) of ZCell's heading out from the ZINC chip whose output (695) is backing up, to all or a selected portion of its payload-supplying ZEST chips. In response, the so-warned ZEST chips should temporarily mark the egress line of the overfilled ZEST chip as being 'busy' (not available for giving grants). As a result of this, the respective ZEST chips will stop providing grants to requests that target the ZINC chip whose output (695) is backing up. The backing up buffers (in 695 or further downstream) are thereby given an opportunity to empty down below their back-up warning levels. Then the back pressure bits (512) flowing back to the payload-supplying ZEST chips may be reset to false and the so-informed, ZEST chips can then allow the previously 'busy' egress-lines to become not busy and the so-informed, ZEST chips can thereafter begin to send grants back for requests targeting the previously backing-up ZINC chip. It should be noted that, although the output (695) of a given one ZINC chip may be backing-up, that does not mean that other destination line cards are also backing up at their output ends (downstream ends). The ZEST chips layer (105) can continue to supply switched (and/or otherwise processed) payloads to the egress lines (e.g., 255*c*, 255*i*, etc. in FIG. 2B) associated with ZINC chips that are not so backing up.

Field 530 is 1 bit wide and reserved for future use. It is included so that ZCell structure 501 will have an even number of bits.

Referring to FIG. 7A, another system 700 that conforms with the present disclosure is shown. A first database computer 710 is provided in the system and synchronized to a first independent clock 717 (CLK-A). A second database computer 720 is provided and synchronized to its own independent clock 727 (CLK-B). These first and second database computers 710 and 720 can supply respective database output signals (query result signals) 719 and 729 to a data processing unit 750. The processor 750 is synchronized to a third independent clock 757 (CLK-D). An independently-clocked scheduler 740 is further provided for scheduling a time slot within the time domain of processor 750 where the scheduled time slot is one within which corresponding outputs 719 and 729 of the databases are to be joined (753) and optionally further processed (754). Operations of the scheduler 740 are synchronized to a fourth independent clock 747 (CLK-C). In an alternate embodiment, the scheduler 740 is integrated with the processor 750 and both are synchronized to a common clock (747 or 757).

For purpose of example, it is assumed here that scheduler 740 receives a job request such as an employee identification number 741 (e.g., a government-assigned Social Security number, or SS# for short). It is further assumed for purposes of illustration that the first database computer 710 (Database A) provides lookup correlations between an input identification number (SS#) and a corresponding employee's, current home address (ADDR). The second database computer 720 (Database B) provides lookup correlations between the employee's identification number (SS#) and a current, weekly compensation schedule (COMP) for that employee. Either one of a given employee's address or compensation can change independently of the other and hence separate A and B databases are maintained. For reasons of security, databases A and B may be kept in different locations. The respective distances between database computer 710, database computer 720, scheduler 740 and processor 750 can vary. Also delays over the links between units 710-750 can vary as a function of time.

The processor 750 may be asked to perform a simple task such as (for sake of our example) calculating the weekly compensation for each of a number of specified employees, preparing compensation checks for them, and preparing respective mailing envelopes 760 for mailing the checks to the employees' current home addresses. That implies that the current compensation amount (COMP) will have to be joined (753) with the current employee address (ADDR) and the combination will thereafter be processed (754) to produce the addressed envelope 760 that contains a check made out to the appropriate employee. (The employee's name can come from a third database computer—not shown—that provides lookup correlations between the employee's identification number (SS#) and name. That third database computer—not shown—can be coupled to scheduler 740 and processor 750 in the same manner that the first and second database computers, 710 and 720, are.) It is understood that this simple check-mailing task is merely an example and that many far more complex processing jobs may be carried out in accordance with the present disclosure, using a larger number of distributed databases such as 710 and 720 which are interconnected to a scheduler (740) and a processor (750) in accordance with the illustrated manner.

For reasons of security, scalability, and/or other factors, a first variable-latency interconnect 704 is interposed between the first database computer 710 and processor 750. Similarly, a second variable-latency interconnect 705 is interposed between the second database computer 720 and processor 750. The same interconnects 704, 705, and/or additional other variable-latency interconnects may be respectively interposed between scheduler 740 and database computers 710, 720, as well as processor 750.

Scheduler 740 includes a scheduling time counter (STC') 745 that is synchronized to the scheduler's CLK-C clock (747). The STC' counter 745 and keeps track of a local scheduler time according to an appropriate wraparound modulus (e.g., mod 16). Upon receipt of various job requests 741, the scheduler 740 arbitrates among competing ones of the requests and grants appropriate job execution times to each. The scheduler 740 time-stamps each winning job request with a next-available STC' count 746 and sends the stamped job requests by way of paths 711 and 721 to respective database computers 710 and 720. Although the corresponding time stamps 746 are the same on paths 711 and 721, for purposes of following what happens next, the one stamp that is sent to the first database computer 710 is denoted as STSa while the same-valued stamp going to the other database computer 720 is denoted as STSc. Stamp STSa moves through variable latency interconnect 704 and its accompanying job request (SS#) is thereafter processed in the independently-clocked first database computer 710. Similarly, stamp STSc moves through variable latency interconnect 705 and its accompanying database job identifier (SS#) is thereafter processed in the independently-clocked second database computer 720.

After appropriate lookup processing takes place in the first database computer 710, the corresponding employee address data (ADDR) is output 719 along with a corresponding time stamp (STSb) for forwarding through interconnect 704 to the processor 750 and for storage into a first alignment queue 751 (AQa) of processor 750. As should be understood by now, STSb corresponds to STSa just as GTSb corresponded to GTSa in our above description of the distributed switch fabric system 100. In similar fashion, the compensation amount (COMP) which is output by the second database computer 720 is combined with a corresponding time stamp STSd and output along path 729 through the variable-latency interconnect 705 for storage into a second alignment queue 752 (AQb) of processor 750. Once again, STSd corresponds to the scheduler-originated time stamp STSc.

A roundtrip adjustment delay (RTA') is established for the expected maximum delays of signal travel from scheduler 740 through the variable-latency interconnects 704, 705 and through the respective database computers 710, 720 for final arrival in the AQ's of the processor 750. Processor 750 has its own processor time counter (PTC) 755 which, in one embodiment, runs in lagging relationship to the STC' counter 745. The PTC counter 755 should be periodically aligned to roughly represent the STC' count (745) minus the RTA' lag factor. The processor time counter (PTC) 755 runs in synchronism with the local processor clock 757 and as a result it may not remain in perfect synchronism with the STC' count. Periodically, the current STC' count may transmitted by way of path 744a (e.g., through interconnect 705) for updating the PTC count 755. The time delay of update path 744a should be determined in some manner and the version of STC' received in processor 750 should be adjusted to create the approximated lag condition:

$$PTC \approx STC' - RTA'.$$

One way for determining what adjustment should be made to the STC' update signal received over path 744a is for the processor 750 to immediately echo that received signal back over path 743 to the scheduler 740. The scheduler 740 can then determine what the round trip delay is through paths 744a and 743 by comparing the echoed STC' signal (sent over path 743) against its current STC' count 745. An empirically-defined multiplier (greater than 1) may then be applied to the so-determined, round trip delay of paths 744a and 743 to thereby define a safe RTA' value that will equal or slightly exceed the worst-case, expected round trip delay of round trip paths such as 711-710-719 or 721-720-729. Of course, if RTA' is made too large that may result in commensurate, but undesirable size increases for alignment queues AQa (751) and AQb (752) because early-arriving result signals (719 and 729) will have to be stored for longer lengths of times.

An alternate method for establishing RTA' may involve scheduler 740 sending specially coded job requests (e.g., SS#=000) to all the databases (710, 720, etc.) it is coupled to by of respective interconnects 704, 705, etc. Each such special job contains a same STC' stamp. In response to the special job requests, each of the databases performs a dummy lookup operation and forwards the results (719, 729, etc.) to the targeted processor 750. Upon receipt of these dummy results (identified by the specially coded job request, e.g., SS#=000), the processor 750 resets its PTC count to the STC' stamp value carried by the dummy results (719, 729, etc.). Assume that the roundtrip path through database computer 720 has the longest delay. Then its PTC-resetting stamp 744b will be the last one used to update PTC counter 755. As a result, PTC counter 755 will lag STC' by the maximum RTA' in the system, namely the roundtrip time of path 721-720-729. For extra safety, and because delay over slowest path 721-720-729 may still get slower over time, the PTC count should be additionally delayed by an empirically established delta. In this way a relatively small, but still safe value for RTA' may be established. The above described, automated methods do not preclude manually fixing RTA' to an empirically established value and periodically updating PTC to reflect that manually established amount of RTA'.

Within processor 750, when the local time point arrives that corresponds to PTC=value of STCa=value of STCc, arrives, joining mechanism 753 pulls out from the first and second alignment queues, 751 (AQa) and 752 (AQb), the corresponding employee address information (ADDR) and employee compensation information (COMP) respectively tagged with STSb=PTC and STSd=PTC. The joining mechanism 753 then joins these logically related pieces of information (ADDR and COMP of a corresponding SS#). Processor 754 then processes the joint information to produce the desired result 760.

In general, at the time of joining and processing (753-754), the PTC counter 755 in the processor unit will not be lagging the STC' counter 745 of the scheduler exactly by RTA' because of the asynchronous relationships of clocks 747 and 757. It will be approximately RTA'. That is good enough as long as RTA' has some built slack for compensating for drifts between the periodic updates (e.g., 744a or 744b) of the PTC counter 755. The main concept to be understood is that scheduler 740 is scheduling for a time slot in the timing reference frame of the processor 750. Within the processor 750, that timing reference frame (757) is precisely determinable and thus the pre-schedule joining operation 753 can occur exactly as planned provided the required input signals (ADDR 719 and COMP 729) are collected into the respective alignment queues (751 and 752) within an RTA'-long span preceding the time of joining (753) and/or processing (754). Of course, if the scheduler 740 is being clocked by the same clock (757) as that of the processor 750, we can revert to the more specific case of FIG. 2A wherein the request processor/scheduler 252 is in the same chip as the processor 255. Then PTC can lag STC' by exactly RTA' if so desired.

In contrast to FIG. 1A, FIG. 7A provides a more generic example of an embodiment 700 in accordance with the disclosure wherein the scheduler 740 and the processor 750 are not necessarily being clocked by a same clock signal. FIG. 7A also provides a more generic example because its embodiment 700 processes (754) more than one piece of data from one of distributed data sources (710 and 720). As indicated by dashed boxes 703 and 706, the first and second database computers, 710 and 720, may constitute distributively shared resources that serve more than just scheduler 740 and its related processor 750. Different, optionally-variable latencies may be associated with the interconnects 703, 706 to those other schedulers and processors (not shown). Each pair of scheduler (740) and its related processor (750) may have a different RTA' value associated with it.

Without appropriate compensation in system 700, rate-disparity problems may develop there just as they might in the switching system of FIG. 1A. Two-way dynamic link-rate adjustment may be employed. However, the more preferred way is to use static rate constraint in one direction and dynamic compensation in the other. In FIG. 7A, the static rate constraint is generically represented by box 701 and it may be carried out by use of: (a) slowing down CLK-A relative to CLK-D, as is represented by dashed line 701a and the double-hatch between items 717 and 710; (b) inserting idle states into the output sequence of database computer 710 as is represented by dashed line 701b and the double-hatch across line 719; or (c) providing various combinations of static constraining options 701a and 701b; and (d) doing the same for other databases such as 720 in accordance with the similar and further static constraints represented by dashed lines 701c and/or 701d.

Dynamic rate control may be asserted in the reverse direction (for traffic flowing out of the scheduler 740) by using back pressure bits (BP) or a token-exchange system or both. The BP or token-exchange communications may take place over illustrated lines 742, 743 and 749. Token-exchange is similar to dynamic back-pressuring. However, in token-exchange, it is the unit which is not statically constrained (the potentially quicker unit; e.g. a ZINC) that determines within itself whether the statically-constrained, opposed unit (e.g., the ZEST) is keeping pace or not.

Figure 7B:
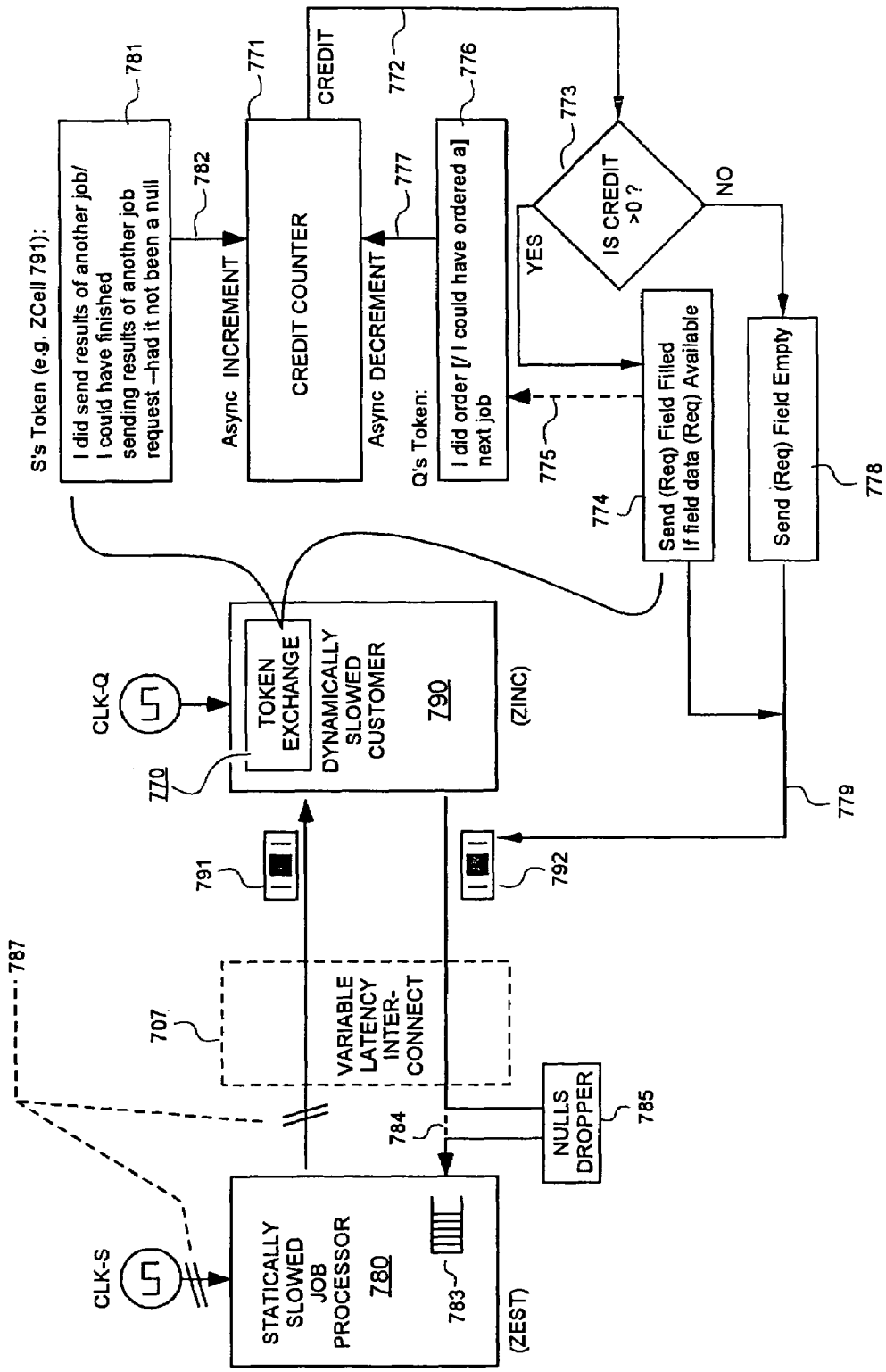
FIG. 7B is a diagram for explaining the token exchange method of dynamic rate adjustment.

Referring to FIG. 7B, the situation is represented generically by the combination of a statically-slowed job processor 780 and a dynamically-slowed customer unit 790. As is indicated by the double-hatched cross lines at 787, one or both of the independent clock, CLK-S, of unit 780 and the results output of the processor 780 is statically slowed to assure that processor 780 cannot outpace the effective rate of the opposed customer unit 790. Customer unit 790 is synchronized to its own independent clock CLK-Q. Because of the static constraint(s) placed on job processor 780, its independent clock CLK-S may be considered to be the comparatively slower one while the independent clock, CLK-Q, of the customer unit 790 may be considered to be the potentially quicker one. In one embodiment, the statically-slowed job processor may function as a ZEST unit while the dynamically-slowed customer may function as a ZINC unit. Element 783 represents a request-receiving queue within job processor 780. There are at least two variations of operation. In a first variation, 784, all received request fields (792); even if filled with a null request (e.g., an invalid request) are stored in request-receiving queue 783. A second variation interposes a null-dropping mechanism 785 before queue 783. In the latter variation, request fields (792) that are filled with all null requests (e.g., invalid requests) are detected and dropped before reaching queue 783 and are therefore not stored in request-receiving queue 783. These two variations 784/785 affect how step 776 is implemented, as shall be further explained below.

A token-exchange based controller 770 is provided within customer unit 790. The token-exchange controller 770 includes a credit counter 771 which is responsive to asynchronously provided, increment commands 782 and to asynchronously provided, decrement commands 777. The resulting, current credit-count 772 of the credit counter is supplied to a customer credit watching unit 773. If the current credit 772 is greater than zero (CREDIT>0), then credit watcher 773 allows the customer unit 790 to fill in a valid next job order (774—if such an order is ready for sending) and to ultimately send 779 that valid job order by way of an order-transporting vehicle such as ZCell 792 to the job processor 780. On the other hand, if the customer's credit is not greater than zero (NO), then credit watcher 773 forces the customer unit 790 to either send invalid order fields (e.g., blank fields) or to not send such fields at all, as indicated by item 778.

A YES determination by credit watcher 773 translates (775) into the provision of a customer's token signal 776 which in essence states one of the following two propositions:, (a) "If variation 784 is in effect, I did order, OR I could have ordered, performance of a next job." and (b) "If variation 785 is in effect, I did order performance of a next job." Option (a) applies if the null-dropping mechanism 785 is not present, while (b) applies if 785 is present. This token signal 776 is translated (777) into an asynchronous decrement command supplied to the credit counter 771. In other words, each time the customer unit 790 actually orders a next job to be performed by processor 780 or the customer unit 790 is given an opportunity to so fill queue 783 with a next job order, the credit count of the customer is decremented.

Each time the job processor 780 completes another job or passes a processing milestone wherein it could have completed another job (by processing a null request in queue 783), the processor 780 sends a corresponding token signal 781 indicating so to the token-exchange controller 770. This return-path token 781 may be implicitly represented by receipt of a results-carrying vehicle 791, which vehicle may be a ZCell in one embodiment. As seen, the token 781 of the statically-slowed processor (S) indicates that the processor 780 did send, OR could have finished sending results of another job—had it not been a null request. In response to this token signal 781, an asynchronous increment command 782 is sent to the credit counter 771.

Because of the dynamics of the illustrated system in FIG. 7B, the credit amount 772 within the credit counter follows the empty versus full state of queue 783. The credit count should generally not go below zero. This is so because increment commands 782 are sent to the credit counter 771 each time another ZCell 791 or a like results-carrying vehicle arrives (or could have arrived—if null requests are not dropped) at the customer unit 790, whether filled with valid results or not. On the other hand, the decrement commands 777 cannot issue unless the credit is greater than zero. Thus credit 772 cannot go below zero in the illustrated embodiment. Also, credit counter 771 should not wrap to zero after it reaches its maximum count. It should instead saturate at its maximum count value if it receives more increment commands 782. Subsequent decrements 777 will then bring the count down below its maximum saturation count value. Although a particular orientation has been shown, it is of course, possible to use reverse logic or different valuations and therefore the above observations about credit 772 remaining at or above zero is directed to the illustrated example.

As seen in box 774, a valid job request or another explicit ordering; or even an implicit ordering of performance of a next job occurs only if the data (e.g., payload) for performing the job is available. Otherwise, the job request field is sent as empty (invalid) or alternatively, the job request is not sent at all. That is why Q's token 776 has the conjunctive option of "I could have ordered a next job" as an OR alternate to "I did order a next job" in the case where variation 784 is in effect and empty request fields 778 are sent. For the case where variation 785 is in effect or empty request fields 778 are not sent, the Q's token 776 is instead indicative of only, "I did order a next job". For either case, the asynchronous decrement command 777 is sent to the credit counter 771 in response to token 776. In summary, it is seen from the embodiments represented by FIG. 7B that the statically-slowed job processor 780 (e.g., ZEST unit) does not itself have to keep track of whether it is being overwhelmed by a potentially-faster customer unit 790 (e.g., ZINC unit), where the latter customer unit is not statically rate-constrained. Instead, the token-exchange controller 770 may be implemented in the customer unit 790 to thereby dynamically slow the customer unit 790 so that its effective rate does not overwhelm the request-receiving queue 783 within the statically-slowed processor 780.

The present disclosure is to be taken as illustrative rather than as limiting the scope, nature, or spirit of the subject matter claimed below. Numerous modifications and variations will become apparent to those skilled in the art after studying the above disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering the extrapolations.

Given the above disclosure of general concepts and specific embodiments, the scope of protection sought is to be defined by the claims appended hereto.

What is claimed is:

1. A rates balancing method for balancing effective data exchange rates for purpose of continuous sustainability between an independently-clocked job requestor and an independently-clocked, job processor,
where the job requestor sends to the job processor, requests for respective processings of job payloads which are supplied from the job requestor to the job processor, and
where in response to at least some of said sent requests, the job processor sends to the job requestor corresponding indications of request grants,
where the job processor exhibits an average grant-issuing rate,
where the job requestor exhibits a request-issuing rate, said rates balancing method being machine implemented and comprising:
(a) statically constraining the average grant-issuing rate of the job processor to be no greater than a sustainable average grant-receiving rate which is continuously sustainable by the job requestor; and
(b) dynamically constraining the request-issuing rate of the job requestor to be no greater than a sustainable average request-receiving rate which is continuously sustainable by the job processor.

2. The method of claim 1 wherein:
respective ones of said job payloads are supplied from the job requestor to the job processor after corresponding ones of the requests are supplied from the job requestor to the job processor.

3. The method of claim 2 wherein:
job requestor is operatively coupled to the job processor by way of a communications link that is subject to variable latencies.

4. In a system where a plurality of job requestors transmit packets to an independently clocked one of plural job processors and each transmitted packet can include one or more requests for processing of corresponding jobs by the one job processor, a method comprising:
(a) determining an effective rate at which valid requests are being submitted to the one job processor from a given one of said job requestors;
(b) determining if the determined effective rate exceeds a predefined sustainable rate of request processings that can be provided by the one job processor; and
(c) in response to determination that the effective rate of request submissions from the given job requestor exceeds the sustainable rate, sending a back pressure signal to the given job requestor asking that given job requestor to reduce its rate of request submissions to the one job processor.

5. The method of claim 4 wherein said step (a) of determining an effective rate includes:
(a.1) counting how many packets arrive from the given job requestor where the packet contains more than one valid job request.

6. The method of claim 5 wherein said step (b) of determining if the determined effective rate exceeds a predefined sustainable rate includes:
(b.1) determining if the count produced by step (a.1) exceeds a predetermined number.

7. The method of claim 4 wherein said step (a) of determining an effective rate includes:
(a.1) accumulating valid requests received from the given job requestor in a storage buffer; and
(a.2) determining if storage of valid requests in the storage buffer has reached a predetermined overflow warning threshold.

8. In a system where one or more job processors exchange packets with at least one independently clocked one of plural receivers of processed jobs and each packet transmitted from a processor to a receiver can include a processed payload and where the at least one independently clocked receiver of processed jobs can be clocked slower than at least one of the job processors, a method comprising:
(a) at least periodically causing a first time span between starts of successive packets of a flow going from job processors to receivers of processed jobs to be longer than a second time span between starts of successive packets of a flow going from the receivers to job processors so that a fastest one of the job processors cannot continuously outpace the at least one independently clocked receiver in terms of rate of packets output by the fastest job processors versus rate of packets output by the at least one independently clocked receiver.

9. The method of claim 8 wherein said step (a) of causing the first time span to be longer includes:
 (a.1) periodically including idle signals in the flow of packets moving from the job processors to the independently clocked one job receiver so as to thereby reduce an effective rate of processed payload data moving towards the independently clocked one job receiver.

10. The method of claim 9 wherein said step (a.1) of including idle signals comprises inserting idle bites no more often than once among every 20 optically encoded bites transmitted by the job processors so as to thereby compensate for a possibility of clock frequency disparity in a range of 0 to 5 per cent.

11. The method of claim 9 wherein said step (a.1) of including idle signals comprises inserting idle bites no more often than once among every 320 optically encoded bites transmitted by the job processors so as to thereby compensate for a possibility of clock frequency disparity in a range of 0 to about 0.3 per cent.

12. The method of claim 8 wherein said step (a) of causing the first time span to be longer includes:
 (a.1) driving the job processors with clock signals of substantially lower frequencies than a frequency at which the at least one independently clocked receiver is clocked.

13. The method of claim 12 wherein said step (a) of causing the first time span to be longer further includes:
 (a.2) periodically including idle signals in the flow of packets moving from the job processors to the independently clocked one job receiver so as to thereby reduce the effective rate of processed payload data moving towards the independently clocked one job receiver.

14. The method of claim 8 wherein the job receivers send requests for processing of jobs to the job processors, the method further comprising:
 (b) dynamically slowing the rate at which one or more of the job receivers sends valid requests to at least one of the job processors.

15. The method of claim 14 wherein said step (b) of dynamically slowing includes:
 (b.1) selectively sending backpressure signals to the one or more of job receivers.

16. The method of claim 14 wherein said step (b) of dynamically slowing includes:
 (b.1) using a token exchange system to selectively block the one or more job receivers from sending out valid requests.

17. A system comprising:
 (a) a plurality of job processors;
 (b) a plurality of receivers of processed job data produced by one or more of the job processors where at least one of the receivers is independently clocked relative to at least one of the job processors, where the receivers and job processors exchange packets with one another and each packet transmitted from a processor to a receiver can include a processed payload, and further where the at least one independently clocked receiver of processed jobs can be clocked slower than at least one of the job processors;
 (c) first data rate constraining means for at least periodically causing a first time span between starts of successive packets of a flow going from job processors to receivers of processed jobs to be longer than a second time span between starts of successive packets of a flow going from the receivers to job processors so that a fastest one of the job processors cannot continuously outpace the at least one independently clocked receiver in terms of rate of packets output by the fastest job processors versus rate of packets output by the at least one independently clocked receiver.

18. The system of claim 17 wherein:
 (c.1) said first data rate constraining means includes idle insertion means for periodically including idle signals in the flow of packets moving from the job processors to the independently clocked one job receiver so as to thereby reduce an effective rate of processed payload data moving towards the independently clocked one job receiver.

19. The system of claim 17 wherein the job receivers send requests for processing of jobs to the job processors and further comprising:
 (d) second data rate constraining means for dynamically slowing the rate at which one or more of the job receivers sends valid requests to at least one of the job processors.

* * * * *